US007664747B2

(12) United States Patent
Petras et al.

(10) Patent No.: US 7,664,747 B2
(45) Date of Patent: Feb. 16, 2010

(54) SYSTEM FOR CREATING AND MAINTAINING A DATABASE OF INFORMATION UTILIZING USER OPINIONS

(76) Inventors: Gregory J. Petras, 6522 N. 27th St., Phoenix, AZ (US) 85016; Richard W. Hill, 6601 E. Camino de los Ranchos, Scottsdale, AZ (US) 85254; Andrew F. Mason, 20408 N. 32nd Pl., Phoenix, AZ (US) 85050; Cory Osborn, 7701 S. Heather Dr., Tempe, AZ (US) 85284; Flori N. Parham, 5912 W. Dublin Ct., Chandler, AZ (US) 85226; Connie Riffel, 15202 S. 40th St., Phoenix, AZ (US) 85044; Rachael A. Thomas, 4220 E. Whitney La., Phoenix, AZ (US) 85032; Craig P. Thompson, 19804 N. 68th Dr., Glendale, AZ (US) 85308; Jeffrey T. Zywicki, 10871 E. Gold Dust, Scottsdale, AZ (US) 85259

( * ) Notice: Subject to any disclaimer, the term of this patent is extended or adjusted under 35 U.S.C. 154(b) by 332 days.

(21) Appl. No.: 11/563,628

(22) Filed: Nov. 27, 2006

(65) Prior Publication Data

US 2007/0100898 A1    May 3, 2007

Related U.S. Application Data

(63) Continuation of application No. 09/782,873, filed on Feb. 10, 2001, now Pat. No. 7,143,089.

(60) Provisional application No. 60/181,632, filed on Feb. 10, 2000.

(51) Int. Cl.
*G06F 17/30* (2006.01)

(52) U.S. Cl. ............... 707/5; 707/10; 707/104.1; 704/1; 709/201

(58) Field of Classification Search ............ 707/1, 707/5, 6, 4, 10; 715/277; 704/9; 705/51
See application file for complete search history.

(56) References Cited

U.S. PATENT DOCUMENTS

| | | | | | |
|---|---|---|---|---|---|
| 5,625,767 | A | * | 4/1997 | Bartell et al. | 345/440 |
| 5,893,095 | A | * | 4/1999 | Jain et al. | 707/6 |
| 5,913,205 | A | * | 6/1999 | Jain et al. | 707/2 |

(Continued)

OTHER PUBLICATIONS

PCT/US01/04408, International Search Report, PCT Form 210/220, Int Filing date Oct. 2, 2001.*

*Primary Examiner*—Shahid A Alam
(74) *Attorney, Agent, or Firm*—Stephen E Zweig

(57) ABSTRACT

A system for automatically creating and maintaining a database of information utilizing user opinions about subjects, particularly exceptional experiences. Described is an Internet system assisting/motivating a population of users interested in information about certain categories of subjects to automatically maintain the database content and to improve the usefulness and quality of the database information without any substantial management by the website owner-manager. The user opinions are primarily in the form of both comments and ratings about which natural-language terms best describe a particular subject, enabling user searches of the subject database to be by way of preferred such descriptive natural-language terms, which terms are further preferred to be evaluative and approving.

7 Claims, 124 Drawing Sheets

U.S. PATENT DOCUMENTS

| | | | |
|---|---|---|---|
| 5,915,250 A * | 6/1999 | Jain et al. | 707/3 |
| 5,924,072 A * | 7/1999 | Havens | 705/1 |
| 5,948,054 A * | 9/1999 | Nielsen | 709/200 |
| 5,974,412 A * | 10/1999 | Hazlehurst et al. | 707/3 |
| 6,006,218 A * | 12/1999 | Breese et al. | 707/3 |
| 6,012,053 A * | 1/2000 | Pant et al. | 707/3 |
| 6,018,619 A * | 1/2000 | Allard et al. | 709/224 |
| 6,026,388 A | 2/2000 | Liddy et al. | |
| 6,029,195 A * | 2/2000 | Herz | 725/116 |
| 6,088,692 A | 7/2000 | Driscoll | |
| 6,154,811 A | 11/2000 | Srbljic et al. | |
| 6,167,395 A | 12/2000 | Beck et al. | |
| 6,208,998 B1 | 3/2001 | Marcus | |
| 6,317,722 B1 * | 11/2001 | Jacobi et al. | 705/14 |
| 6,330,576 B1 | 12/2001 | Mochizuki et al. | |
| 6,654,735 B1 * | 11/2003 | Eichstaedt et al. | 707/3 |

* cited by examiner

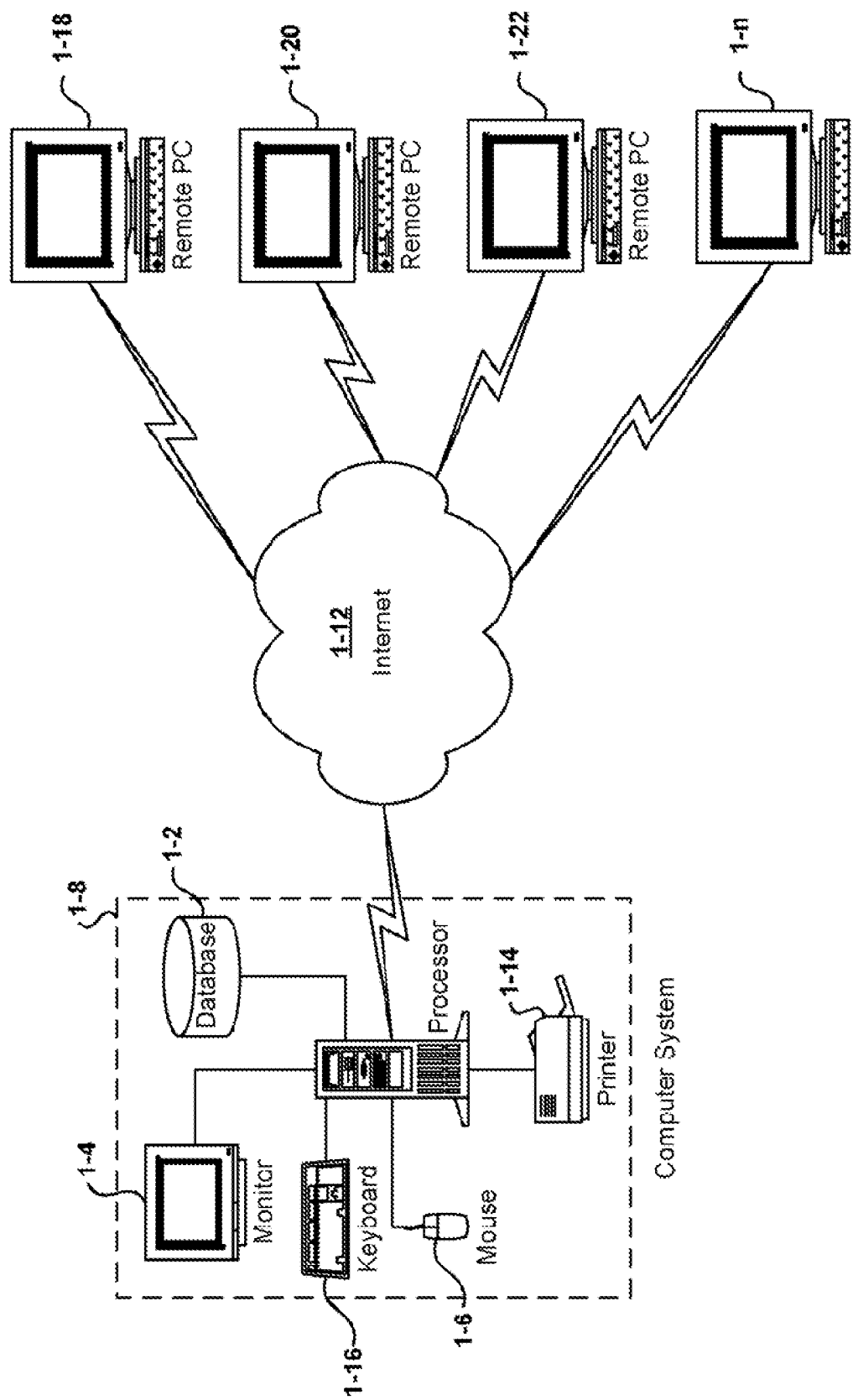
FIG. 1-A

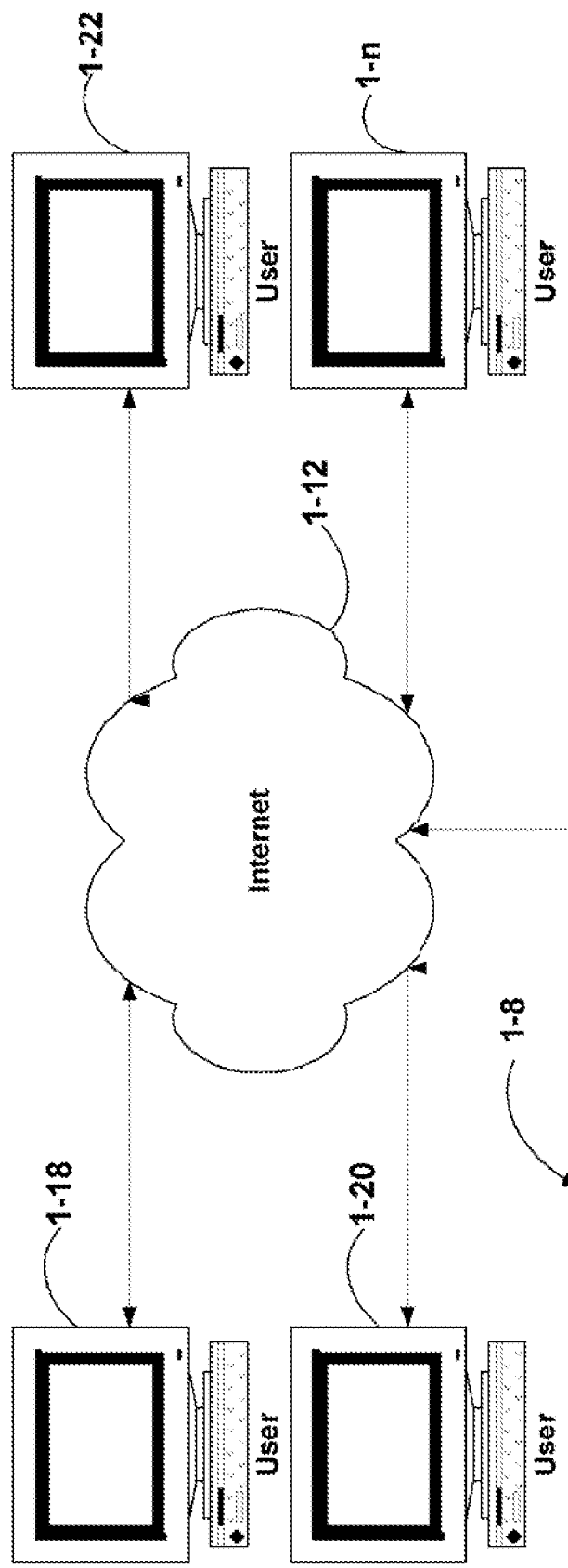
FIG. 1-B

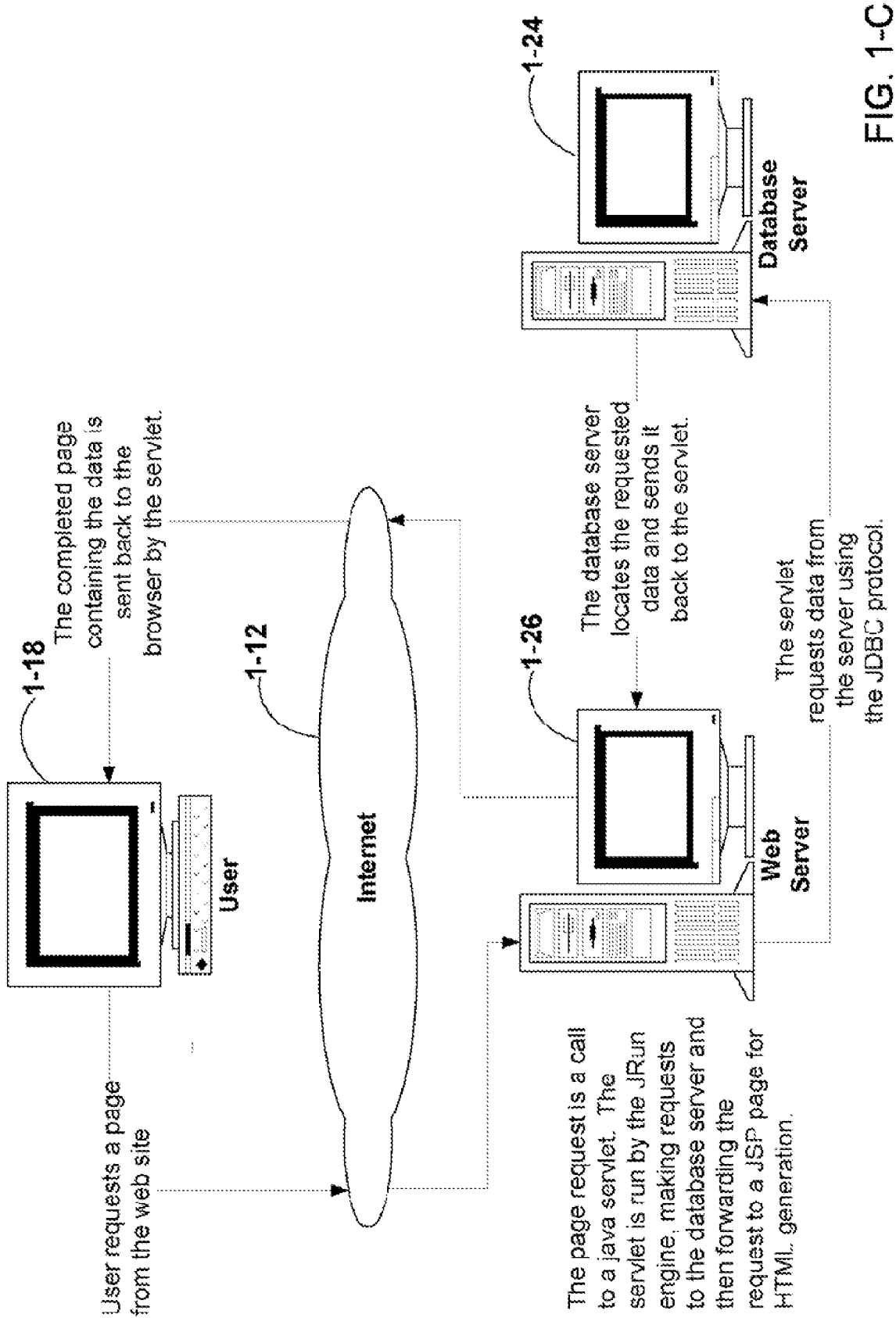
FIG. 1-C

Note 1
Locate any entries in the database that match the keywords specified. The keywords in the database are made up of the following:
+ Organization Name
+ Descriptive Words
+ Category Descriptors
+ Subject Description
The keywords that are located, must be rated greater than a given value before it qualifies as a match.

Note 2
The search logic is as follows:
Search for a subject that meets the original criteria specified, plus the following:
+ If a location field was specified, finds all subjects that are in that location, if a city was specified, check the subjects' city as well as the surrounding cities field.
+ If an appeal word was checked or entered in the free form entry box, check for subjects that have that descriptive word
+ If time or cost were specified, add these values to the selection criteria.

Note 3
Any option selected by the user will be applied in conjunction with the original criteria to further quality the results of the query.
The options presented to the user include the following:
+ Location: City, State, Zip
+ What appeals to you: A list of words selected by the system that have been used most often to describe the subjects included in the given category.
+ Free form word field: A location where the user can put a word or words that did not appear in 'What appeals to you'
+ Amount of money you would like to spend
+ Amount of time you would like to spend

FIG. 18

Search for Subjects by Keyword

Type the word(s) you want to find.
Ex: "spaghetti," "discount shoes," etc.

[            ]

Enter City, State and Country:

City: [        ]  State: [ ▼ ]  Country: [ United States ▼ ]

OR

Enter the ZIP and search radius:

ZIP Code: [        ]  Search radius: [ ▼ ]

What's this?

[ Search ]

FIG. 22

Browse Subjects by Category

Accommodations
Bed and Breakfast, Business, ...

Entertainment
Amusement Parks, Art, ...

Health, Fitness & Beauty
Alternative Medicine, Body Treatments, ...

Restaurants & Food
American, Asian, ...

Shopping
Antiques, Appliances, ...

Sights & Attractions
Art & Culture, Day Trips, ...

Sports & Recreation
Aviation, Baseball, ...

FIG. 23

Earn Points

There are so many ways to earn points. You even earn points for activity performed by others.

Points earned for your activity:
- Add a subject that is published
- Rate a subject
- Comment on a subject
- Suggest improvements
- Recruit correspondents
- Send emails to friends

Points earned for activity performed by others:
- Every time your subject is viewed
- Every time your comment is viewed

Earn higher points when you become a correspondent. Click here to learn more.

MyPage

Take a moment to customize *MyPage* so you can see when subjects are added that match your favorite things to do and places to go.

Become a Member

Please complete the following information (* indicates a required field)

Personal Information - Click here to view our Privacy Policy.

First, MI, Last Name

*E-Mail Address

*Zip / Postal Code

*Country    United States

*Date of Birth (mm/dd/yyyy)

*Gender

Account Information

*User Name    (must be between 6-20 characters)

*Password    (must be between 6-20 characters)

*Password (again)

Password Hint

Save My Password

Customize your MyPage - Get updates on your contribution and personal interests.

My Interests
A customized list of your favorite things to do and places to go.

Select 1 Category

FIG. 26-A

My Organization

You can identify any organization in our website you would like to receive updates on.

Select up to three locations:

Location 1
- City
- State
- Country: United States

Location 2
- City
- State
- Country: United States

Location 3
- City
- State
- Country: United States

My Organization - a way to stay abreast on any organization listed on our website.

Organization Name

Organization Zip/Postal Code

How did you hear about us?

If you were referred by a friend, please let us know who they are so they can receive points and recognition for their referral.

By clicking "Submit" I declare that I am at least 13 years of age, and have read and agree to the Terms of Use.

Submit

FIG. 26-B

Learn More
- View our FAQs
- View our Privacy Policy
- View our Reward Program

Become a Correspondent!

This is a Limited Exclusive Opportunity!
We are looking for real people -- just like you -- to help us create the first wordofmouth directory that enhances the way people share their knowledge on the Internet. You will be the inaugural Correspondents of this community and touch lives all over the world! As an inaugural Correspondent you will:

- Be the first to add, rate and review the content that will be published in this directory
- Earn monetary rewards for your contribution
- Earn a percentage of sponsorship revenue
- Enjoy exclusive use of the website while creating this community

Can anyone be a Correspondent?
Correspondents are selected by zip code, age and gender to ensure a full and unbiased range of subjects on our website. Correspondents must be US residents over the age of 18. This exclusive opportunity is limited to 6 per zip code.

What are other benefits of a Correspondent?
- Participate in contests and prizes
- Be recognized for your contribution
- Gain special access and benefits of our website
- Touch lives around the world
- Enjoy a fun and interesting hobby
- Customize My Page to view and keep track of your contribution
- Receive updates on the Top Rated and Best of Best subjects each month
- Receive updates on all subjects in your area each month
- Bookmark your favorite subjects

What do I have to do and how much time does it take?
Helping us manage and maintain the quality of content takes no longer than 20-30 minutes a week, and you earn points at the same time! There are 2 ways to earn points:

1. Points for your activities:

FIG. 27-A

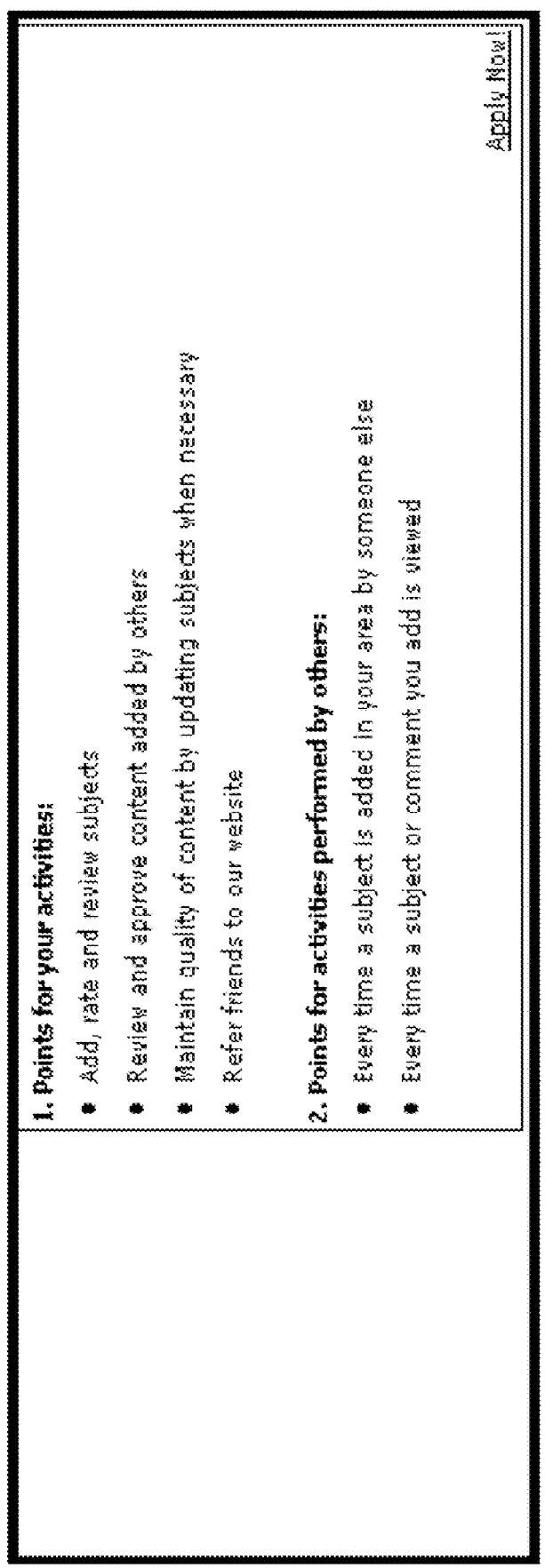
FIG. 27-B

Questions

Select Question Type [Correspondent Application ▼]

[Append]
[Insert]

New Question [                    ]

Existing Question [                    ] [Update]

Would you like to be a Correspondent for the Word of Mouth Phoenix beta site?

[Show Answers]
[Move Up]
[Move Down]
[Remove]

FIG. 29

Add a Subject  (In Zip: 20 points; Other: 20 points)

Enter Basic Information

Need help? View sample page.

Required fields are marked with an asterisk (*)

*Enter the name of the Organization offering this Subject (please be as precise as possible):

[Bicycle Showcase]

Classify this Subject: (Select at least one first-level and second-level category)

| | *First Level | *Second Level |
|---|---|---|
| Category: | Shopping ▼ | Antiques ▼ |
| Category: | Sports & Recreation ▼ | Aviation ▼ |
| Category: | ▼ | Please select a first level category ▼ |

Location of Subject: (State required for U.S. Subjects only)

*City: [Phoenix]   *State: [AZ] ▼   Region: [Northeast Valley] ▼

*ZIP Code: [85032]   Country: [United States] ▼

Need help? Look up ZIP codes here.

Surrounding Cities: [Scottsdale]
(Please separate cities with commas.)

○ Add cruise/tour locations for this subject

[Continue]

Helpful Hints

Adding a subject is easy! It takes only a few minutes!

Earn Bonus Points!
If your subject is already added, earn bonus points for rating and adding your comments!

please see our FAQs for more help.

FIG. 31

Helpful Hints

Describing the Subject:
- The summary acts as a "title" for the subject
- The essence helps to describe the heart of the subject

Cost Examples:
$0 to $0 for free; $10-$50;
$225-$1250; $3,000-$5,000

Time Examples:
30-60 mins; 3-4 hrs; 5-7 days;
1-2 weeks; 1-3 months

Availability Examples:
Open during Jan, Feb Mar; From 1/1/01 - 3/1/01

Comments are helpful for adding more detailed information please see our FAQs for more help.

---

Add a Subject
Enter Subject Information

Organization Name: Bicycle Showcase

Required fields are marked with an asterisk (*)    Need help? View sample page.

*Enter a short title for this Subject.
[Superb full service Trek and Gary Fisher bike dealer]

*Enter a one-sentence summary of this Subject (see left column for examples).
[Two locations providing outstanding sales and service on all types and sizes of bikes with experienced knowledgeable sales and service staff.]

Street address: [3102 E. Cactus Phoenix AZ]

Subject phone number: [602-971-0730]

Subject e-mail address: [          ]

How much does it cost? from: [    ] to: [    ] U.S. dollars
Comments: [Reasonable prices on all types of repairs]

How long does it take? from: [    ] to: [    ] [Minute(s) ▼]
Comments: [          ]

Is it family-oriented? ⊙ Yes  ○ Somewhat  ○ No
Comments: [          ]

FIG. 32

Add a Subject
Enter Subject Information

Organization Name: Bicycle Showcase
Description: Superb full service Trek and Gary Fisher bike dealer Would you like to add your own words? Add them here!

*Select at least 8 words that describe the subject (required).*

Need help? View sample page.

| | | | | | |
|---|---|---|---|---|---|
| ☐ Ballooning | ☐ Hang Gliding | ☐ Helicopter | ☐ Location | | |
| ☐ Parachuting | ☑ Reliability | ☑ Selection | ☐ Service | | |
| ☐ Shows | ☑ Value | ☐ 1940'S | ☐ 1950'S | | |
| ☑ Advanced | ☐ Adventurous | ☐ Affordable | ☐ Affordable | | |
| ☐ Air Field | ☐ Air Show | ☐ Aircraft | ☐ American | | |
| ☐ Ancient | ☐ Antiques | ☐ Appraisals | ☐ Armoire | | |
| ☐ Art | ☐ Asian | ☐ Auction | ☑ Authorized Dealers | | |
| ☐ Awesome | ☐ Beginner | ☐ Best | ☐ Biplane | | |
| ☐ Blown Glass | ☐ Books | ☐ Breathtaking | ☐ Cameras | | |
| ☐ Captivating | ☐ Catalogue | ☐ Challenging | ☐ China | | |
| ☐ Classic | ☐ Clinics | ☐ Clock | ☐ Clothing | | |
| ☐ Clubs/Organizations | ☐ Coffee Table | ☐ Collectibles | ☐ Collection | | |
| ☐ Costume Jewelry | ☐ Country French | ☑ Craftsmanship | ☐ Crystal | | |
| ☐ Daring | ☐ Dealers | ☐ Delightful | ☐ Difficult | | |
| ☐ Display Cases | ☐ Distinctive | ☐ Distributor | ☐ Dollhouses | | |
| ☐ Easy | ☐ Energizing | ☐ Enjoyable | ☐ Entertaining | | |
| ☐ Estate | ☐ European | ☐ Events | ☐ Exceptional | | |
| ☐ Exciting | ☐ Exclusive | ☐ Facilities | ☐ Famous | | |

FIG. 33

| Field | Value |
|---|---|
| Opinion multiplier for "no experience" | 0.75 |
| Opinion multiplier for "experienced" | 1 |
| Minimum words selected in "Add" process | 8 |
| Minimum words on Add | 25 |
| Notify Sponsor of Add | ☐ |
| Maximum descriptive words to display | 50 |
| Maximum appeal words on search | 50 |
| Maximum descriptive words on Add | 100 |
| Maximum descriptive words on Rate | 50 |
| Maximum descriptive words on Rate More | 150 |
| Minimum cash out amount | 50000 |
| Credit card cash out | ☐ |
| Minimum rating score | 1 |
| Best of best cut-off | 4.50 |

| | |
|---|---|
| Number of months to keep opinions | 9 |
| Number days before delete | 3 |
| Number of days between ratings | 30 |
| Subject lock expiration (minutes) | 10 |
| Maximum reserve time (hours) | 1 |
| Minimum Correspondent score | 1 |
| Performance threshold (percent) | |
| Subject quality cut-off | 1 |
| Comment quality cut-off | 1 |
| Opinion multiplier for "slightly qualified" | 0.80 |
| Opinion multiplier for "somewhat qualified" | 1 |
| Opinion multiplier for "very qualified" | 1.20 |

System Parameters

FIG. 37

How would you describe this subject? (earn 5 points)

| Descriptive Words | Importance | | | | | | Descriptive Words | Importance | | | | | |
|---|---|---|---|---|---|---|---|---|---|---|---|---|---|
| | Extremely | Very | Important | Somewhat | Slight | Not Rated | | Extremely | Very | Important | Somewhat | Slight | Not Rated |
| Accessories | ○ | ○ | ○ | ○ | ○ | ◉ | Helpful | ○ | ○ | ○ | ○ | ○ | ◉ |
| Bathing Suits | ○ | ○ | ○ | ○ | ○ | ◉ | Housewares | ○ | ○ | ○ | ○ | ○ | ◉ |
| Bicycling | ○ | ○ | ○ | ○ | ○ | ◉ | Huge Inventory | ○ | ○ | ○ | ○ | ○ | ◉ |
| Bmx | ○ | ○ | ○ | ○ | ○ | ◉ | Interior Design | ○ | ○ | ○ | ○ | ○ | ◉ |
| Children | ○ | ○ | ○ | ○ | ○ | ◉ | Knowledgeable | ○ | ○ | ○ | ○ | ○ | ◉ |
| Clothing | ○ | ○ | ○ | ○ | ○ | ◉ | Large Sizes | ○ | ○ | ○ | ○ | ○ | ◉ |
| Coffee Table | ○ | ○ | ○ | ○ | ○ | ◉ | Location | ○ | ○ | ○ | ○ | ○ | ◉ |
| Collectibles | ○ | ○ | ○ | ○ | ○ | ◉ | Memory Albums | ○ | ○ | ○ | ○ | ○ | ◉ |
| Collection | ○ | ○ | ○ | ○ | ○ | ◉ | Novelty | ○ | ○ | ○ | ○ | ○ | ◉ |
| Competitive | ○ | ○ | ○ | ○ | ○ | ◉ | Off Road | ○ | ○ | ○ | ○ | ○ | ◉ |

FIG. 38-A

| | | | | | |
|---|---|---|---|---|---|
| Costume Jewelry | O O O O | ● | Outdoor | O O O O | ● |
| Costumes | O O O O | ● | Pens | O O O O | ● |
| Designer Furniture | O O O O | ● | Personal Lifestyle | O O O O | ● |
| Designer Labels | O O O O | ● | Popular | O O O O | ● |
| Discriminating Taste | O O O O | ● | Reputable | O O O O | ● |
| Educational | O O O O | ● | Resource | O O O O | ● |
| Excellent Service | O O O O | ● | Scrapbooking | O O O O | ● |
| Exceptional | O O O O | ● | Selection | O O O O | ● |
| Exclusive | O O O O | ● | Service | O O O O | ● |
| Family | O O O O | ● | Shoes | O O O O | ● |
| Friendly | O O O O | ● | Specialty | O O O O | ● |
| Fun | O O O O | ● | Trendy | O O O O | ● |
| Gardening | O O O O | ● | Value | O O O O | ● |
| Gifts | O O O O | ● | Variety | O O O O | ● |
| Glassware | O O O O | ● | Worthwhile | O O O O | ● |

Need more words to describe the subject? Look up more words.

FIG. 38-B

Figure 39:
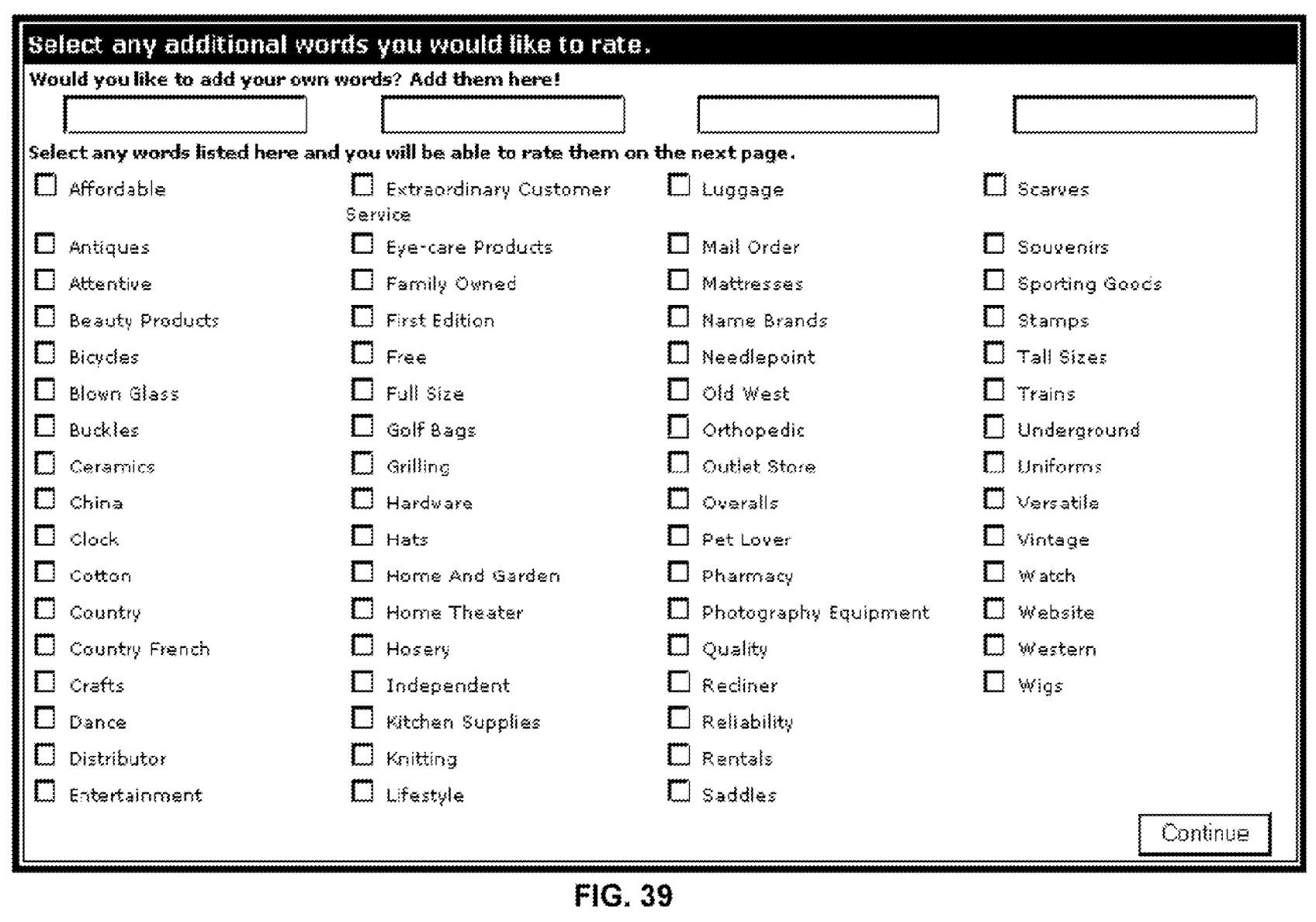

Select any additional words you would like to rate.

Would you like to add your own words? Add them here!

Select any words listed here and you will be able to rate them on the next page.

| | | |
|---|---|---|
| ☐ Affordable | ☐ Extraordinary Customer Service | ☐ Luggage | ☐ Scarves |
| ☐ Antiques | ☐ Eye-care Products | ☐ Mail Order | ☐ Souvenirs |
| ☐ Attentive | ☐ Family Owned | ☐ Mattresses | ☐ Sporting Goods |
| ☐ Beauty Products | ☐ First Edition | ☐ Name Brands | ☐ Stamps |
| ☐ Bicycles | ☐ Free | ☐ Needlepoint | ☐ Tall Sizes |
| ☐ Blown Glass | ☐ Full Size | ☐ Old West | ☐ Trains |
| ☐ Buckles | ☐ Golf Bags | ☐ Orthopedic | ☐ Underground |
| ☐ Ceramics | ☐ Grilling | ☐ Outlet Store | ☐ Uniforms |
| ☐ China | ☐ Hardware | ☐ Overalls | ☐ Versatile |
| ☐ Clock | ☐ Hats | ☐ Pet Lover | ☐ Vintage |
| ☐ Cotton | ☐ Home And Garden | ☐ Pharmacy | ☐ Watch |
| ☐ Country | ☐ Home Theater | ☐ Photography Equipment | ☐ Website |
| ☐ Country French | ☐ Hosiery | ☐ Quality | ☐ Western |
| ☐ Crafts | ☐ Independent | ☐ Recliner | ☐ Wigs |
| ☐ Dance | ☐ Kitchen Supplies | ☐ Reliability | |
| ☐ Distributor | ☐ Knitting | ☐ Rentals | |
| ☐ Entertainment | ☐ Lifestyle | ☐ Saddles | |

Add a Subject
Preview your Subject

Organization Name: Bicycle Showcase
Description: Superb full service Trek and Gary Fisher bike dealer Congratulations! This is how your subject will be viewed once approved!

Click "Approve" to submit, or use the "Edit" buttons to make changes.

[Approve]

Superb full service Trek and Gary Fisher bike dealer Edit Bicycle Showcase Edit 602-972-0730
3102 E. Cactus Phoenix, AZ
Edit
Phoenix, AZ 85032 United States Edit
Northeast Valley

Estimated Time: Edit
Estimated Cost:
Family Oriented: Yes
Availability: All Year
View details...

Comments(1) Edit

12/21/00     Great Selection for All Levels

Description Edit

Two locations providing outstanding sales and service on all types and sizes with experienced and knowledgeable sales and service staff

Information Provided By Our Users

| Member Ratings(1) | Edit |
|---|---|
| Overall Rating | |
| Important Words | |
| Bicycling (1) | 5.00 |
| Bmx (1) | 5.00 |
| Competitive (1) | 5.00 |
| Knowledgeable (1) | 5.00 |
| Location (1) | 5.00 |

FIG. 41-A

Competitive (1) 5.00
Knowledgeable (1) 5.00
Location (1) 5.00
Off Road (1) 5.00
Outdoor (1) 5.00
Reputable (1) 5.00
Shoes (1) 5.00
Specialty (1) 5.00
Value (1) 5.00
Family (1) 4.00

Comments( 1 )
Edit
12/21/00    Great Selection for All
            Levels

Special Instructions Edit

Time Required: Edit

Estimated Cost: Edit

When Available: All Year Edit
Open seven days per weeks except holidays.

Classifications Edit
Shopping > Specialty Stores; Sports & Recreation > Cycling

FIG. 41-B

Add your rating, click on the subject below!

Page 1 of 1 << Previous 1 Next >>
Didn't find what you were looking for? Add it now!

Click here to try a *new search* or *refine your search*.

| Summary/Location | Top Rated Words | | |
|---|---|---|---|
| Hike, Bike, Blade A 12 mile Greenbelt of interconnected Parks on Indian Bend from Shea to McKellips. You can even go all the way to Tempe town lake Indian Bend Wash Scottsdale, AZ 85254 United States | Adventure Biking Trails Fun | 5.00 5.00 5.00 | Bicycling Children Pets Welcome | 5.00 5.00 5.00 |
| Superb full service Trek and Gary Fisher bike dealer Two locations providing outstanding sales and service on all types and sizes with experienced and knowledgeable sales and service staff Bicycle Showcase Phoenix, AZ 85032 United States, Northeast Valley | Bicycling Competitive Outdoor | 5.00 5.00 5.00 | Bmx Location Shoes | More Info 5.00 5.00 5.00 |
| Mountain bike through Thunderbird Park Ride your mountain bike on the desert trails through Thunderbird Park. Glendale Bicycle Program Glendale, AZ 85301 United States, Northwest Valley | Biking Free Great Workout | 5.00 5.00 5.00 | Enjoyable Great Location/place Trails | 5.00 5.00 5.00 |
| Great Bike Ride If you're not into centuries(100 miles for non bikers) or just want a nice 15 -20 mile ride, try around the new Tempe Town Lake and Scottsdale Park. City of Tempe Tempe, AZ 85283 United States | Bicycling Great Location/place Great Workout | 5.00 5.00 5.00 | Facilities Free Beginner | 5.00 5.00 4.00 |
| Hilly and Popular Bike Ride If you think Phoenix is all flat and you either want the challenge of a hilly ride or are trying to get in shape-by Bartlett Lake. City of Carefree Carefree, AZ 85254 United States | Bicycling Demanding Free | 5.00 5.00 5.00 | Challenging Great Workout Desert | 5.00 5.00 4.00 |

Page 1 of 1 << Previous 1 Next >>

Special Instructions
For more information contact Susan Bookspan Bicycle Program, Room 333 5850 W Glendale AVE Glendale, AZ 85301

Time Required: 30 min to 90 min

Estimated Cost: $0-0
Free

Family Oriented: Somewhat

When Available: All Year

Classifications
Sports & Recreation > Cycling; Sports & Recreation > Mountain

FIG. 43-B

Search by Category: Sports & Recreation

Aviation (1)
Baseball (7)
Basketball (1)
Billiards (2)
Boating (2)
Bowling (2)
Boxing (0)
Camping (7)
Climbing (2)
Cricket (0)
Cycling (6)
Equestrian (4)
Extreme (0)

Fishing (4)
Football (2)
Golf (38)
Gymnastics (2)
Hiking n' Walking (40)
Hockey (3)
Hunting (0)
Martial Arts (1)
Motor Sports (0)
Mountain (5)
OTHER (4)
Racing (5)
Rodeo (0)

Rugby (0)
Running (0)
Sightseeing (4)
Skating (4)
Skiing (4)
Soccer (1)
Tennis (0)
Tours (1)
Track & Field (0)
Volleyball (0)
Water (5)
Winter (0)
Wrestling (0)

*All

FIG. 44

Personalize your search!

You searched for: Sports & Recreation > Cycling

Please complete as many of the fields below as you wish. The more sections you complete, the more exact your search results will be.

Where do you want to search?

Enter a City and/or State and/or Country:

City: [ ]   State: [ ▼ ]   Country: [ United States ▼ ]

OR

Enter the Zip Code and search radius:

Zip Code: [ ]   Search Radius: [ ▼ ]
(distance from center of Zip Code)

What appeals to you?
(Choose as many words as you'd like)

| | | |
|---|---|---|
| ☐ Adventure | ☐ Facilities | ☐ Races |
| ☐ Affordable | ☐ Favorite | ☐ Relaxing |
| ☐ Beginner | ☐ Free | ☐ Retailers |
| ☐ Bicycling | ☐ Gays & Lesbians | ☐ Sanctuary |
| ☐ Biking | ☐ Great Experience | ☐ Scenic |
| ☐ Biking Trails | ☐ Great Location/place | ☐ Secluded |
| ☐ Cactus | ☐ Great Workout | ☐ Tandem |
| ☐ Challenging | ☐ Hiking | ☐ Thrilling |
| ☐ Clubs/Organizations | ☐ Hiking Trails | ☐ Trails |
| ☐ Demanding | ☐ Inexpensive | ☐ Unicycling |

FIG. 45-A

☐ Demanding ☐ Inexpensive ☐ Unicycling
☐ Desert ☐ Mountain ☐ Views
☐ Enjoyable ☐ Natural Beauty ☐ Wildlife
☐ Equestrian Trails ☐ Off Road
☐ Escape ☐ Peaceful Add more words to the search by entering them below, separating words/phrases with commas.
Example: Big burger, deli, hiking trails, etc.

[            ]

How much do you want to spend on this Subject?
(Enter $0 in both boxes for free subjects)

from: $[      ] to: $[      ] U.S. dollars

How much time do you have to spend on this Subject?

[      ] [Minute(s) ▼]

What appeals to you?
(Choose as many words as you'd like)

- ☐ Adventure
- ☐ Affordable
- ☐ Beginner
- ☐ Bicycling
- ☐ Biking
- ☐ Biking Trails
- ☐ Cactus
- ☐ Challenging
- ☐ Clubs/Organizations
- ☐ Demanding
- ☐ Desert
- ☐ Enjoyable
- ☐ Equestrian Trails
- ☐ Escape

- ☐ Facilities
- ☐ Favorite
- ☐ Free
- ☐ Gays & Lesbians
- ☐ Great Experience
- ☐ Great Location/place
- ☐ Great Workout
- ☐ Hiking
- ☐ Hiking Trails
- ☐ Inexpensive
- ☐ Mountain
- ☐ Natural Beauty
- ☐ Off Road
- ☐ Peaceful

- ☐ Races
- ☐ Relaxing
- ☐ Retailers
- ☐ Sanctuary
- ☐ Scenic
- ☐ Secluded
- ☐ Tandem
- ☐ Thrilling
- ☐ Trails
- ☐ Unicycling
- ☐ Views
- ☐ Wildlife Add more words to the search by entering them below, separating words/phrases with commas.
Example: Big burger, deli, hiking trails, etc.

Speak your mind!
- Earn cash & prizes
- Share your advice
- Publish your ideas
- Recommend a favorite
- Rate a Subject Join now!

Add your 2 cents!
Add your 2 cents to this subject.
Click here.

Sponsor this Subject
Find out how Word of Mouth can help your business.

Become a Sponsor!

Would you like the organization to offer more information?

Yes

FIG. 47

Enter your Organization's Information

Please complete the following (* indicates a required field)     Need Help?  View Sample Page

*Organization Name: Bicycle Showcase

*Address 1: 3102 E. Cactus

Address 2:

*City, State, Zip/Postal Code: Phoenix  AZ ▼  85032

*Country: United States ▼

*Phone: 602-991-0730

Fax: 602-494-1364

Web Site URL: www.bicycleshowcase.com

FIG. 48-A

Administrative Contact *(for billing purposes)*

| Field | Value |
|---|---|
| *First Name | Richard |
| Initial | W |
| *Last Name | Hill |
| Title | |
| *E-Mail | rwhill@home.com |
| *Address 1 | 3102 E. Cactus |
| Address 2 | |
| *City, State, Zip/Postal | Phoenix, AZ, 85032 |
| *Country | United States |
| *Phone | 602-991-0730 |
| Fax | 602-494-1364 |

Sponsor a Subject – Step 2
Enter Logo, Web Links and Other Sponsorship Information for:
Superb full service Trek and Gary Fisher bike dealer View Sample Page All required fields are marked with a *
*Name of Organization for Display on Sponsorship Page (also used in keyword searches)

Platinum III

Attach Your Logo: [_____] Browse...  Help

Enter Address and Phone Number of subject Help
Address: 3102 E. Cactus Phoenix AZ
City, State, Zip: Phoenix  AZ  85032
Country: United States
Phone Number: 602-971-0730

Provide an Image and Summary for this Subject
Attach Image: C:\My Documents\My Pictur  Browse...  Help
*Summary of Subject:
We carry a full line of bikes including the new Trek Fuel 100.

---

Sponsor your Subject in Five Easy Steps!

Sponsorship Steps:
1. Sponsor your subject
2. Add Logo and Web Links ←
3. Add Custom Information
4. Review & Approve
5. Billing Summary and Checkout

Helpful Hints

Attaching images and text
· Images should be a .gif or .jpg
· Use text from subjects you already sponsored by clicking on a subject below and use copy and paste!

Need Help? View and Print Detailed Instructions
Have more questions?
View our FAQs

FIG. 49-A

Add a link to your website - Enter your URL address Help
Website URL:
[www.bicycleshowcase.com]

Provide "Special Offers" to visitors of your site Help
Text for link should read:
[Internet Special]

Describe the "Special Offers" that can be easily printed and redeemed at your location

[Mention this offer and receive $5 off your next complete tune up.]

Let your visitors contact you via email directly Help
Text for link should read:
[Contact Us]

Enter information for the person who will receive inquiries for this subject.

E-Mails sent to:
☑ Same as Administrative Contact

Enter New E-Mail Contact Information

*First Name: Richard

Initial: W

*Last Name: Hill

Title:

*E-Mail: rick@womone.com

Sponsor a Subject – Step 3
Choose up to 10 Customized Sections with Pictures and Detail Information Customized Section 1

Title:

◉ Use Standard Title: [ Hours of Operation ▼ ]   (select 1 for each section)

○ Use Custom Title: [                    ]

Section Text: (detailed information you want to provide your visitors about this feature)

```
Monday through Friday 10AM to 7PM
Saturday              10AM to 5PM
Sunday                11AM to 4PM
```

[ ◀                      ▶ ]

View Sample Page

[ Move Up ]  [ Move Down ]

Special Instructions

Time Required:

Estimated Cost:

Family Oriented: Yes

When Available: All Year
Open seven days per weeks except holidays.

Classifications
Shopping > Specialty Stores; Sports & Recreation > Cycling

FIG. 51-C

Sponsor a Subject – Step 5
Payment Information

Billing Summary:

The following will be billed to your credit card:

One-time sponsorship fee      $10.24
Superb full service Trek and G $5.12
Total                         $15.36

Please enter your payment information below:

All required fields are marked with a *

*Credit Card Type: [Visa ▼]

*Card Number: [xxxxxxxxxxxxxxxx]

*Expiration Date (mm/yyyy): [02] / [03]

*Name on Card: [Bicycle Showcase]

[Purchase Sponsorship]

---

Sponsor your Subject in Five Easy Steps!

Sponsorship Steps:
1. Sponsor your subject
2. Add Logo and Web Links
3. Add Custom Information
4. Review & Approve
5. Billing Summary and Submit ▶

Helpful Hints
1. Credit card will be automatically billed each month
2. Confirmation will be emailed to you once transaction is complete
3. Print out confirmation for your files
4. All transactions are secured. If you have questions on security, please view our Privacy Policy Have more questions?
View our FAQs

Specialty (1) 5.00
Reputable (1) 5.00
Off Road (1) 5.00
Knowledgeable (1) 5.00
Family (1) 4.00

Map/Directions
Our Scottsdale store is located at 7229 E. Shea in the Windmill Plaza. Our Phoenix store is located at 3102 E. Cactus, just west of the Squaw Peak freeway.

Special Instructions

Time Required: Unknown

Estimated Cost: Unknown

Family Oriented: Yes

When Available: All Year
Open seven days per weeks except holidays.

Classifications
Shopping > Specialty Stores; Sports & Recreation > Cycling

Suggest your own improvement!

All required fields are marked with a *

Please select a Priority, Reason, and Basis for your suggestion.

*Priority   *Reason         *Basis
-Select One-  -Select One-   -Select One-

*Suggestions/Feedback:

☐ please send me an e-mail with the outcome of my suggestion.

rick@womone.com

Submit   Cancel

FIG. 56

Womp Correspondent 1's MyPage

November 10, 2000

Status: - 12345
Total lives touched: 381

My Contributions
A detailed view of your activity.

Subjects Added                      220 lives touched
Comments Added                      161 lives touched
Subjects Awaiting Approval
Rejected Subjects

My To Do List:
A way to earn points by reviewing and approving content before it's published.

Improve Your Sponsor Page(s)
Notify Organizations about subjects you added (earn 20 points each)

In your zip code:
Review subjects added (200 points each)
Review suggested improvements (200 points each)
Review subjects recommended for deletion (200 points each)

In all zip codes:
Review subjects added (200 points each)
Review suggested improvements (200 points each)
Review subjects recommended for deletion (200 points each)
Notify organizations for subjects added (20 points each)

FIG. 57-A

My Favorite Subjects (manage favorites)
*The perfect place to store your favorite subjects.*

| Accommodations(0) | Community Services(0) | Entertainment(0) |
| Fitness and Beauty(2) | Learning Opportunities(0) | New Folder(0) |
| Restaurants(3) | Shopping(1) | Sightseeing and Attractions(0) |
| Sports Bars(2) | Sports and Recreation(0) | |

My Interests [Restaurants, Chandler, AZ] (modify my profile)
*A customized list of your favorite things to do and places to go.*

What's Hot for Restaurants in Chandler, AZ
Recently Added Subjects for Restaurants in Chandler, AZ
All Subjects in Chandler, AZ
Best of Best in Chandler, AZ

My Organization [Tomasos , ] (modify my profile)
*A way to stay abreast on any organization listed on our website.*

View all Subjects

My Rewards
*A detailed summary of your contribution and points earned.*

Points Earned         104,520
Account Balance       $ 430

FIG. 57-B

Womp Correspondent 1's Subjects in [All ▼] Filter by: [All ▼]

Earn Points - Click on any subject to rate & review. Click on Lives Touched or Comments to view details.

Page 1 of 2 << Previous 1 2 Next >>

| Summary/Location | Lives Touched | Comments | Awards Won |
|---|---|---|---|
| availability test 2<br>availability test 2<br>Phoenix, AZ 12345 United States, | | | |
| meg's test2 | 6 | 1 | 0 |
| great<br>my org<br>New York, NY 67890 United States, | 6 | 1 | Sponsored 0 |
| test bug #686, #675 on staging<br>test bug #686, #675 on staging<br>Miami, FL 12345 United States, | 6 | 1 | Sponsored 0 |
| nice try | 7 | 1 | Sponsored 0 |
| good<br>fantastic org<br>Buffalo, NY 67890 United States, | | | |
| another test sub 2 | 3 | 1 | Sponsored 0 |
| test sub waiting approval 2<br>test subject 2<br>Miami, FL 12345 United States, | | | |
| Llama Trek the Smokies<br>Trek through the ecologically rich environment of an ancient sierra, the Smoky Mountains. Llamas are tireless fuzzy station wagons that bear the substantial weight of camping gear and dining supplies.<br>Windsong Llama Treks | 10 | 1 | Sponsored 0 |

FIG. 59

Womp Correspondent 1's Comments

Filter By: All

Earn Points - Click on any subject to rate & review. Click on Comment Title to view details.

Page 1 of 10 << Previous 1 2 3 4 Next >>

| Comment Title | Summary/Location | Lives Touched | Rated Useful |
|---|---|---|---|
| skiing is fun<br>corr1 womp<br>22<br>I like to ski, and New York is one of the best places to ski... | Skiing Down Chair 16<br>Mount Snow<br>New York, NY 12345 United States, North | 8 | 100% |
| a great hike<br>corr1 womp<br>22<br>filled with nature and a spectacular view... | Highline Trail deep forest hiking<br>Tonto National Forest<br>Christopher Creek, AZ 85541 United States, Southwest | 0 | not rated |
| A great hike<br>corr1 womp<br>22<br>filled with nature and a spectacular view... | Highline Trail deep forest hiking<br>Tonto National Forest<br>Christopher Creek, AZ 85541 United States, Southwest | 0 | not rated |
| testing the comment<br>quality assurance and football | this is the test subject one<br>Jape Wisteria Productions<br>San Luis Rey, AK 12345 United States, Centre | 1 | not rated |
| corr1 womp<br>22 | American football<br>Gregory Inc.<br>New York, NY 54321 United States, | 2 | not rated |
| never mix!!<br>Additional information<br>corr1 womp<br>22<br>food is nutricious and wonderful...try it sometime... | poughkeepsie has good food<br>jape wisteria productions<br>Poughkeepsie, NY 12345 United States, Centre | 0 | not rated |

FIG. 62

Womp Correspondent 1's Subjects Awaiting Review by: [All ▼]

Click Edit to make final modifications before review. Click Delete to remove a subject before review.

Page 1 of 2 << Previous 1 2 Next >>

| Summary/Location | Detail Information | Date Submitted |
|---|---|---|
| poughkeepsie has good food<br>poughkeepsie has really good food. What's interesting about this is that most places have good food. So maybe this isn't really exceptional at all... | Cost: $1-1<br>Time: 1 min to 1 min<br>Family: Yes | 10/25/2000<br>New<br>Edit<br>Delete |
| jape wisteria productions<br>Poughkeepsie, NY 12345<br>United States Centre | | |
| test bug # 281<br>test bug # 281<br>Miami, FL 12345<br>United States | Cost:<br>Time:<br>Family: | 10/26/2000<br>New<br>Edit<br>Delete |
| testing really long text descriptions<br>descriptions testing really long text descriptions testing really long text descriptions testing really long text descriptions testing really long... | Cost: $5555-5555<br>Time: 5 mon to 222 mon<br>Family: Somewhat | 10/27/2000<br>New<br>Edit<br>Delete |
| Jape Wisteria Productions<br>Tronna, AK 12345<br>United States Centre | | |
| Beautiful fresh flowers<br>Fresh flowers of all types | Cost: $2-200<br>Time: 5 min to 10 min<br>Family: Yes | 10/30/2000<br>New<br>Edit<br>Delete |
| Rosies Florist Service<br>Buffalo, NY 90210<br>United States | | |
| Hotel Motel Phoenix Arizona Airport<br>The place to be for being close to the airport | Cost: $55-75<br>Time: 1 day to 3 day<br>Family: Yes | 10/30/2000<br>New<br>Edit<br>Delete |
| Holiday Inn Express<br>Phoenix, AZ 85035<br>United States Southwest | | |

FIG. 63

Wamp Correspondent 1's Rejected Subjects

Click on Edit to modify your subject for re-submission. Click on Delete to remove this subject.

| Summary/Location | Reason for Rejection | Date Submitted |
|---|---|---|
| There are currently no subjects to view. | | |

FIG. 64

My To Do List:
A way to earn points by reviewing and approving content before it's published.

Improve Your Sponsor Page(s)
Notify Organizations about subjects you added (earn 20 points each)

In your zip code:
Review subjects added (200 points each)
Review suggested improvements (200 points each)
Review subjects recommended for deletion (200 points each)

In all zip codes:
Review subjects added (200 points each)
Review suggested improvements (200 points each)
Review subjects recommended for deletion (200 points each)
Notify organizations for subjects added (20 points each)

FIG. 65

Notify Organizations You Added All

Earn more points - check out organizations waiting review in other categories

Page 1 of 1 << Previous 1 Next >>

| Summary/Location | Top Rated Words | Detail Information | |
|---|---|---|---|
| availability test 1 | | | Notify |
| availability test Miami, FL 12345 United States, | Chinese Songs<br>Spoiled<br>Zero<br>Barbeque | 5.00 Cost:<br>5.00 Time:<br>5.00 Family:<br>4.25 | |
| Primate Research Research social and family structure, distribution, and abundance of free-ranging dolphins, primates, and manatees, amongst many other adventurous expeditions | Exhilarating<br>Rewarding<br>Scientific<br>Swimming Skills | 5.00 Cost: $280-2190<br>5.00 Time: 1 wk to 1 wk<br>5.00 Family: No<br>5.00 | Notify |
| Oceanic Society Expeditions San Francisco, CA 94123 United States, Northwest | | | Notify |

FIG. 66

Notify Organization (Value = 20 points each)

Breathtaking scenic drive
Breathtaking scenic drive

Globe, AZ 85254 United States
Southwest

Added 10/30/00 by member Longtallsally

Add to My Favorites
Maintain This Subject
Address and Telephone Look-
up

5 Easy Steps
1. Enter Contact information
2. Select letter
3. Personalize (optional)
4. Check for spelling
5. Submit Your e-mail will contain a link
back to this subject for review by
organization.

View our FAQs

Please enter the following information to earn (xx) points.

Need help? View sample.

Contact Person Information (Type in Owner or Manager if you do not know person's name)

*First Name
Middle Initial
Last Name
*Email Address
Website Address

Select one Email letter to notify the organization. You can personalize this email by adding
your own message once the letter you select is displayed below.

○ Notify Organization
○ Notify Organization

Cancel  Submit

FIG. 67

Subjects Added - All Areas [All ▼]  Value = 200 Points Each

Earn more points - check out subjects waiting review in other categories.

Page 1 of 1 << Previous 1 Next >>

| Summary/Location | Detail Information | | Date Submitted |
|---|---|---|---|
| See the Old Southwest<br>This 7 day tour of the old Southwest covers historical sites covered by cowboys, indians and the tuscaderos of another age<br>Southwest Tour Company<br>Phoenix, AZ 85018 United States, Southwest | Cost:<br>Time:<br>Family: | $500-1000<br>5 day to 1 wk<br>Somewhat | 11/13/2000<br>New<br>Review |
| Up-to-date Seasonal Candles<br>This place is the perfect place to find gifts for candle lovers. Their inventory is set by the seasons so you will always find new and exciting things to buy<br>Illuminations<br>Scottsdale, AZ 85020 United States, Southwest | Cost:<br>Time:<br>Family: | $15-50<br>20 min to 30 min<br>Somewhat | 11/13/2000<br>New<br>Review |
| Great Discount Gifts<br>If you're looking for a place to do gift or holiday shopping on a budget, you have to check this indoor swap meet out<br>Indoor Swap Meet<br>Phoenix, AZ 85010 United States, Southwest | Cost:<br>Time:<br>Family: | $5-100<br>1 hr to 2 hr<br>Yes | 11/13/2000<br>New<br>Review |

FIG. 68

Subject Added – Waiting Review

Carefully review this subject to ensure it meets our acceptance criteria

| Reject Subject | Approve Subject |

Superb full service Trek and Gary Fisher bike dealer
Bicycle Showcase
602-971-0730
3102 E. Cactus Phoenix, AZ
Phoenix, AZ 85032 United States
Northeast Valley Added 12/21/00 by member Sponsor1

FIG. 69

Suggested Improvements – in 12345 [All ▼] Value = 200 points each

Earn more points - check out subjects waiting review in other categories

Page 1 of 1 << Previous 1 Next >>

| Summary/Suggestion/Location | Justification | Date Submitted |
|---|---|---|
| testbug # 797<br>qerf | | 11/09/2000 |
| testbug # 797<br>Maimi, FL 12345<br>United States | Priority: Extreme<br>Reason: Incomplete<br>Basis/Role: Reliable Source | Review |

Page 1 of 1 << Previous 1 Next >>

FIG. 70

FIG. 71-A

| Member Ratings(1) | Edit | |
|---|---|---|
| Overall Rating | | |
| Important Words | | |
| Easy (1) | | 5.00 |
| Enjoyable (1) | | 5.00 |
| Fresh (1) | | 5.00 |
| Friendly (1) | | 5.00 |
| Relaxed (1) | | 5.00 |

Time Required: 5 min to 10 min Edit

Estimated Cost: $2-200 Edit

When Available: All Year Edit

| | |
|---|---|
| Estimated Time: | 5 min to 10 min |
| Estimated Cost: | $2-200 |
| Family Oriented: | Yes |
| Availability: | All Year |
| View details... | |

| Comments(1) | |
|---|---|
| Edit | |
| 10/30/00 | Fresh |

FIG. 71-B

Rick's Points Earned
December 21, 2000

View Points Earned   [Since Inception ▼]

Points for this Period
Points Earned          0
Point Goal             0
Goal Achieved?         Yes! Congratulations

How my Points were Earned (view point history)

| Activity | Current Value | Your Points | Site Average |
|---|---|---|---|
| Subject Contribution | | | |
| Add Subject in Area | 20 | 0 | 0 |
| Subjects Added Outside of Area | 20 | 0 | 0 |
| Subjects Added in Area by Others | 1 | 0 | 0 |
| Suggest Improvement | 5 | 0 | 0 |
| Subject Viewed by Others | 1 | 0 | 0 |
| Subjects Deleted | -10 | | |
| Ratings & Comments | | | |
| Add Comment | 5 | 0 | 0 |
| Overall Rating | 5 | 0 | 0 |
| Rating Descriptive Words | 5 | 0 | 0 |
| Comments Viewed by Others | 1 | 0 | 0 |
| Extras | | | |
| Recruit a Correspondent | 5 | 0 | 0 |
| Tell a Friend | 5 | 0 | 0 |
| Monthly Top Member | 100 | | |
| Total Points Earned | | 0 | 0 |

FIG. 78

Womp Correspondent 1's Points History
November 10, 2000

View Points History for:

Filter by: Since Inception ▼

Subjects Added in Area ▼

Point Transactions

| Date | Transaction | Points Earned |
|---|---|---|
| 11/02/2000 | 659 | 900 |
| 10/31/2000 | 616 | 900 |
| 10/31/2000 | 642 | 900 |
| 10/31/2000 | 643 | 900 |
| 10/31/2000 | 644 | 900 |
| 10/31/2000 | 645 | 900 |
| 10/27/2000 | 580 | 900 |
| 10/27/2000 | 586 | 900 |
| 10/26/2000 | 568 | 900 |
| 10/25/2000 | 544 | 900 |
| 10/25/2000 | 545 | 900 |
| 10/24/2000 | 521 | 900 |
| 10/24/2000 | 527 | 900 |
| 10/24/2000 | 528 | 900 |

FIG. 79

Womp Correspondent 3's Account Balance
November 19, 2000

Current Account Balance  $430.00  [Cash out]

View Account Transactions for [Last Month ▼]

Account Transactions

| Date | Description | Transaction | Dollar Balance |
|---|---|---|---|
| 10/25/2000 | Subjects Added in Area | 544 | $5.00 |
| 10/25/2000 | Subjects Added in Area | 545 | $5.00 |
| 10/24/2000 | Subjects Added in Area | 521 | $5.00 |
| 10/24/2000 | Subjects Added in Area | 527 | $5.00 |
| 10/24/2000 | Subjects Added in Area | 528 | $5.00 |
| 10/25/2000 | Subjects Added Outside of Area | 552 | $5.00 |
| 10/24/2000 | Subjects Added Outside of Area | 531 | $5.00 |
| 10/26/2000 | Review Subjects | 561 | $5.00 |
| 10/25/2000 | Review Subjects | 547 | $5.00 |
| 10/25/2000 | Review Subjects | 551 | $3.00 |
| 10/25/2000 | Review Subjects | 550 | $5.00 |
| 10/25/2000 | Review Subjects | 542 | $5.00 |
| 10/25/2000 | Review Subjects | 554 | $5.00 |
| 10/25/2000 | Review Subjects | 549 | $5.00 |
| 10/25/2000 | Review Subjects | 541 | $5.00 |
| 10/25/2000 | Review Subjects | 547 | $5.00 |
| 10/25/2000 | Review Subjects | 520 | $5.00 |
| 10/24/2000 | Review Subjects | 509 | $5.00 |
| 10/24/2000 | Review Subjects | 523 | $5.00 |
| 10/24/2000 | Review Subjects | 524 | $5.00 |
| 10/24/2000 | Review Subjects | 522 | $3.00 |
| 10/24/2000 | Review Subjects | 533 | $5.00 |
| 10/24/2000 | Review Subjects | 530 | $5.00 |
| 10/24/2000 | Review Subjects | 530 | $5.00 |

FIG. 80

Cash Out – Minimum of $20.00 is required for redemption.
November 13, 2000

Cash Out amount (Your account balance is = $430.00)

*Enter Amount to redeem  $ [        ]  Minimum of $20.00 is required for redemption.

Personal Information

*First Name        [wompcom3]
*Last Name         [com3]
*Address Line 1    [          ]
Address Line 2     [          ]
*City              [          ]
*State             [ ▾ ]
Zip/Postal Code    [12345]
*Social Security Number [     ]
Credit Card Type   [ ▾ ]
Card Expiration Month  [0]
Card Expiration Year   [0]
Card Number        [          ]

[Submit]

FIG. 81

Tell A Friend

Share Word of Mouth about your favorite Subjects!

Tell as many friends as you want -- you get points for each friend you tell! Fill out all fields.

Subject: Word of Mouth Phoenix

* Enter your e-mail address: [ joe@womone.com ]

* Enter e-mail address of friend(s): [           ]
Please separate e-mail addresses with a semicolon (;)

Add your own personal message!

[ Submit ]

FIG. 82

Ask for Kei
Added 10/23/00 by member FPARHAM
Personally Experienced this subject: Yes    Age:
Qualification Level: Slightly    Gender:

Kei is the master sushi chef that is a wiz with coming up with new and different dishes. He's awesome!

100% of respondents find this comment useful.
Do you?

[ Useful ]    [ Not Useful ]

FIG. 83

Estimated Time: Unknown
Estimated Cost: Unknown
Family Oriented: Yes
Availability: All Year
View details...

Comments(2)     Add Your Comment!

01/08/01     Large Slices

12/29/00     Order holiday pies to go!

FIG. 84

Accounting Actions

Select User Type: Correspondent

Select Action: Subjects Added in Area

Action SubCode: 0

Point Value: 20

Dollar Value: 1

Action Group: Subject Activity

Bonus:

Average Monthly Dollars: 0

Average Monthly Points: 111

Update    Help

FIG. 85

Contests

Select Contest Description

Contest Description

Contest Notes

Entries Awarded  0

Points Required Per Entry  1

Active

Clear Old Entries

Date Entries Updated  (Not updated yet)

Add    Remove    Help

FIG. 86

Age Groups

Select Age Group [▼]

- Age Group [ ]
- Low Age (years) [0]
- High Age (years) [0]
- Maximum Male Count (per postal code) [3]
- Maximum Female Count (per postal code) [3]
- Non Gender-specific Count (per postal code) [0]

[Add] [Remove] [Help]

FIG. 90

Bonus Points

Select Bonus Description ▼

Bonus Description

Primary Category ▼

Point Value  0

Dollar Value  0

Add    Remove    Help

FIG. 91

User Types

Select User Type Description [Correspondent ▼]

Opinion Multiplier [4]

Point Goal [500]

Pool Amount 0

Total Contribution 0

[Update]   [Help]

FIG. 92

| Field | Value |
|---|---|
| Best of best cut-off | 4.50 |
| Minimum ratings evaluate count | 3 |
| Minimum rating display value | 0.10 |
| Minimum rating words displayed | 20 |
| User inactivity limit (days) | 365 |
| Top "N" Best of Best Value | 10 |
| Top "N" Count Value | 10 |
| Top "N" Percent Value | 0 |
| Max search results count | 100 |
| Search results per page | 8 |
| Display unsponsored address and phone | ☑ |
| Display site/user statistics | ☑ |

Update    Help

FIG. 93

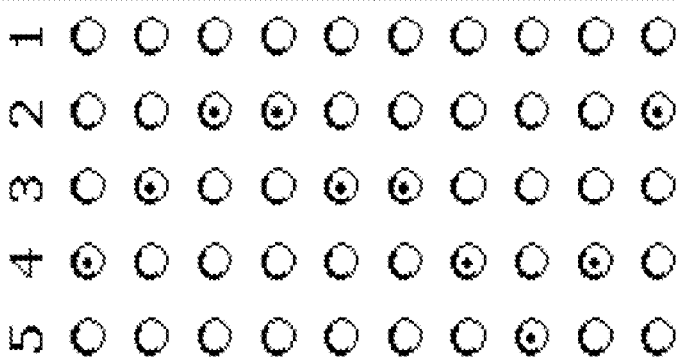
FIG. 95-A

Any Comments?

If you have any additional comments, please enter them here. If your favorite beverage was not listed, please feel free to leave your preference in the comment section.

I'd also like to have orange juice.

Submit

NOTE: Your comments will only be seen by the creator of this survey. Additionally, they will not be connected to your responses above.

FIG. 95-B

Survey Title

The Survey Title is used to identify this survey within the survey management functions. Give your survey a name that is relevant to you.

Greg's Personalized Plate

Offered By

This field allows you to tell people who is offering the survey. It will appear as "A Word Of Mouth Survey offered by *custom text*". If you leave this field blank, the offered by line will not appear on your survey.

Marilyn Manson

Survey Topic

The Survey Topic is used to describe your survey to survey respondents. Typically it will give you a specific item to focus on when rating the elements below.

Enter your choice on what Greg's personalized plate should say.

FIG. 96-A

Survey Elements

The Survey Elements are the actual rating items for your survey. You can check the required box on each item if you want to require those be answered. If you need more elements than there are boxes, just click the link at the bottom to add some more.

| Display Order | Text | Required | Delete |
|---|---|---|---|
| 1 | WOMONE | ☑ | ☐ |
| 2 | RAZNMNY | ☑ | ☐ |
| 3 | CHKMGNT | ☑ | ☐ |
| 4 | VCHUNTR | ☑ | ☐ |
| 5 | IMDAMAN | ☑ | ☐ |

FIG. 96-B

User Comments

You can give each respondent the ability to leave a comment alongside your ratings. These comments will be viewed only by you the survey creator and would not be made publicly available even if your results are published.

☑ Collect Comments

Date Options

You can specify the date you want your survey to become active, as well as a date to cut off the responses. If you do not specify an end date, you will be able to inactivate the survey using the survey management pages.

Start Date [11/30/2000]    End Date [12/07/2000]
           *mm/dd/yyyy*              *mm/dd/yyyy*

Maximum Responses

You can also put a limit on the number of total responses you would like to receive. Once this number has been reached, we will automatically inactivate your survey, even if it is before the end date. Conversely, if an end date is reached before your response quota, your survey will be inactivated as well.

Maximum Total Responses [100]
*use zero to specify unlimited*

FIG. 97

Response Validations

How you validate those who respond to your survey will affect what remaining options are available to you. There are two options available: anonymous and email address.

Anonymous is the simpler of the two. If you don't care who responds to your survey, or how many times they respond, but just want to listen to everyone's views on your topic without raising privacy concerns, use this option.

Email Address verification on the other hand, will allow you to limit which organizations respond to your survey and how many times a particular user responds. Additionally, an email verification will be sent to insure that the respondent is who the say they are.

○ Anonymous  ⦿ Require Email Address

Response Limitations *(only available when requiring email address)*

If you are requiring an email address, you can also limit the number of times a given email address responds to your survey, and allow only email address from particular organizations (domain names) from responding to your survey.

Maximum responses per email address [ 1 ]
*use zero to specify unlimited*

☑ Limit responses to these organizations

[ womone.com ]

*use commas to separate such as "womone.com, icann.org"*

FIG. 98-A

Results Options

You can control who and when others can see the results of your survey. The options that allow only those who participated to view your results can only be used if you are requiring an email address.

- ⦿ Results are always available to anyone
- ○ Results are available to anyone, after the survey end date
- ○ Results are always available to anyone who has participated in the survey *(email address must be required)*
- ○ Results are available to anyone who has participated in the survey, after the survey end date *(email address must be required)*
- ○ Results are never available

[ Submit ] [ Cancel ]

FIG. 98-B

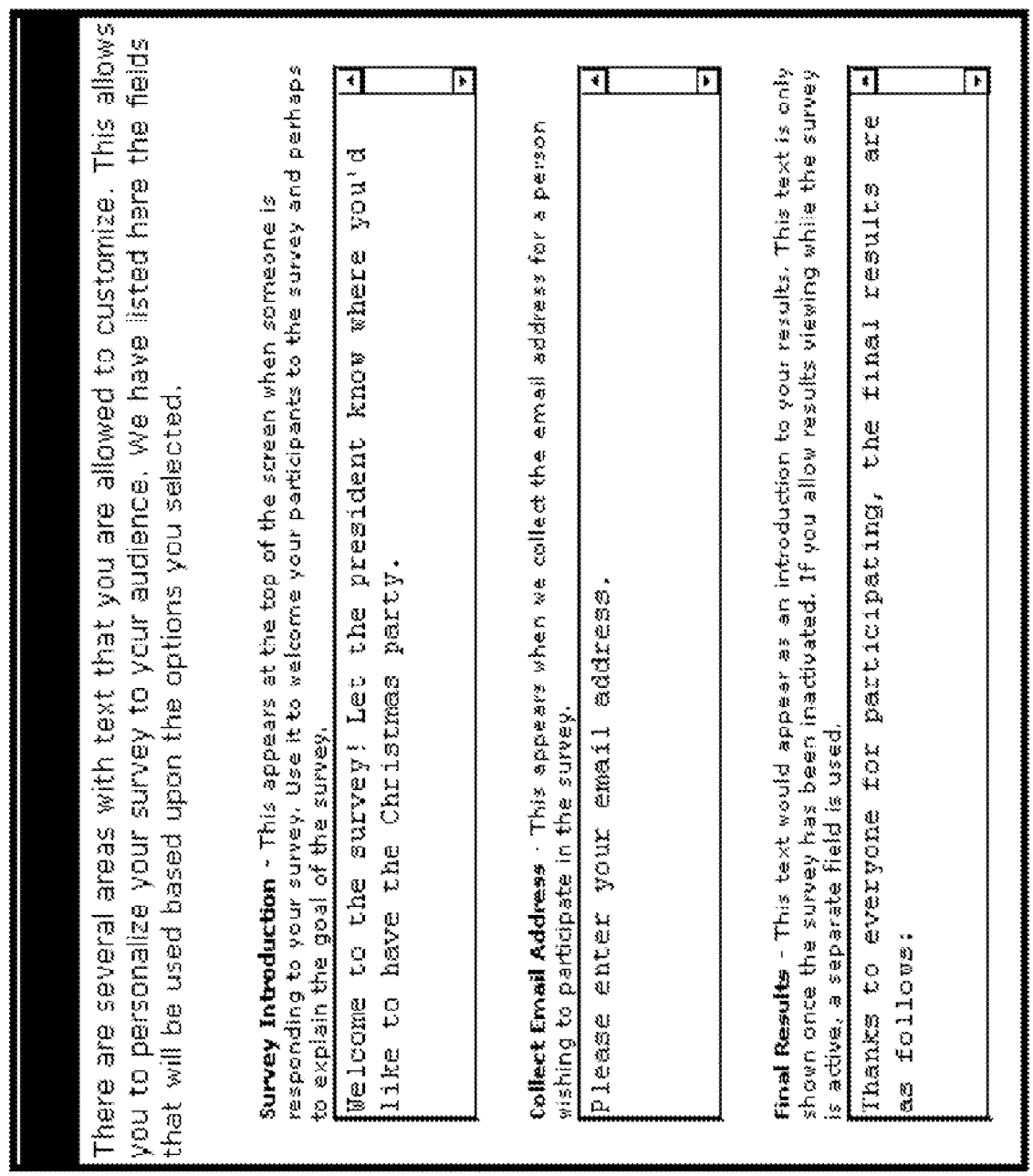
FIG. 99-A

Current Results - This text would appear as an introduction to your results. This text is only shown before the survey has been inactivated. Final results screens use the above text field.

```
Thanks for participating! Here's how the vote is going so
far:
```

Rating Scale - This text appears above the rating legend. It is used to describe to the the respondent how to use the ratings.

```
Ratings use a 5 for "very important" and 1 for "not
important at all".
```

Submit   Cancel

FIG. 99-B

Congratulations, your survey is complete.

Now that your survey is ready to go, you want people to respond. Below you will see your unique survey and results URLs. Use these to direct people to your survey.

The only way to get results is to show people where to respond to the survey. You can do this by posting the URL on your website or sending it in an email.

Your Unique Survey URL
http://surveys.womone.com/s/10000067/27/s.jrun

Your Unique Results URL
http://surveys.womone.com/sr/10000067/27/s.jrun

You can always view the results and manage your survey by using the Survey Management Center.

return to the homepage

FIG. 101

Account History

Date: 12/01/2000 09:23 AM

Charge Id: 000000031

| Survey | Description | Amount |
|---|---|---|
| Greg's Personalized Plate | Survey Setup Charge (1@$0.00) | $0.00 |
| | TOTAL | $0.00 |

CARD #: **************** * EXP: 00/0000
REF: * NO CHARGE * AUTH: * NO CHARGE *

Date: 11/30/2000 01:54 PM

Charge Id: 000000029

| Survey | Description | Amount |
|---|---|---|
| Where should we have the Christmas party? | Survey Setup Charge (1@$0.00) | $0.00 |
| | TOTAL | $0.00 |

CARD #: **************** * EXP: 00/0000
REF: * NO CHARGE * AUTH: * NO CHARGE *

Date: 11/30/2000 01:35 PM

Charge Id: 000000028

| Survey | Description | Amount |
|---|---|---|
| Where should we have the Christmas party? | Survey Setup Charge (1@$0.00) | $0.00 |
| | TOTAL | $0.00 |

CARD #: **************** * EXP: 00/0000
REF: * NO CHARGE * AUTH: * NO CHARGE *

FIG. 102

SYSTEM FOR CREATING AND MAINTAINING A DATABASE OF INFORMATION UTILIZING USER OPINIONS

CROSS-REFERENCE TO RELATED APPLICATIONS

The present application is a continuation of related application Ser. No. 09/782,873, filed Feb. 10, 2001, entitled "SYSTEM FOR CREATING AND MAINTAINING A DATABASE OF INFORMATION UTILIZING USER OPINIONS", and is related to and claims priority from prior provisional application Ser. No. 60/181,632, filed Feb. 10, 2000, entitled "METHOD AND SYSTEM FOR CREATING AND MAINTAINING A DATABASE OF INFORMATION UTILIZING USER COMMENTS AND OPINIONS", the contents of both of which are incorporated herein by this reference and are not admitted to be prior art with respect to the present invention by the mention in this cross-reference section.

BACKGROUND

This invention relates generally to systems for creating, maintaining and using database information. More particularly, it relates to a system for automatically creating and maintaining a database of information utilizing user opinions. Even more particularly, it relates to an Internet system assisting a population of users to automatically maintain the database content and to improve the usefulness and quality of the database information without any substantial management by the website owner-manager.

Recently, a wide range of interactive devices has been developed to provide information to consumers via communications networks. These interactive devices include, for example, computers connected to various computer on-line services, interactive kiosks, interactive television systems and the like. In particular, the popularity of computer on-line services has grown immensely in popularity over the last decade. Computer on-line services are provided by a wide variety of different companies. In general, most computer on-line services are accessed via the Internet. The Internet is a global network of computers. One popular part of the Internet is the World Wide Web, or the "Web." The World Wide Web contains computers that display graphical and textual information. Computers that provide information on the World Wide Web are typically called "Web sites." A Web site is defined by an Internet address that has an associated electronic page, often called a "home page." Generally, a home page is an electronic document that organizes the presentation of text, graphical images, audio and video into a desired display. These Web sites are operated by a wide variety of entities, which are typically called "providers."

A user may access the Internet via a dedicated high-speed line or by using a personal computer (PC) equipped with a conventional modem. Special interface software, called "browser" software, is installed within the PC. When the user wishes to access the Internet by normal telephone line, an attached modem is automatically instructed to dial the telephone number associated with the local Internet host server. The user can then access information at any address accessible over the Internet. Two well-known web browsers, for example, are the Netscape Navigator browser marketed by Netscape Communications Corporation and the Internet Explorer browser marketed by Microsoft Corporation.

Information exchanged over the Internet is typically encoded in HyperText Mark-up Language (HTML) format. The HTML format is a scripting language that is used to generate the home pages for different content providers. In this setting, a content provider is an individual or company that places information (content) on the Internet so that others can access it. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.). When a web browser accesses an HTML document, the web browser reads the embedded tags in the document so it appears formatted in the specified manner.

An HTML document can also include hyperlinks, which allow a user to move from one document to another document on the Internet. A hyperlink is an underlined or otherwise emphasized portion of text that, when selected using an input device such as a mouse, activates a software connection module which allows the user to jump between documents or pages (i.e., within the same Web site or to other Web sites). Hyperlinks are well known in the art, and have been sometimes referred to as anchors. The act of selecting the hyperlink is often referred to as "clicking on" the hyperlink.

Glossary of General Terms and Acronyms

The following terms and acronyms explained below as background and are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web, the client is typically a "Web browser" which runs on a user's computer; the program which responds to Web browser requests at a Web site is commonly referred to as a "Web server."

Domain Name System (DNS). An Internet service that translates domain names (which are alphabetic identifiers) into IP addresses (which are numeric identifiers for machines on a TCP/IP network).

Internet Information Server (IIS). Microsoft Corporation's Web server that runs on Windows NT platforms.

Internet. A collection of interconnected (public and/or private) networks that are linked together by a set of standard protocols to form a distributed network. While this term is intended to refer to what is now commonly known as the Internet, it is also intended to encompass variations which may be made in the future, including changes and additions to existing standard protocols.

HyperText Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

HyperText Transport Protocol (HTTP). The standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

Java. A general purpose programming language developed by Sun Microsystems. Java has a number of features that make the language well-suited for use on the World Wide Web. Small Java applications are called Java applets and can be downloaded from a Web server and run on a personal computer by a Java-compatible Web browser, such as Netscape Navigator or Microsoft Explorer.

Java servlet. A small Java-based program designed to perform a specific task within a Web server environment. Java servlets are analogous to Java applets except the are designed to only run on the Web server.

Java Virtual Machine. A set of applications that create a run time environment for executing Java code.

JRun. A server-side extension that allows a Web server to execute Java servlets for the processing and display of information. JRun is a widely adopted engine for developing and deploying server-side Java applications that use Java Servlets and JavaServer Pages (JSP).

Java Database Connectivity (JDBC). A Java API developed by JavaSoft, a subsidiary of Sun Microsystems of Mountain View, Calif. JDBC enables Java programs to execute SQL statements, which allows Java programs to interact with any SQL-compliant database. Since many relational database management systems (DBMSs) support SQL, and because Java itself runs on most platforms, JDBC makes it possible to write a single database application that can run on different platforms and interact with different database management systems. JDBC is similar to ODBC but is designed specifically for Java programs, whereas ODBC is language-independent.

Open DataBase Connectivity (ODBC). A database access method developed by Microsoft Corporation. ODBC allows an application to access data from a database by translating the application's data queries into commands that the database management system (DBMS) can understand.

Transmission Control Protocol/Internet Protocol (TCP/IP). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Corner and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename. The port specification is optional, and if none is entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass future markup languages and transport protocols which may be used in place of or in addition to the HyperText Markup Language and the HyperText Transfer Protocol.

More Specific Background

As the popularity of the Internet and the World Wide Web has continued to increase over the years, companies continue to try finding ways to provide useful content and to promote their products and services in a cost-effective manner and to get consumers to visit their Web sites. To that end, computer on-line services often offer subject search services to their users and employ narrative descriptions of their content, user ratings and user comments. Previous examples of such services include epinions.com, deja.com and travelpage.com. These prior systems present a number of limitations and drawbacks to the consumer user of the system. Specifically, a consumer cannot search for a subject based on opinions or ratings of the users of the system. Instead, the search logic is either hierarchical, based on predefined classifications, such as geography, or text based using a search for ambiguous words or phrases contained in the subject's title or description. Users' opinions and ratings are normally not finely detailed nor measurable and are separate and unrelated and are not included in the search processes offered to users. Therefore a user is unable to search for a subject based entirely or partially on the users' opinions or ratings.

No prior system having a database content of subjects provides for obtaining, storing, and/or searching using user-chosen-and/or-user-provided natural-language terms potentially descriptive of a subject (i.e., potentially-descriptive natural-language "tags" or indicators to associate with particular subjects of the database. And no such prior system provides for a user to assess at least one measure of descriptive value to the assessing user of a particular such tag with respect to a particular database subject. And no such prior system provides for associating (by "indexing", for example) among such subjects, such tags, and/or such measures to, for example, provide enhanced statistical aggregation and/or "personalized" searches/databases of value/pleasure to a particular user.

Although computer on-line information services allow guests to personalize or customize the information displayed to them on initial entry to the site, such personalization is limited because it does not allow for consideration of the guest's interests and related opinions and ratings of the other users. Rather, the personalization is based on personal preferences in specific, rigid categories of information defined by the information service provider based on the search indexes of the database. As a result, information is presented across a spectrum of subjects that are of interest, but without regard to a user's measures of importance/relevance.

From the perspective of the consumer, the above-described model presents a number of drawbacks. First, highly structured hierarchical search rules force users to search in predetermined ways, and text-based searches rely on ambiguous words or phrases and focus on names or subjects, not concise descriptions and user's evaluations, making identification and selection of the most relevant content (to a particular searcher) difficult. Second, because Internet-based searches are either very rigid or very loosely structured, it is difficult for users to compare similar subjects across the spectrum of their interests. Finally, the quality, freshness and completeness of the database of information must be raised while minimizing costs.

Present on-line information systems also present shortcomings for the system operators and managers. Specifically, they require a high degree of human intervention to maintain. On-line information service providers permit users to comment on and rate subjects within their site and routinely remove those that are out of date or inappropriate either manually or by automated means based on the age of the comment or rating. However, the current methods lack precision because of the ambiguous nature of the ratings and comments. The ambiguity requires a high level of human intervention if the information is to remain current and appropriate.

On-line information service providers use groups or "populations" or "communities" of contributors, i.e., a population of users, to input and maintain the subject content of the database. These communities may be organized geographically or by subject matter expertise. These communities require significant effort and human intervention to manage. On-line information service providers accept content from users and contributors with little or no review before it is posted. Reviews done by humans are usually completed by a limited group who are subject matter experts or geographically close to the submitter. Substantial effort is required to manage this process.

Moreover, prior on-line information systems include incentive systems that have drawbacks. On-line information service providers provide incentives in a variety of forms to encourage contributors to input and maintain subject content. Incentives may also be offered to users of the service. On-line information service providers also employ automated processes to capture, summarize and report the accumulated incentives. The granting of the incentives is based on completion of a limited number of actions that have limited influence on contributors' behavior. There is no limit on the total amount the information service provider is obligated to pay. Each contributor's incentive value is calculated using a rate per action which makes it difficult to increase the value because it increases the total potential obligation and, conversely, lowering the rate per action will be a major disincentive to contributors. Moreover, prior on-line information service providers offer no or limited incentives for users to provide new information, ratings or opinions to the database. Conversely, users' access is not restricted to the information unless it is a fee-based subscription site. Users' behavior is little influenced by the incentives except when attempting to "game" the system and gain unfair or improper rewards.

Therefore, there exists a need in the art for an improved system for creating, managing and searching information databases assisting a population of users.

OBJECTS OF THE INVENTION

Accordingly, it is an object and feature of this invention to provide such a system to develop and maintain content in a database of subjects (e.g., a product, a service, a leisure activity, an experience or a topic), which content can be easily and uniquely searched by users to help them make informed decisions about the database subjects that are particularly relevant to their needs and desires. It is another object and feature of this invention to provide a system for collecting user tags, opinions and/or reviews regarding the database subjects and for utilizing the user tags, opinions and/or reviews to support database searches and more informed decision making about the subjects.

Yet another object and feature of the invention is to enable people worldwide, with diverse backgrounds, educational levels and qualifications to contribute content to the database, and to express opinions or reviews in the form of tags, ratings, and/or other measures of database subjects, all in a way that improves the usefulness and quality of the information being added or rated. It is still another object and feature of the invention to reduce the need for centralized control and management of the database content and the contributor community by leveraging the talents, skills, and efforts of the user community to maintain the quality of the database content and the performance of the contributors. It is another object and feature of the present invention to provide a system for recruiting communities of people to create, maintain and provide opinions using Web sites focused on a variety of consumer decision support categories such as leisure experiences, public opinions, products and services.

Yet another object and feature of the invention is to attract users and develop user loyalty, through personal involvement and content contribution, by way of the use of a personal journal and participation in the rewards of the success of the web site. It is another object and feature of the present invention to provide a system to compensate contributors and guests for their efforts in a manner that will ensure a dynamic, comprehensive and accurate database of information for use by guests to the Web sites. It is still another object and feature of the present invention to provide a method and system that motivates guests and contributors to perform highly specific actions that will further the business objectives of the manager of the database.

Additional objects, features, and advantages of the invention will be set forth in the description that follows and in part will be apparent from the description or may be learned by practice of the invention. The objects, features and advantages of the invention may be realized and obtained by means of the instrumentalities and combinations pointed out in the appended claims.

SUMMARY OF THE INVENTION

According to a preferred embodiment of the present invention, this invention provides a system for creating and maintaining information in a database of subjects, available to a population of users, comprising: describing a database subject using a plurality of natural-language terms, each of such plurality of natural-language terms having relevance to the subject according to an involved subset of such population of users; rating the degree of relevance of each of such plurality of natural-language terms to such database subject according to each of such involved subset of such population of users; associating, in such database, such respective natural-language terms and respective degrees of relevance with each such database subject; and computing, for such involved subset of such population of users, in such database, an overall degree of relevance of each of such plurality of natural-language terms to such database subject. It further provides such a system further comprising: associating with a particular user a set of particular-user-preferred such natural-language terms from such plurality of natural-language terms; using such particular user's preferred such set of particular-user-preferred such natural-language terms, searching such database for database subjects associated with such set of particular-user-preferred such natural-language terms; determining a set of relevant such database subjects as are correlated with a high aggregate degree of relevance among such respective overall degrees of relevance of such set of respective particular-user-preferred such natural-language terms; and presenting to such particular user information about such relevant database subjects.

Moreover, this invention provides such a system further comprising: presenting to a particular user information about a particular such database subject and such associated respective relevant natural-language terms with such respective overall degrees of relevance; collecting, from such particular user, such particular user's opinions about respective degrees of relevance to such particular database subject of such respective presented natural-language terms; adding such particular user to such involved subset of such population of users and adding such particular user's opinions to such database; and updating, in association with such particular database subject, in such database, such overall degree of relevance of each of such plurality of natural-language terms associated with such particular database subject. It also provides such a system further comprising: presenting to a particular user information about a particular such database subject and such associated respective relevant natural-language terms with such respective overall degrees of relevance; collecting, from such particular user, such particular user's opinions about respective degrees of relevance to such particular database subject of such respective presented natural-language terms; adding such particular user to such involved subset of such population of users and adding such particular user's opinions to such database; and updating, in association with such particular database subject, in such database, such overall degree of relevance of each of such plurality of natural-language terms associated with such particular database subject. And it provides such a system further comprising: providing a software management system to directly manage such database and such population of users essentially without outside management; and providing for variables in such software management system to be configurable without affecting such direct management operations; wherein such software management system comprises: soliciting of sufficient information from such users for automatic role qualification enhancing software selection and maintenance of a management sub-community; measuring management efforts of each of such management sub-community; queuing of qualified users for a next opening in such management sub-community; setting of goals for each of such management community; and managing a reward system to reward management efforts of each of such management sub-community.

In addition, this invention provides such a system further comprising: collecting, from each user of such involved subset of such population of users, information about such user's knowledge of and experience with such database subject; assessing, based at least in part upon such information, a relative weight to be given to such user's opinions about such database subject; and for the purposes of computing, for such involved subset of such population of users, in such database, an overall degree of relevance of each of such plurality of natural-language terms to such database subject, applying a respective such relative weight for each respective such user's such rating of such degree of relevance in such manner that a more-knowledgeable such user's such rating counts for more in such "overall" computing than does a less-knowledgeable such user's such rating. And it provides such a system further comprising: determining first such user's role as member or contributor; assigning a multiplier-value based on such first determining; determining second whether such user has personally experienced the subject; assigning a multiplier-value based on such second determining; determining third such user's self-reported qualification to judge such subject; assigning a multiplier-value based on such third determining; determining fourth other users' overall ratings of subjects added by such user; assigning a multiplier-value based on such fourth determining; determining fifth other users' degree of agreements with comments added by such user; assigning a multiplier-value based on such fourth determining; and multiplying together all such multiplier-values to determine such relative weight.

Yet further, this invention provides such a system further comprising: rating the relative overall value of each such database subject according to the opinion of each of such involved subset of such population of users; collecting comments about each such database subject according to the opinion of each of such involved subset of such population of users; and associating, in such database, respective such ratings of relative overall value and respective such collected comments with respective such database subjects. And it provides such a system further comprising: accumulating, storing, and analyzing all associations, including subject categorizations, of all such overall degrees of relevance of all of such plurality of natural-language terms associated with all such database subjects; determining preferred such natural-language terms, according to such population of users, for selected categories of subjects. It further provides such a system wherein such determining a set of relevant such database subjects as are correlated with a high aggregate degree of relevance among such respective overall degrees of relevance of such set of respective particular-user-preferred such natural-language terms comprises determining an ordered set of relevant such database subjects as are correlated with a highest aggregate degree of relevance among such respective overall degrees of relevance of such set of respective particular-user-preferred such natural-language terms; and, further, wherein such presenting to such particular user information about such relevant database subjects includes presenting to such particular user an ordered set of relevant such database subjects as are correlated with a highest aggregate degree of relevance among such respective overall degrees of relevance of such set of respective particular-user-preferred such natural-language terms.

Yet moreover, in accordance with a preferred embodiment thereof, this invention provides an Internet website client-server computer system, for use to determine a level of subject interest for each one of a population of users by capturing other users' (of such population of users) opinions about the degree of relevance of each of a respective set of natural language descriptive terms to each of a respective set of subjects, comprising: a server database system of subjects, each associated with a set of relevant natural-language terms for describing each such subject; wherein each of a respective subset of such terms has been assigned, by each of a subpopulation of such population of users, a degree of relevance with respect to a respective such subject; a client interface system arranged so that such one user may select a set of preferred such natural-language terms which, to such one user, best describe preferred "subjects of interest" to such one user; a server computer processor system connected with such server database system and such client interface system; and a server computer software system, operational with such server computer processor system, arranged to provide search processing using such server database system to: determine an overall, according to such population of users, degree of relevance of each such preferred natural-language term to each such associated subject of such server database system, and determine a set of search-return "subjects of interest" each having at least a specified aggregate degree of relevance considering each such overall degree of relevance of each such preferred natural-language descriptive term to each associated such subject; and return such set of search-return "subjects of interest" to such client interface system of such one user. And it provides such a system wherein such set of search-return "subjects of interest" is ordered according to relative such aggregate degree of relevance.

Additionally, according to a preferred embodiment thereof, this invention provides a business system, for a developer of web computer systems of the type involving supporting a community of users searching for particular subject information, to achieve additional revenue from customers using such computer systems, comprising the steps of: providing for such computer systems to operate essentially without customer website management; providing for such computer systems to directly motivate and automatically manage the direct collection of sponsor revenue from respective entities desiring to sponsor a respective particular item of such subject information; and charging such customer, for use of such computer systems, an amount comprising a portion of such sponsor revenue. It further provides such a system wherein such particular item of such subject information comprises an exceptional user experience, thereby motivating location-based such entities and a product-based such entities to paying for a plurality of sponsorships.

Even additionally, according to a preferred embodiment thereof, this invention provides a business system, for a developer, for use by customers having websites, of web computer systems of the type involving supporting a community of users interacting with a database searching for particular subject information, comprising: providing for such computer systems to comprise software management systems to directly manage such database and such community of users essentially without customer website management; and providing for variables in such software management systems to be configurable by such customer without affecting such direct management operations; wherein such software management systems comprise: soliciting of sufficient information from users for automatic role qualification enhancing software selection and maintenance of a management sub-community; measuring management efforts of each of such management sub-community; queuing of qualified users for a next opening in such management sub-community; setting of goals for each of such management community; and managing a reward system to reward management efforts of each of such management sub-community.

It also provides, in accordance with a preferred embodiment thereof, a business system, supplied by a developer, for use by customers having websites comprising web server computer systems of the type involving supporting a community of users, having client computer systems, interacting with a database searching for particular subject information, comprising providing, for website use: computer software means for direct automatic management of such database and such community of users essentially without customer website management; and computer software means for permitting such customer to configure a large set of variables in such computer software means for direct automatic management of such database and such community of users without affecting full operation of such direct automatic management; wherein such computer software means for direct automatic management of such database and such community of users essentially without customer website management comprises: computer software means for soliciting of sufficient information from such users for automatic role qualification enhancing automatic selection and automatic maintenance of a management sub-community; computer software means for automatically measuring management efforts of each of such management sub-community; computer software means for automatically providing queuing of qualified users for a next opening in such management sub-community; computer software means for automatic setting of goals for each of such management community; and computer software means for automatically managing a reward system to reward management efforts of each of such management sub-community.

Yet in addition, it provides such a system wherein such computer software means for direct automatic management of such database and such community of users essentially without customer website management further comprises: computer software means for describing a database subject using a plurality of natural-language terms, each of such plurality of natural-language terms having relevance to such subject according to an involved subset of such community of users; computer software means for rating the degree of relevance of each of such plurality of natural-language terms to such database subject according to each of such involved subset of such community of users; computer software means for associating, in such database, each respective natural-language term of each such plurality of natural-language terms and such associated respective degree of relevance with each such database subject; and computer software means for computing, for such involved subset of such community of users, in such database, an overall degree of relevance of each of such plurality of natural-language terms to such database subject. Also, it provides such a system wherein such computer software means for direct automatic management of such database and such community of users essentially without customer website management further comprises: computer software means for automatically assisting such management sub-community to solicit subject sponsors; and computer software means to permit such subject sponsors automatically to send website materials and pay fees. And it provides such a system wherein such computer software means for automatically managing a reward system to reward management efforts of each of such management sub-community comprises: a computer software system for measuring and storing each contribution, including users' comments, to the database of each of such management sub-community; and making available to each of such management sub-community a contributor record of how many views other users have made of such contributions, including how many users agreed with such contributor's comments.

Yet additionally, it provides such a system wherein such contributor record is associated with the phrase, "lives influenced". And it provides such a system wherein such computer software means for automatically managing a reward system to reward management efforts of each of such management sub-community comprises a computer software system configurable to automatically allocate percentage rewards to a particular one of such management sub-community as a percentage of a settable pool; and further, wherein such percentage rewards from such pool may be paid only to a settable percentage of such management sub-community. It also provides such a system wherein such computer software means for direct automatic management of such database and such community of users essentially without customer website management further comprises: computer software means for automatically aggregating all user-proposed items for database adds, changes, and deletions into a review queue to which such management sub-community has access; and computer software means for automatically requiring at least one of such management sub-community to review and approve any such item before website publication is implemented. And it provides such a system wherein: such review queue is multi-level based essentially on item "aging"; and escalating rewards are offered to at least a set of such management sub-community for disposal of "older" items. It further provides such a system wherein such computer software means for automatically managing a reward system to reward management efforts of each of such management sub-community comprises a computer software system wherein each of such management community may be motivated to perform highly specific actions to further business objectives of such business system by automatically awarding more or less rewards for specific actions to influence behavior. And it provides such a system wherein such computer software means for automatically managing a reward system to reward management efforts of each of such management sub-community may be configured "on the fly".

Yet moreover, in accordance with a preferred embodiment thereof, this invention provides a business system, supplied by a developer, for use by customers having websites comprising web server computer systems of the type involving supporting a community of users, having client computer systems, interacting with a database searching for particular subject information, comprising providing, for website use: computer software means for direct automatic management of such database and such community of users essentially without customer website management; and computer software means for permitting such customer to configure a large set of variables in such computer software means for direct automatic management of such database and such community of users without affecting full operation of such direct automatic management; wherein such computer software means for direct automatic management of such database and such community of users essentially without customer website management comprises: computer software means for soliciting of sufficient information from such users for automatic role qualification enhancing automatic selection and automatic maintenance of a management sub-community; computer software means for automatically measuring management efforts of each of such management sub-community; computer software means for automatically providing queuing of qualified users for a next opening in such management sub-community; computer software means for automatic setting of goals for each of such management community; computer software means for automatically managing a reward system to reward management efforts of each of such management sub-community; computer software means for automatically assisting such management sub-community to solicit subject sponsors; and computer software means to permit such subject sponsors automatically to send website materials and pay fees; computer software means for automatically aggregating all user-proposed items for database adds, changes, and deletions into a review queue to which such management sub-community has access; and computer software means for automatically requiring at least one of such management sub-community to review and approve any such item before website publication is implemented; wherein: such review queue is multi-level based essentially on item "aging"; and escalating rewards are offered to at least a set of such management sub-community for disposal of "older" items; wherein such computer software means for automatically managing a reward system to reward management efforts of each of such management sub-community comprises a computer software system configurable to automatically allocate percentage rewards to a particular one of such management sub-community as a percentage of a settable pool; and wherein such percentage rewards from such pool may be paid only to a settable percentage of such management sub-community.

Even yet in addition, this invention provides such a system wherein such computer software means for direct automatic management of such database and such community of users essentially without customer website management further comprises: computer software means for describing a database subject using a plurality of natural-language terms, each of such plurality of natural-language terms having relevance to such subject according to an involved subset of such community of users; computer software means for rating the degree of relevance of each of such plurality of natural-language terms to such database subject according to each of such involved subset of such community of users; computer software means for associating, in such database, each respective natural-language term of each such plurality of natural-language terms and such associated respective degree of relevance with each such database subject; and computer software means for computing, for such involved subset of such community of users, in such database, an overall degree of relevance of each of such plurality of natural-language terms to such database subject.

Also, according to a preferred embodiment thereof, this invention provides a computer system, usable by a large population of Internet users, for creating and maintaining information in a searchable database of defined categories of subjects, comprising, in combination: storage means for storing a large corpus of natural language terms for describing such subjects; relevancy storage means for storing, associated with each such defined category, at least a respective subset of such terms most relevant, according to such population, to such subject within such respective defined category; processing means for updating such relevancy storage means; processing means for presenting to one such user, in association with one such subject, a plurality of such terms most relevant to such subject; interface processing means for assisting such user to choose from such plurality of such presented terms a plurality of such-user-preferred most-relevant such terms to such subject; interface processing means for assisting such user to rate on a predefined scale the relative degree of relevance of each such most-relevant term to such one subject; storage means for storing such respective ratings of such respective most-relevant terms for such respective subject according to each of a subpopulation of such respective users; processing means for computing, for such subpopulation, a pre-selected type of overall degree of relevance to each respective such subject of each respective such most-relevant term; interface processing means for assisting a particular user to base a subject search at least upon a chosen set of particular-user-preferred such natural language terms; processing means for, using such particular user's preferred such set of particular-user-preferred such natural-language terms, searching such database for database subjects associated with such set of particular-user-preferred such natural-language terms; processing means for determining a set of relevant such database subjects as are correlated with a determined specified high aggregate degree of relevance among such respective overall degrees of relevance of such set of respective particular-user-preferred such natural-language terms; and interface processing means for presenting to such particular user information about such determined set of such relevant database subjects which might be of interest to such particular user.

Further, there is provided such a system wherein such predefined scale, for a system for which English is the natural language comprises essentially at least three of the following levels of modifiers: "slight", "somewhat", "important", "very", "extremely". And it provides such a system wherein such processing means for computing, for such subpopulation, a pre-selected type of overall degree of relevance to each respective such subject of each respective such most-relevant term comprises: a storage means for dating each such user ratings of such degree of relevance of such natural-language term; and a processing means for removing such user ratings of more than a selected age from being used in such computing of such overall degree of relevance. It also provides such a system wherein such processing means for updating such relevancy storage means comprises: determine which of such natural-language terms have been used most in such defined category—as top words; determine percentage breakdown of top words by first alphabet letter of all such natural-language terms in such defined category; find the selected number of such natural-language terms to be displayed in each display process; for each set of first-alphabet-letter words and each such selected number, grab the specified percentage of top words; and applying the above four steps once each selected timeframe to update such relevancy storage means. And it provides such a system wherein such interface processing means for assisting a particular user to base a subject search at least upon a chosen set of particular-user-preferred such natural language terms further comprises: interface processing means for assisting such particular user to select other search options on which to co-base such subject search; wherein such other search options are selected from the class which consists essentially of a defined category of subjects, a defined subcategory of subjects, a defined location of subjects, a defined subject, a defined organization name, a defined sum of money to spend, and a defined amount of time to spend.

It also provides, in accordance with a preferred embodiment of this invention, an Internet website client-server computer system, for use to determine by e-mail survey a level of subject approval for each one of a population of survey participants by capturing each such participant's opinions about the degree of relevance of each of a respective set of natural language terms to each of a respective set of subjects, comprising: a client interface system arranged so that a survey taker may indicate at least: a defined question for the survey, a such set of subjects to be evaluated, a such set of natural-language terms to be rated as to relevancy to each subject, a participant audience, and a time-frame for response; a server computer processor system connected with such client interface system; and a server computer software system, operational with such server computer processor system, arranged to provide survey processing comprising: compiling a survey file and survey document in accordance with survey taker input, communicating such survey document to such participant audience, and receiving and tabulating responses. And it provides such a system further comprising displaying survey results at a publicized URL. It also provides such herein systems in which such subjects consist essentially of exceptional experiences. And it provides such herein systems in which such natural-language terms are essentially evaluative; and, further, in which such natural-language terms are essentially evaluative and essentially indicate approval. It also provides such herein systems in which: such subjects consist essentially of exceptional experiences; and such natural-language terms are essentially evaluative. And it provides such herein system in which: such subjects consist essentially of exceptional experiences; and such natural-language terms are essentially evaluative and essentially indicate approval.

In accordance with a preferred embodiment hereof, this invention provides a method, relating to creating and maintaining information in a database of subjects, available to a population of users, comprising the steps of: describing a database subject using a plurality of natural-language terms, each of such plurality of natural-language terms having relevance to the subject according to an involved subset of such population of users; rating the degree of relevance of each of such plurality of natural-language terms to such database subject according to each of such involved subset of such population of users; associating, in such database, such respective natural-language terms and respective degrees of relevance with each such database subject; computing, for such involved subset of such population of users, in such database, an overall degree of relevance of each of such plurality of natural-language terms to such database subject; and presenting, to at least one user of such population of users, such computed overall degree of relevance of at least one natural-language term of such plurality of natural-language terms to such database subject.

In accordance with another preferred embodiment hereof, this invention provides a method, relating to creating and maintaining, in at least one database available to a population of users, information about a plurality of database of subjects, comprising the steps of: associating with each database subject of such plurality of database subjects at least one plurality of natural-language tags potentially descriptive of such each database subject according to an involved subset of such population of database users; assessing at least one measure of descriptive relevance of each of such at least one plurality of natural-language tags to such each database subject according to each particular database user of such involved subset of such population of database users; and associatively indexing, in such at least one database, such respective particular database users, such respective natural-language tags, such respective measures of relevance, and such respective database subjects. Moreover, it provides such a method, further comprising the step of computing, over all such involved subset of such population of users, in such at least one database, overall respective measures of such relevance of each respective one of such plurality of natural-language tags to each such respective database subject. Additionally, it provides such a method, wherein such assessing of such at least one measure of descriptive relevance comprises at least one correlation with number of times such natural-language tag is user-selected. Also, it provides such a method, further comprising: presenting to a selected particular user information about a particular such database subject and such associated respective relevant natural-language tags with such respective overall measures of relevance; collecting, from such selected particular user, such selected particular user's opinions about respective measures of relevance to such particular database subject of such respective presented natural-language tags; adding such selected particular user to such involved subset of such population of users and adding such selected particular user's opinions to such database; and updating, in association with such particular database subject, in such database, such overall measures of relevance of each of such plurality of natural-language tags associated with such particular database subject. In addition, it provides such a method, further comprising the steps of: associating with a particular user a set of particular-user-preferred such natural-language tags from such plurality of natural-language tags; using such particular user's preferred such set of particular-user-preferred such natural-language tags, searching such database for database subjects associated with such set of particular-user-preferred such natural-language tags; determining a set of potentially-preferred such database subjects as are correlated with a high aggregate degree of relevance among such respective overall degrees of relevance of such set of respective particular-user-preferred such natural-language tags; and presenting to such particular user information about such potentially-preferred database subjects. And, it provides such a method, further comprising the steps of: accumulating, storing, and analyzing all associations, including subject categorizations, of such overall measures of relevance of such plurality of natural-language tags associated with such database subjects; and determining preferred such natural-language tags, according to such population of users, relating to selected categories of subjects. Further, it provides such a method in which such natural-language tags are essentially evaluative. Even further, it provides such a method in which such natural-language tags essentially indicate explicit approval. Moreover, it provides such a method in which such natural-language tags essentially indicate implicit approval. Additionally, it provides such a method in which such subjects comprise exceptional experiences. Also, it provides such a method in which such subjects comprise products.

In accordance with another preferred embodiment hereof, this invention provides a computer system, relating to creating and maintaining, in at least one database available to a population of users, information about a plurality of database of subjects, comprising: at least one (associating) computer processor structured and arranged to associate with each database subject of such plurality of database subjects at least one plurality of natural-language tags potentially descriptive of such each database subject according to an involved subset of such population of database users; at least one (assessing) computer processor structured and arranged to assess, from input from at least one particular database user, at least one measure of descriptive relevance of each of such at least one plurality of natural-language tags to such each database subject according to each particular database user of such involved subset of such population of database users; and at least one (indexing) computer processor structured and arranged to associatively index, in such at least one database, such respective particular database users, such respective natural-language tags, such respective measures of relevance, and such respective database subjects. In addition, it provides such a computer system, further comprising: at least one (overall) computer processor structured and arranged to compute, over all such involved subset of such population of users, in such at least one database, overall respective measures of such relevance of each respective one of such plurality of natural-language tags to each such respective database subject. And, it provides such a computer system, wherein such at least one (assessing) computer processor comprises at least one (number) computer processor structured and arranged to correlate such at least one measure of descriptive relevance with number of times of user-selection of such natural-language tag. Further, it provides such a computer system, further comprising: at least one (presenting) computer processor structured and arranged to present to a selected particular user information about a particular such database subject and such associated respective relevant natural-language tags with such respective overall measures of relevance; at least one (collecting) computer processor structured and arranged to collect, from such selected particular user, such selected particular user's opinions about respective measures of relevance to such particular database subject of such respective presented natural-language tags; at least one (adding) computer processor structured and arranged to add such selected particular user to such involved subset of such population of users and to add such selected particular user's opinions to such database; and at least one (updating) computer processor structured and arranged to update, in association with such particular database subject, in such database, such overall measures of relevance of each of such plurality of natural-language tags associated with such particular database subject. Even further, it provides such a computer system, further comprising: at least one (preferred-tag) computer processor structured and arranged to associate with a particular user a set of particular-user-preferred such natural-language tags from such plurality of natural-language tags; at least one (searching) computer processor structured and arranged to, using such particular user's preferred such set of particular-user-preferred such natural-language tags, search such database for database subjects associated with such set of particular-user-preferred such natural-language tags; at least one (aggregate-relevance) computer processor structured and arranged to determine a set of potentially-preferred such database subjects as are correlated with a high aggregate degree of relevance among such respective overall degrees of relevance of such set of respective particular-user-preferred such natural-language tags; and at least one (subject-presenting) computer processor structured and arranged to present to such particular user information about such potentially-preferred database subjects. Even further, it provides such a computer system, further comprising: at least one (analyzing) computer processor structured and arranged to accumulate, store, and analyze all associations, including subject categorizations, of such overall measures of relevance of such plurality of natural-language tags associated with such database subjects; and at least one (categories) computer processor structured and arranged to determine preferred such natural-language tags, according to such population of users, relating to selected categories of subjects.

In accordance with another preferred embodiment hereof, this invention provides an Internet website client-server computer system, relating to use to determine a level of subject interest for each one of a population of users by capturing other users' (of such population of users) opinions about the degree of relevance of each of a respective set of natural language descriptive terms to each of a respective set of subjects, comprising: a server database system of subjects, each associated with a set of relevant natural-language terms for describing each such subject; wherein each of a respective subset of such terms has been assigned, by each of a subpopulation of such population of users, a degree of relevance with respect to a respective such subject; a client interface system arranged so that such one user may select a set of preferred such natural-language terms which, to such one user, best describe preferred "subjects of interest" to such one user; a server computer processor system connected with such server database system and such client interface system; and a server computer software system, operational with such server computer processor system, arranged to provide search processing using such server database system to: determine an overall, according to such population of users, degree of relevance of each such preferred natural-language term to each such associated subject of such server database system, and determine a set of search-return "subjects of interest" each having at least a specified aggregate degree of relevance considering each such overall degree of relevance of each such preferred natural-language descriptive term to each associated such subject; and return such set of search-return "subjects of interest" to such client interface system of such one user. Even further, it provides such a computer system wherein such set of search-return "subjects of interest" is ordered according to relative such aggregate degree of relevance.

In accordance with another preferred embodiment hereof, this invention provides a method, relating to a developer of web computer systems of the type involving supporting a community of users searching for particular subject information, to achieve additional revenue from customers using such computer systems, comprising the steps of: providing for such computer systems to operate essentially without customer website management; providing for such computer systems to directly motivate and automatically manage the direct collection of sponsor revenue from respective entities desiring to sponsor a respective particular item of such subject information; and charging such customer, for use of such computer systems, an amount comprising a portion of such sponsor revenue. Even further, it provides such a method wherein such particular item of such subject information comprises an exceptional user experience, wherein location-based such entities and product-based such entities are motivated to pay for a plurality of sponsorships.

BRIEF DESCRIPTION OF THE DRAWINGS AND APPENDIX

FIG. 1-A is diagrammatical overview of the Internet communications used in the instant system.

FIG. 1-B is diagrammatical overview of the website computer system.

FIG. 1-C is diagrammatical overview of the relationship among the website servers and the users.

FIG. 18 shows explanatory notes relating to FIG. 17.

FIG. 22 is a diagrammatical view of the search box screen.

FIG. 23 is a diagrammatical view of the category box screen.

FIGS. 26-A and 26-B are diagrammatical views of the member registration screen.

FIGS. 27-A and 27-B are diagrammatical views of the correspondent registration screen.

Figure 28:

FIG. 28 is a diagrammatical view of the correspondent application screen.

FIG. 29 is a diagrammatical view of the questions screen.

Figure 30:
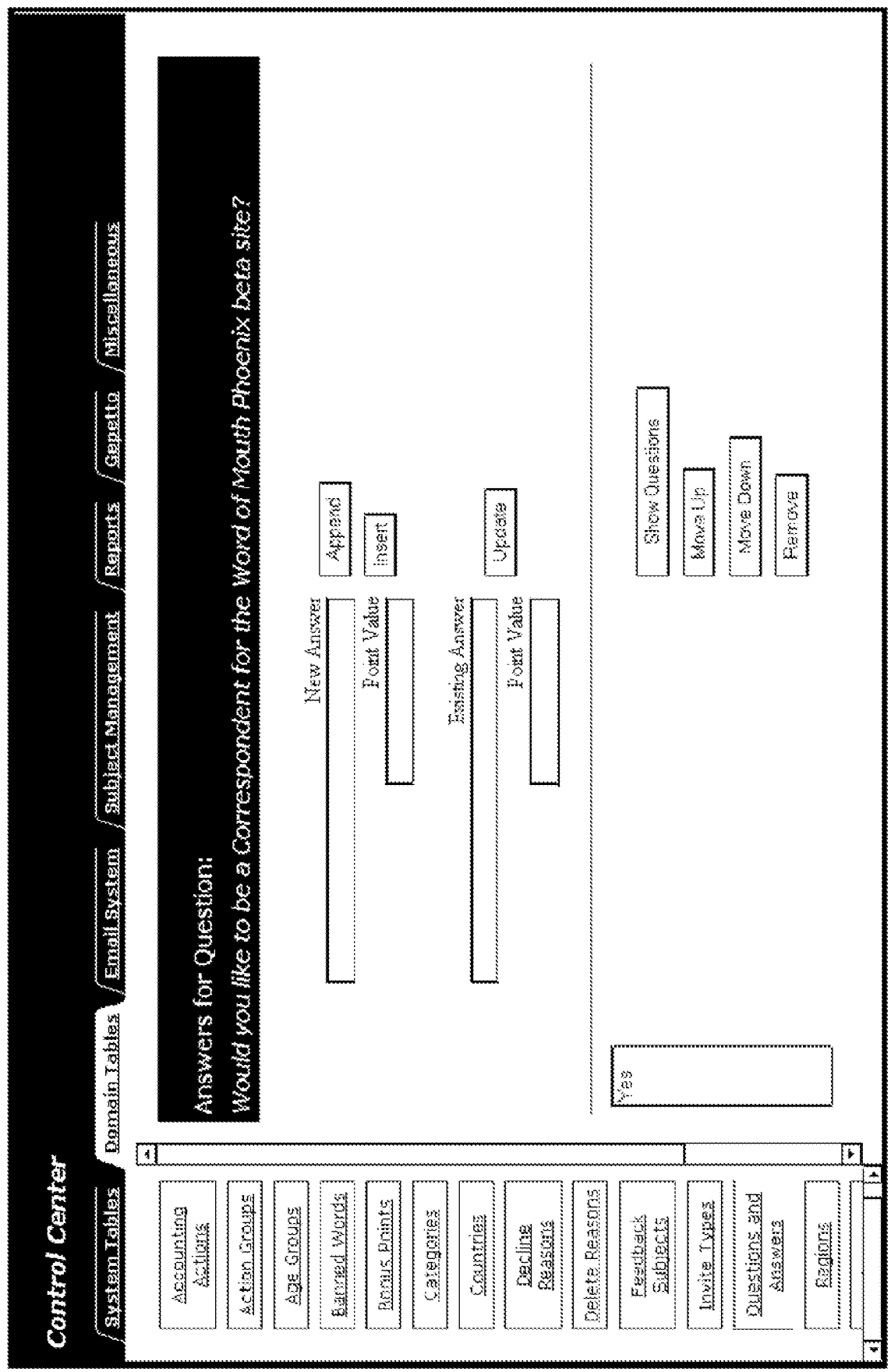

FIG. 30 is a diagrammatical view of the answers screen.

FIGS. 31-33 are diagrammatical views of the add-a-subject screens.

FIG. 34 is a diagrammatical view of a preferred screen illustrating the minimum and maximum number of descriptive words one wants to display for the user during the process of adding a subject.

Figure 35:
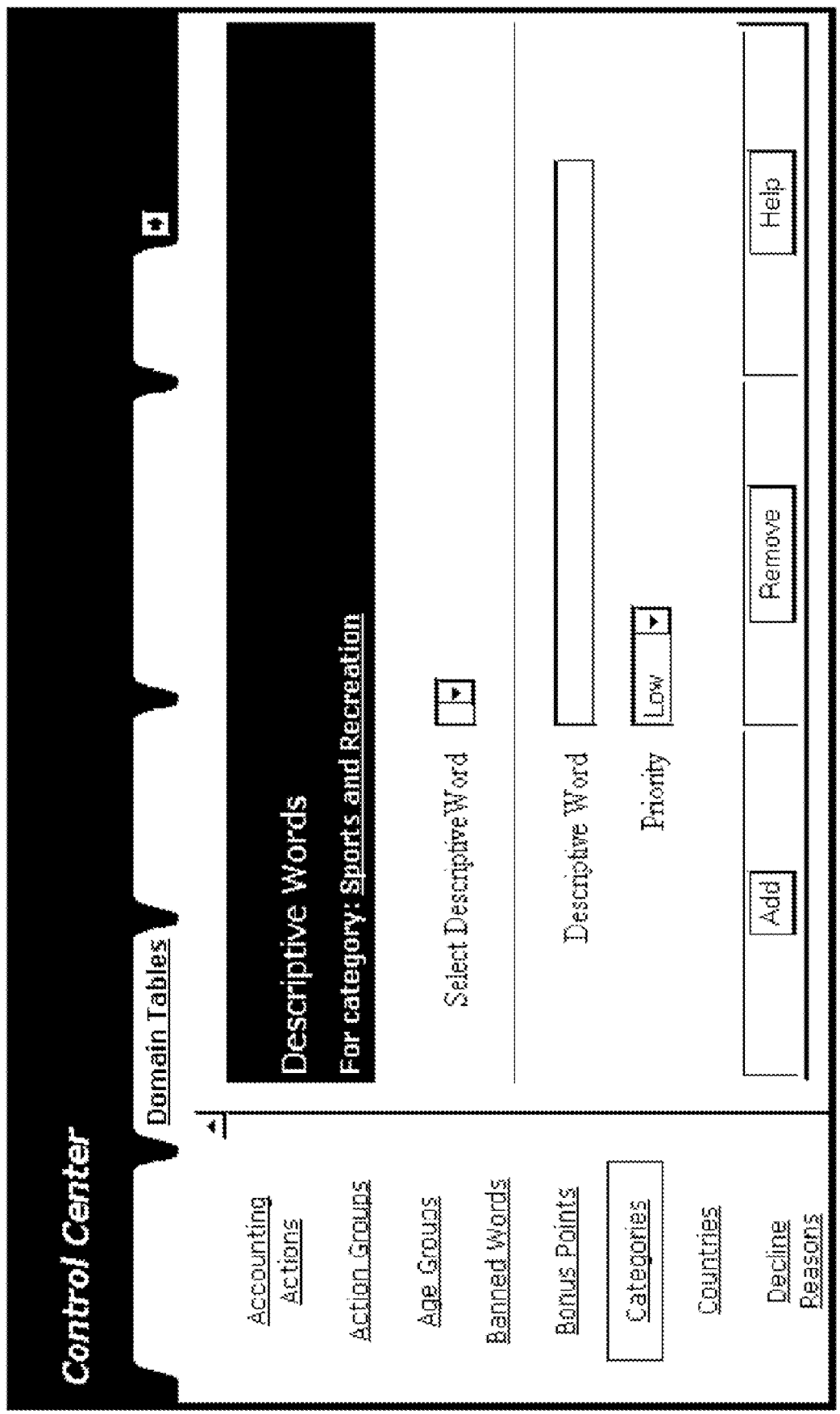

FIG. 35 is a further diagrammatical view of the descriptive word screen.

Figure 36:
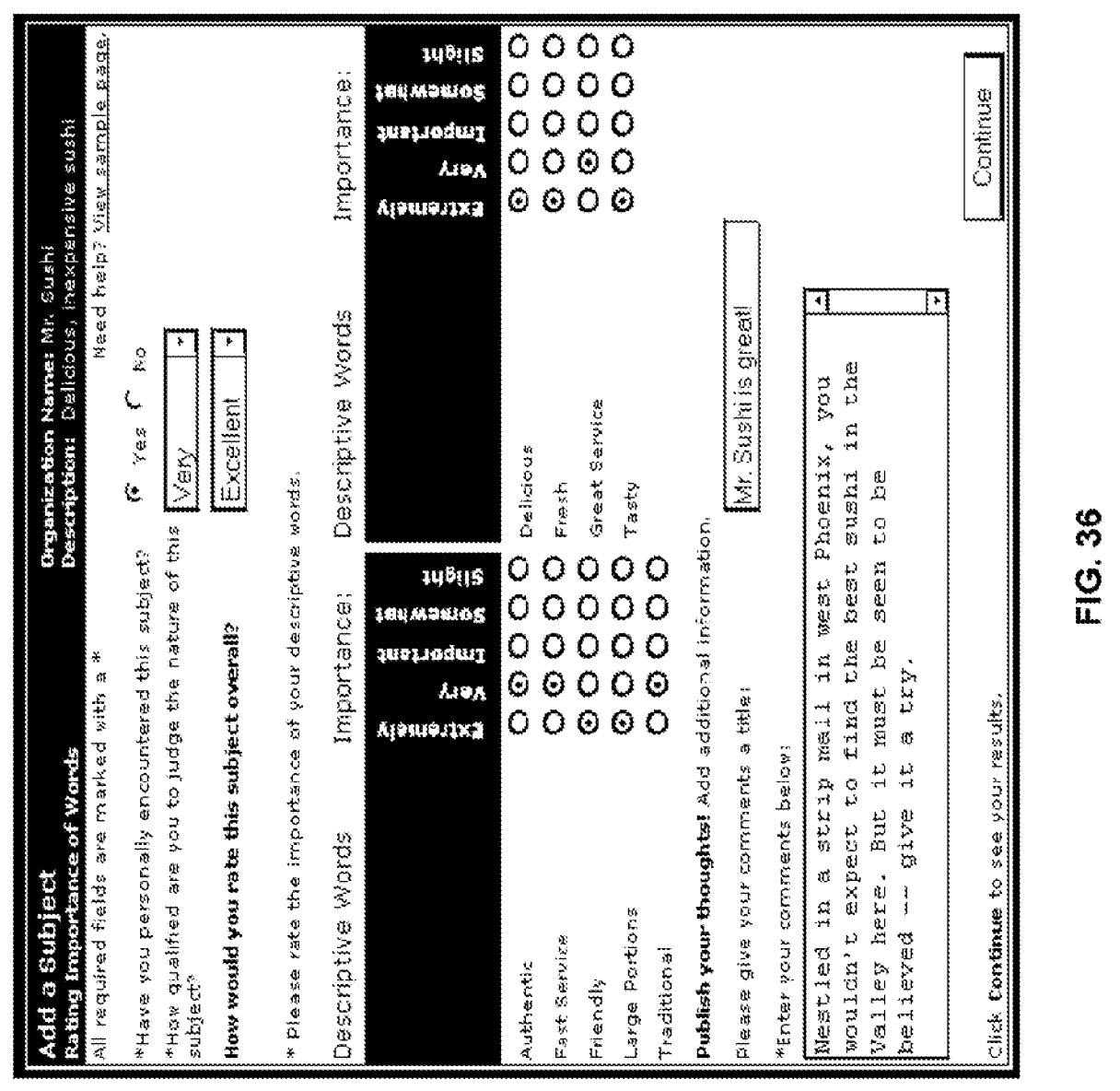

FIG. 36 is a diagrammatical view of a preferred screen for add-a-subject.

FIG. 37 is a diagrammatical view of a screen depicting the configuration of opinion multipliers.

FIGS. 38-A and 38-B are diagrammatical views of a screen illustrating the add-a-subject process, showing the words to be rated.

FIG. 39 is a diagrammatical view of the add-additional-words screen.

Figure 40:
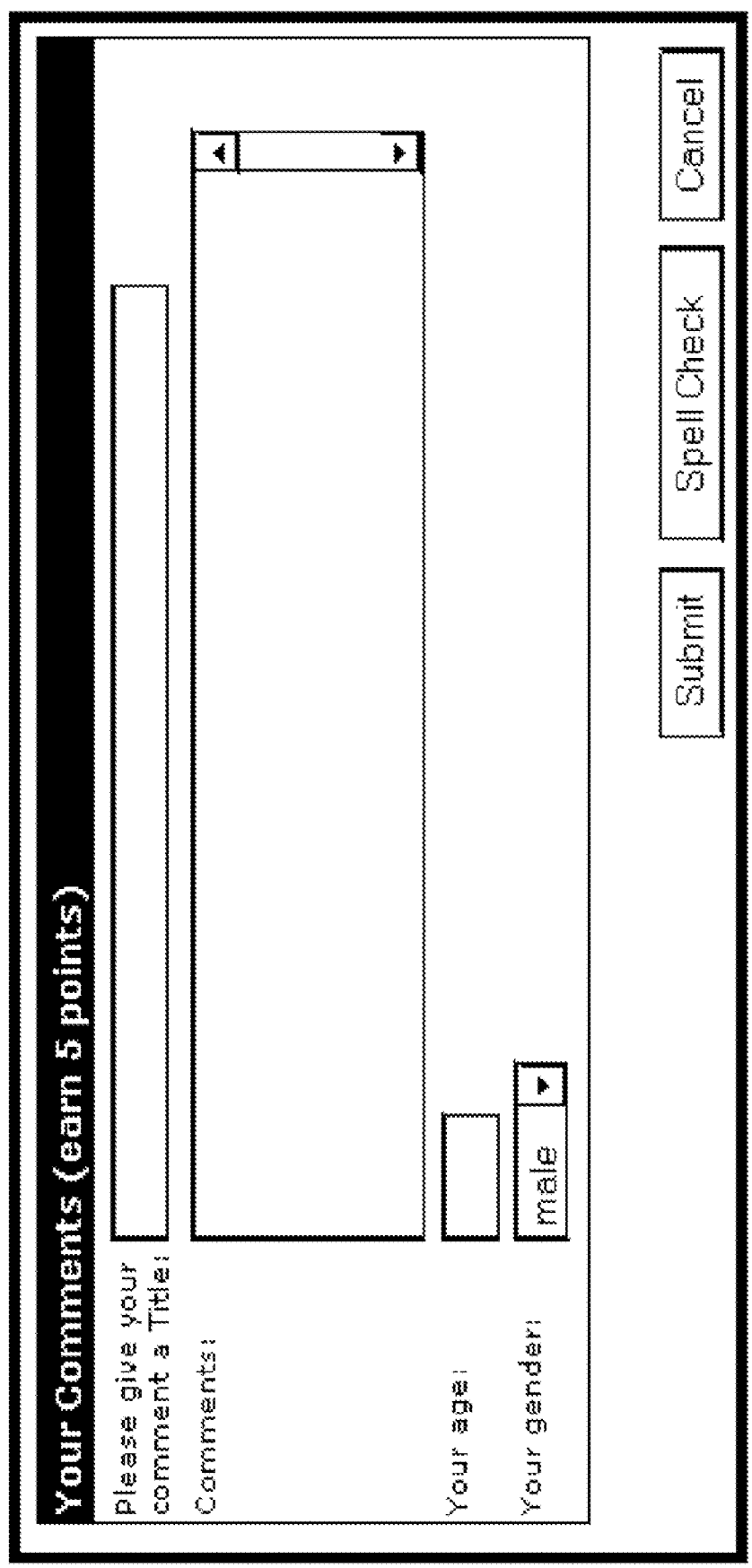

FIG. 40 is a diagrammatical view of the comments screen.

FIGS. 41-A and 41-B are diagrammatical views of the preview screen.

FIG. 42 is a diagrammatical view of the results screen.

Figure 43:
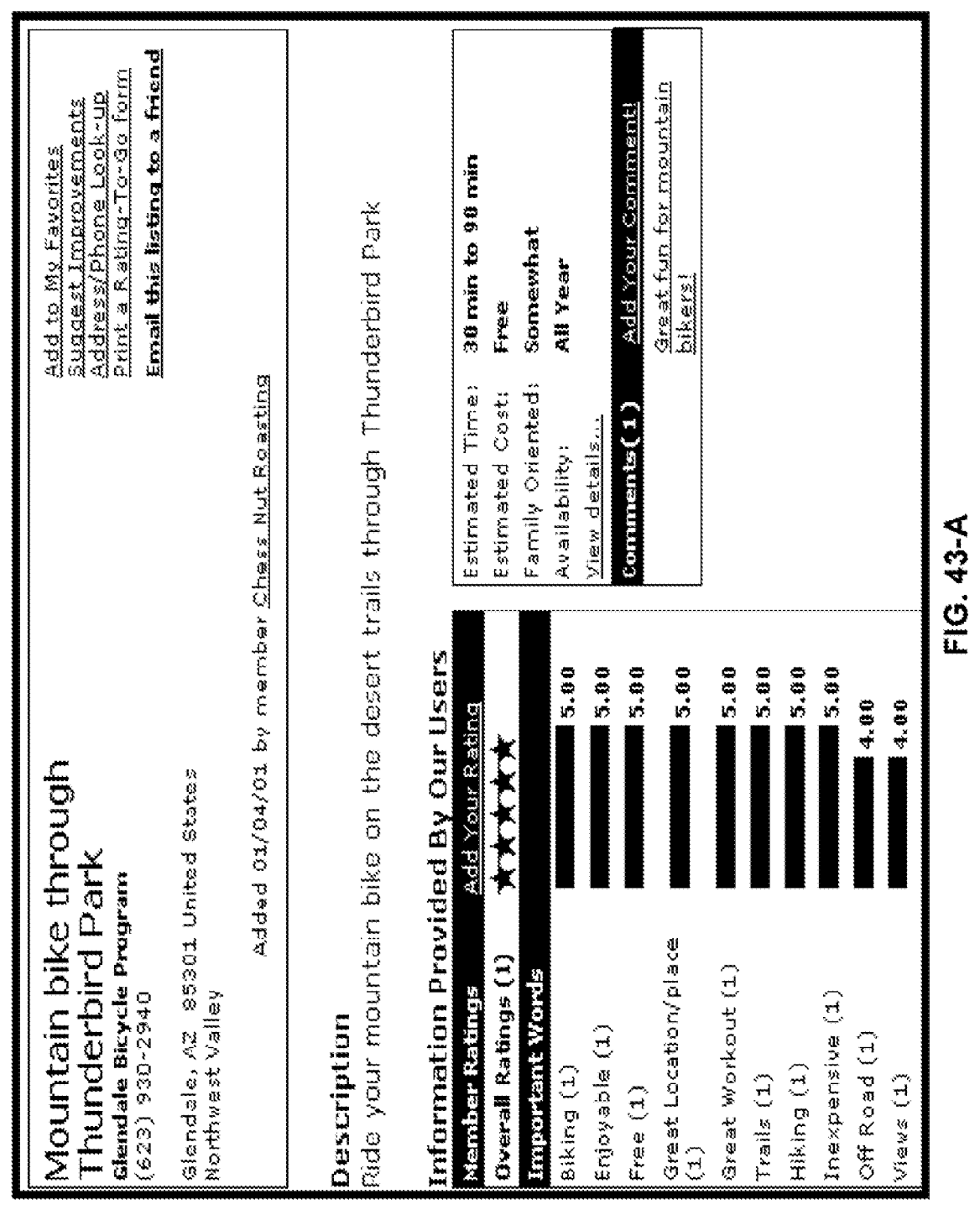

FIGS. 43-A and 43-B are diagrammatical top views of the subject page screen.

FIG. 44 is a diagrammatical view of the subcategories screen.

FIGS. 45-A and 45-B are diagrammatical views of personalized search screens.

FIG. 46 is a diagrammatical view of a screen illustrating the descriptive words and/or phrases pre-selected by the client to appear with a category.

FIG. 47 is a diagrammatical view of a box in the lower left-hand corner of the subject page screen, offering the opportunity to sponsor the subject.

FIGS. 48-A and 48-B are diagrammatical views of the screen returned to begin to get the desired information from the sponsor.

FIGS. 49-A through 49-D are diagrammatical views of screens illustrating the next sponsorship screens to receive information.

Figure 50:
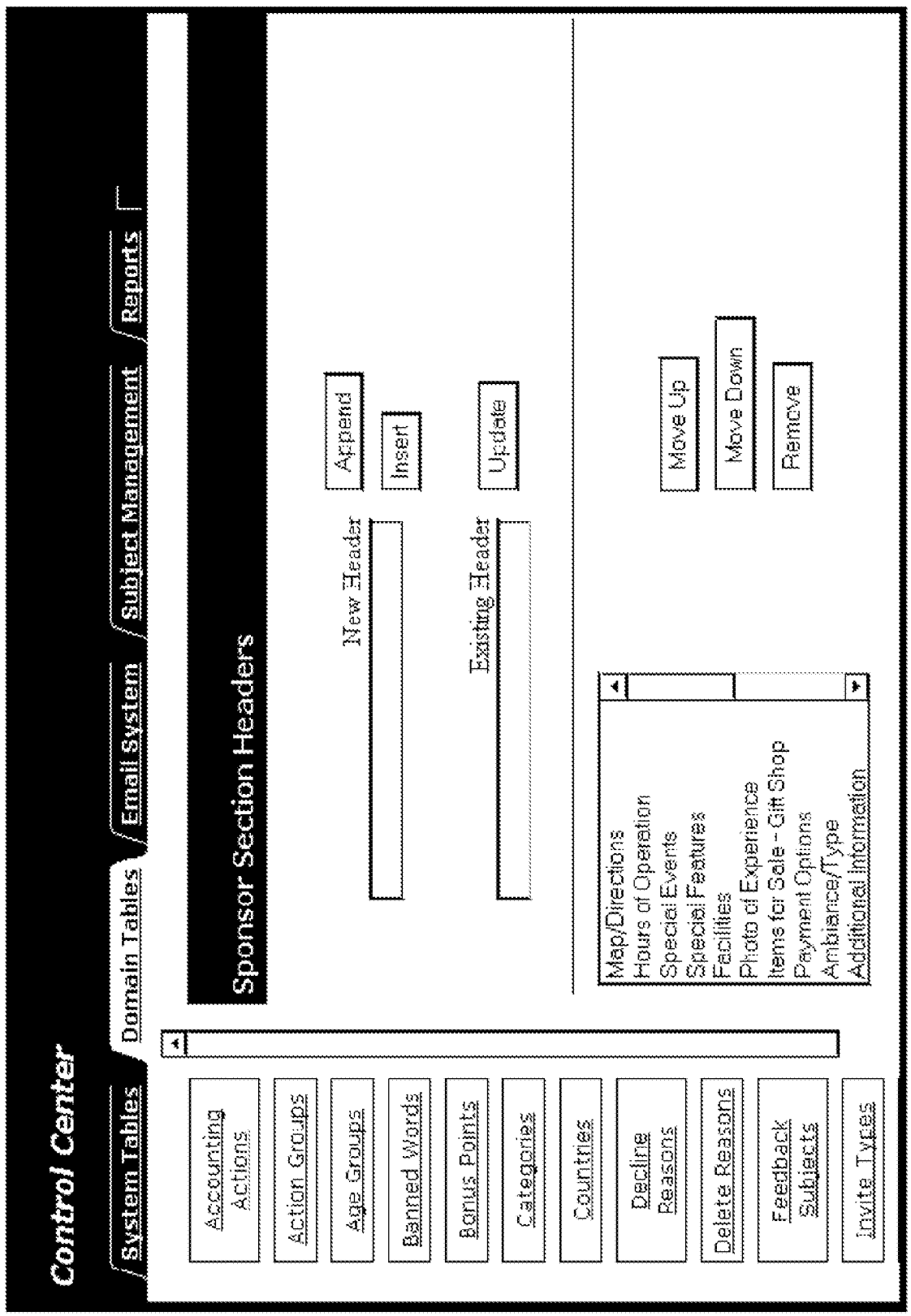

FIG. 50 is a diagrammatical view of the sponsor section headers screen.

Figure 51:

FIGS. 51-A through 51-C are diagrammatical top-to-bottom views of the newly sponsored page screen.

Figure 52:

FIG. 52 is a diagrammatical view of the payment information screen.

Figure 53:
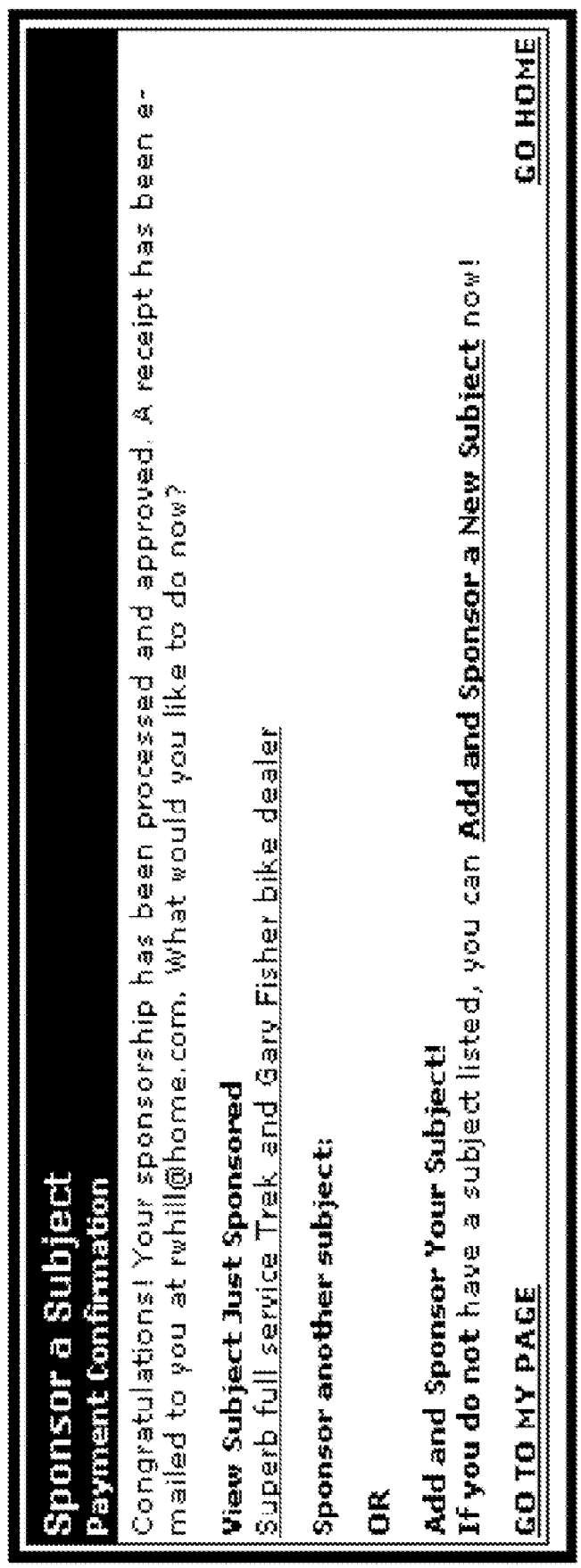

FIG. 53 is a diagrammatical view of the screen illustrating the confirmation of sponsorship.

Figure 54:

FIGS. 54-A and 54-B are top-to-bottom diagrammatical views of the subject-just-sponsored screen.

Figure 55:
Figure 55:
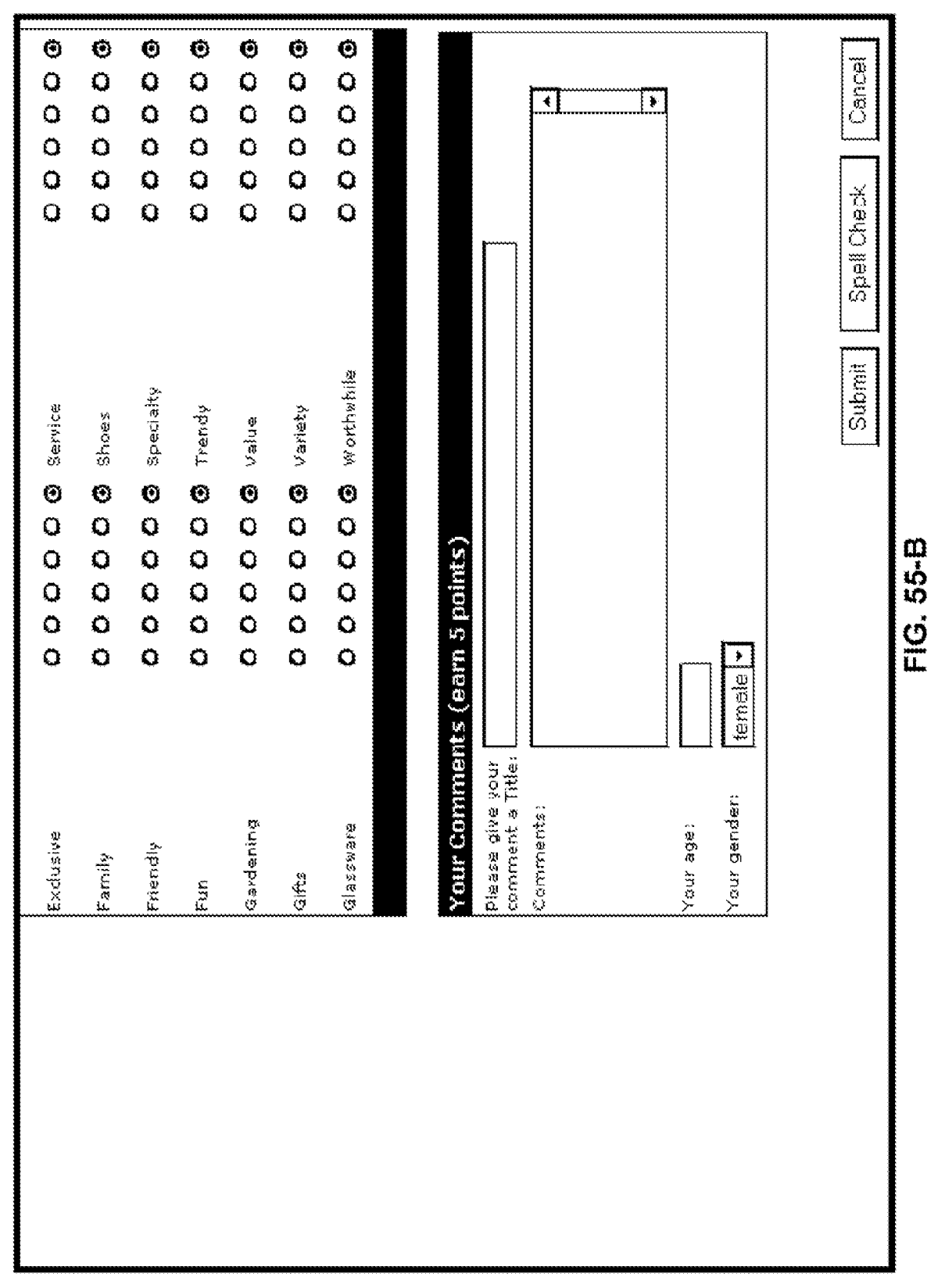

FIGS. 55-A and 55-B are diagrammatical views illustrating the screen where a registered user may add opinions to an existing subject's rating and reviewing.

FIG. 56 is a diagrammatical view of the improvement screen.

FIGS. 57-A and 57-B are diagrammatical views of the screen illustrating the various elements comprising each "MyPage".

Figure 58:
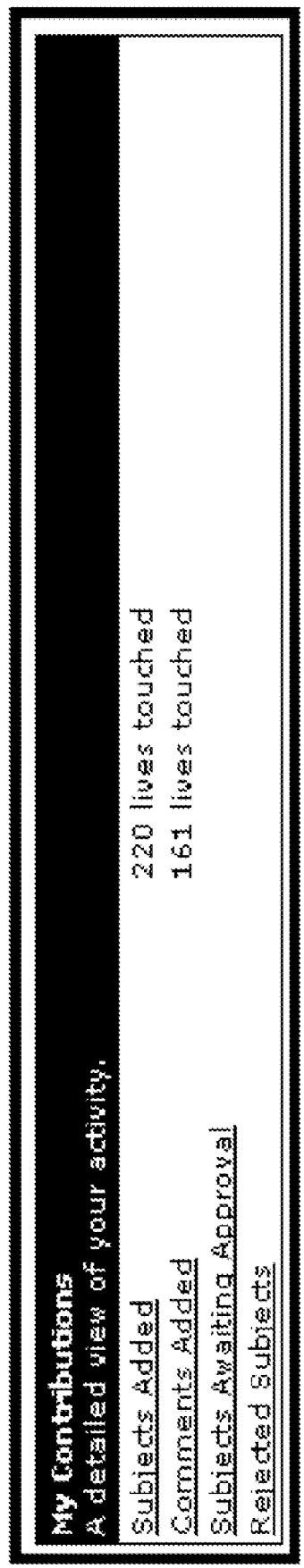

FIG. 58 is a diagrammatical view of the screen illustrating the "My Contributions" box.

FIG. 59 is a diagrammatical view of the "Subjects Added" screen.

Figure 60:
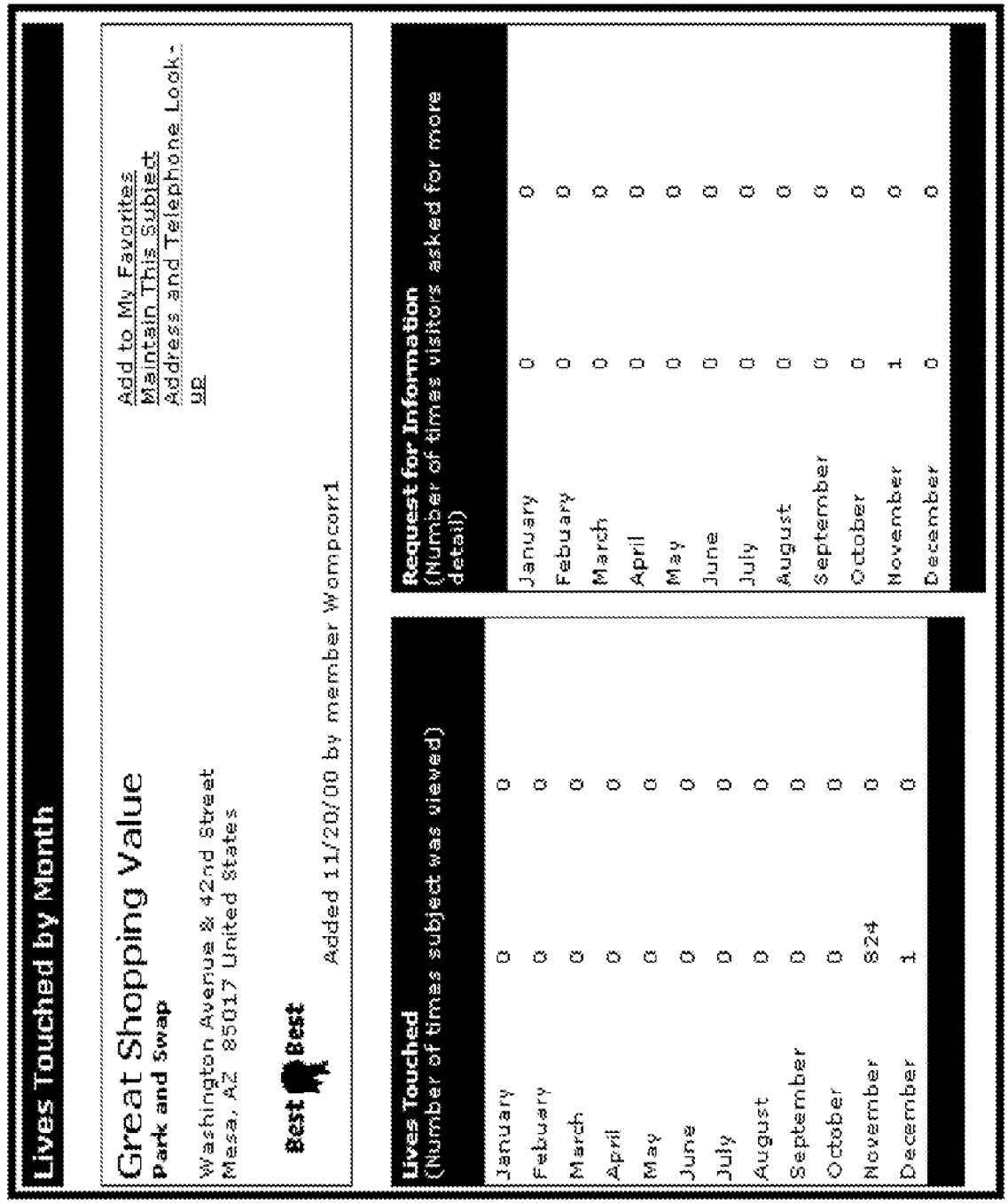

FIG. 60 is a diagrammatical view of the screen illustrating the "Lives Touched" box.

Figure 61:

FIG. 61 is a diagrammatical view of the comments screen.

FIG. 62 is a further diagrammatical view of the comments screen.

FIG. 63 is a diagrammatical view of the screen illustrating a sample page for "Subjects Awaiting Approval".

FIG. 64 is a diagrammatical view showing a rejected subjects screen.

FIG. 65 is a diagrammatical view of the "To Do List" screen.

FIG. 66 is a diagrammatical view of the "Notify organizations for Subjects added" screen.

FIG. 67 is a diagrammatical view of the screen illustrating the sending an email to an organization.

FIG. 68 is a diagrammatical view of the screen showing details of the subjects added.

FIG. 69 is a diagrammatical view of the screen illustrating further details of an added subject awaiting review.

FIG. 70 is a diagrammatical view illustrating a reviewing improvements screen.

FIGS. 71-A and 71-B are diagrammatical views of a screen wherein the correspondent can review improvements.

Figure 72:

FIG. 72 is a diagrammatical view of the process of deleting subjects from the screen.

Figure 73:
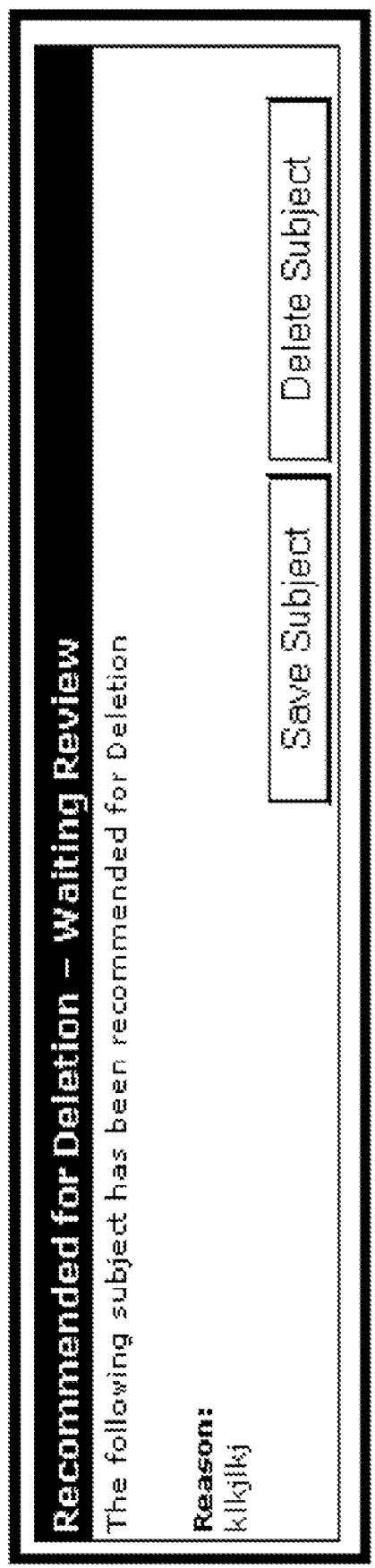

FIG. 73 is a diagrammatical view of the screen illustrating the subject that's recommended for deletion.

Figure 74:
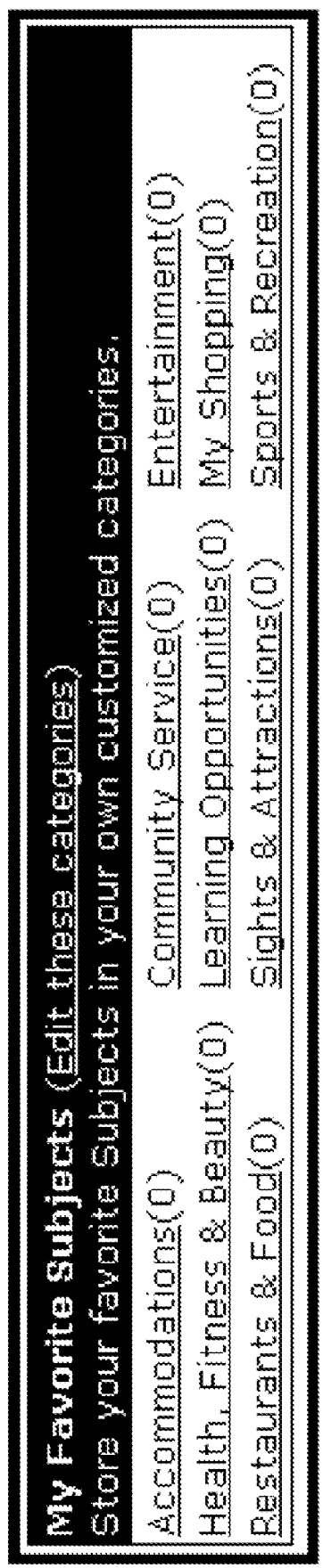

FIG. 74 is a diagrammatical view of a screen illustrating "My Favorite Subjects" box.

Figure 75:

FIG. 75 is a diagrammatical view of a screen illustrating "My Interests" box.

Figure 76:
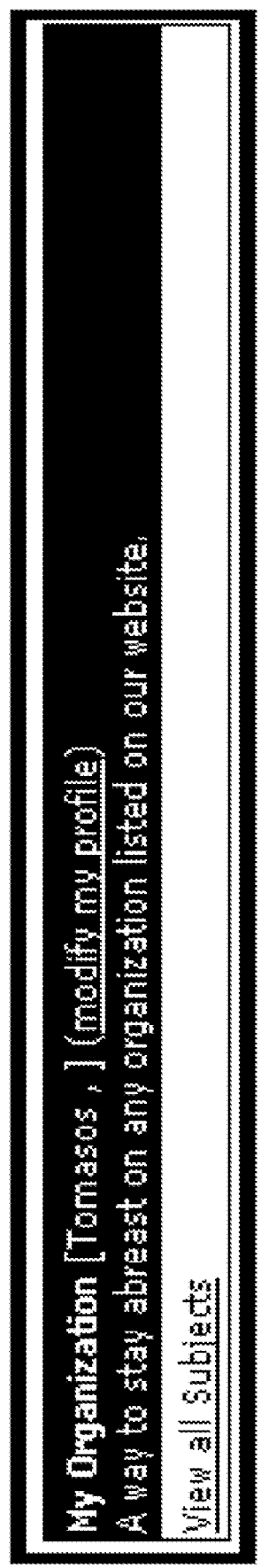

FIG. 76 is a diagrammatical view of a screen illustrating "My Organization" box.

Figure 77:

FIG. 77 is a diagrammatical view of a screen illustrating "My Rewards" box.

FIG. 78 is a diagrammatical view of a screen illustrating points earned.

FIG. 79 is a diagrammatical view of a screen illustrating the subjects added in an area.

FIG. 80 is a diagrammatical view of the "Account Balance" screen.

FIG. 81 is a diagrammatical view of a screen illustrating cash out.

FIG. 82 is a diagrammatical view of the screen for "Tell a Friend".

FIG. 83 is a diagrammatical view of the "Rate other comments" screen.

FIG. 84 is a diagrammatical view of the add-a-comment screen.

FIG. 85 is a diagrammatical view of a screen illustrating the configuration of points per action.

FIG. 86 is a diagrammatical view of a screen illustrating the configuration of contests.

Figure 87:
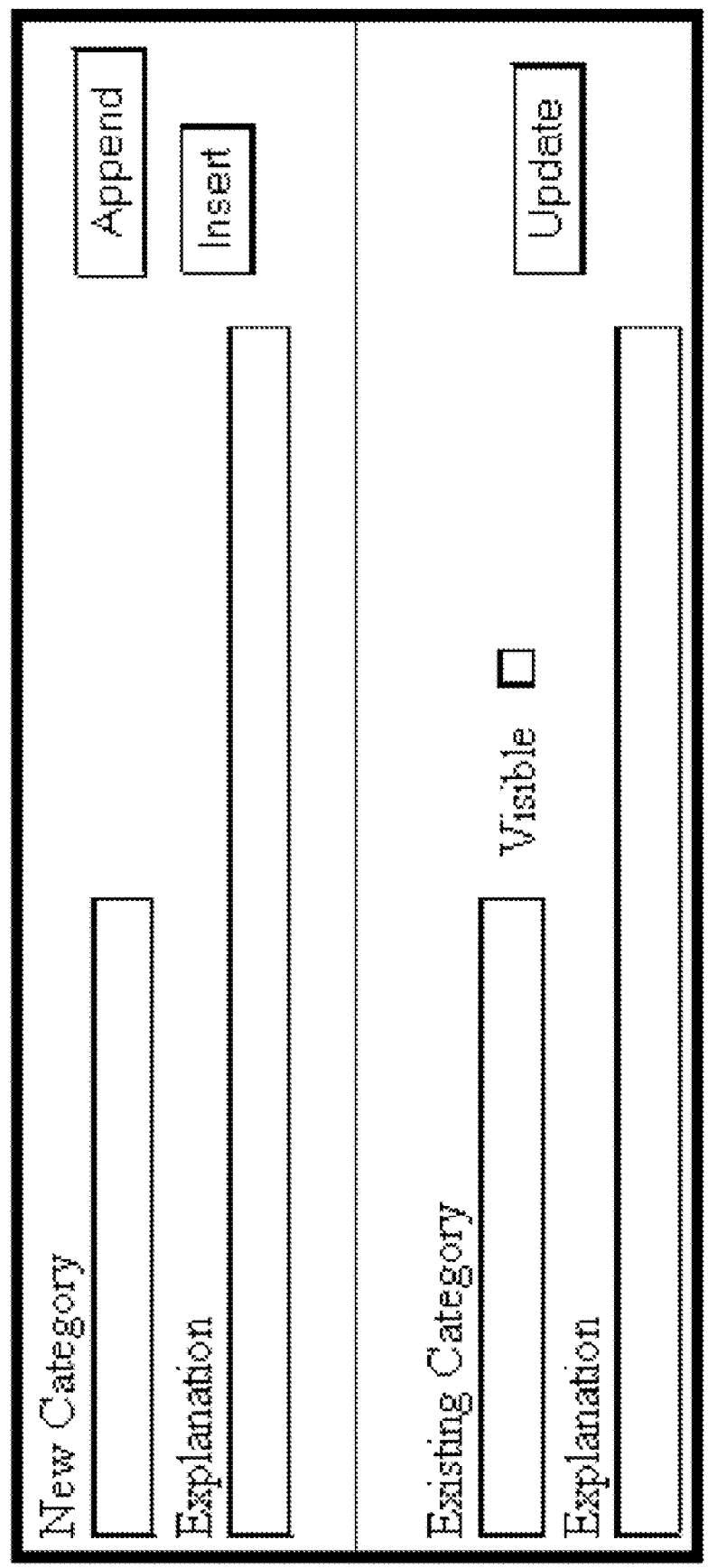

FIG. 87 is a diagrammatical view of a screen illustrating the configuration of category display.

Figure 88:
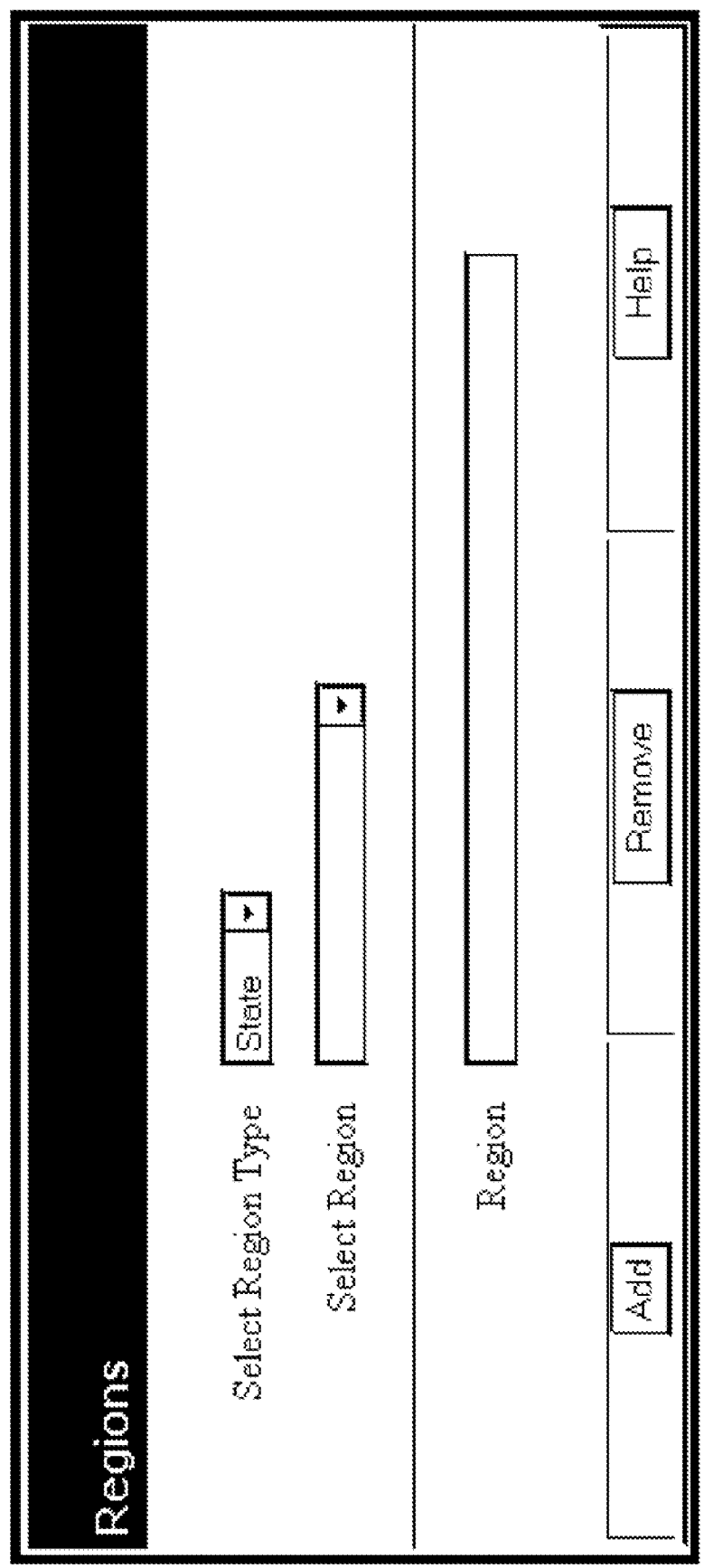

FIG. 88 is a diagrammatical view of a screen illustrating the configuration of regions.

Figure 89:
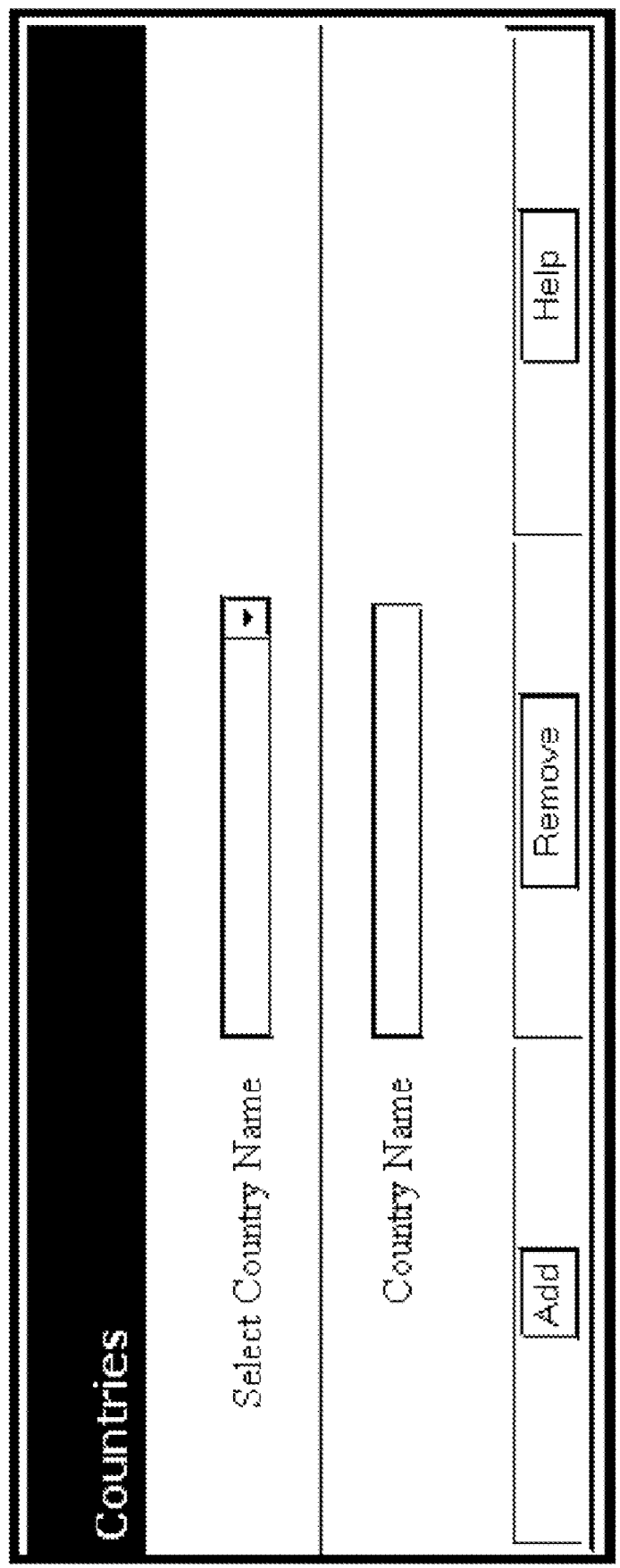

FIG. 89 is a diagrammatical view of a screen illustrating the process of editing the name of an existing region.

FIG. 90 is a diagrammatical view of a screen illustrating the configuration of age groups in Terraformer.

FIG. 91 is a diagrammatical view of a screen illustrating the configuration of bonus points in Terraformer.

FIG. 92 is a diagrammatical view of a screen illustrating the configuration of point goals and opinion multipliers in Terraformer.

FIG. 93 is a diagrammatical view of a screen illustrating the configuration of feedback subjects in Terraformer.

Figure 94:
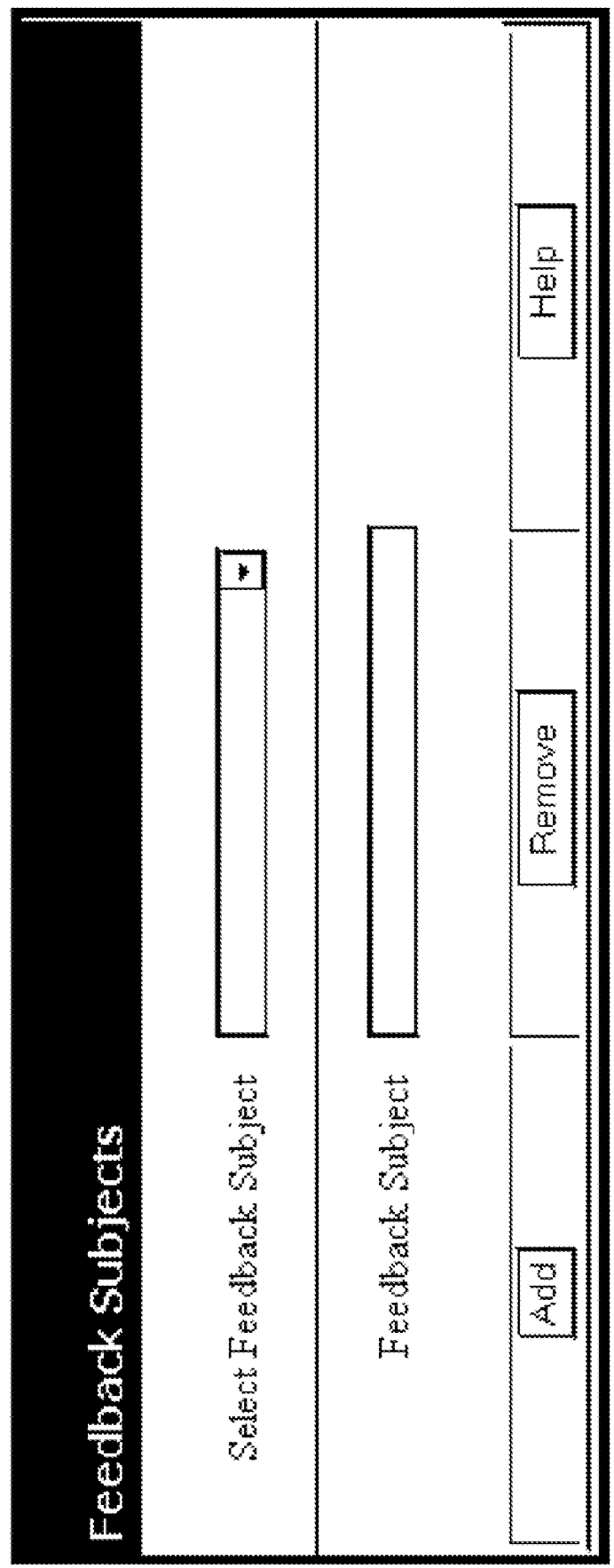

FIG. 94 is a diagrammatical view of a screen illustrating the configuration of sponsorship fees in Terraformer.

FIGS. 95-A and 95-B are diagrammatical views of a screen illustrating how to create and manage surveys with the survey tool.

FIGS. 96-A and 96-B are diagrammatical views of the "Create a Survey" screen.

FIG. 97 is a diagrammatical view of a screen illustrating further survey elements.

FIGS. 98-A and 98-B are diagrammatical views of a screen illustrating response and results in connection with a survey.

FIG. 99 is a diagrammatical view of a screen illustrating the survey area text-customization process.

Figure 100:
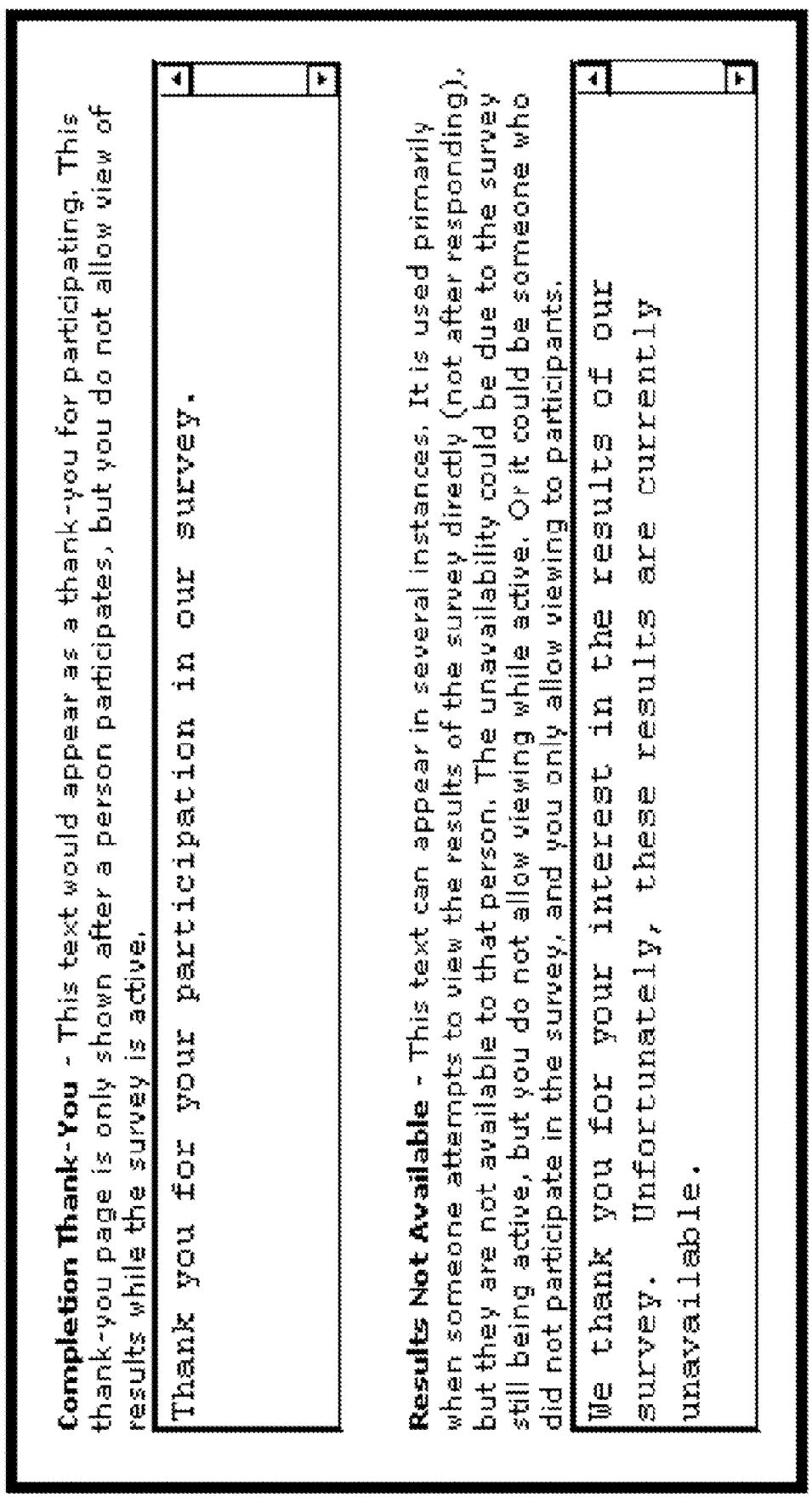

FIG. 100 is a diagrammatical view of a screen illustrating the custom text fields for use at survey completion.

FIG. 101 is a diagrammatical view of a screen illustrating the "Congratulations" page following a survey.

FIG. 102 is a diagrammatical view of a screen illustrating the "User Account History" page.

DETAILED DESCRIPTION OF THE PREFERRED EMBODIMENTS

Reference will now be made in more detail to the presently preferred embodiments of the systems of the invention as illustrated in the accompanying drawings, in which like numerals refer to like parts throughout the several views.

It is specially noted, in connection with the herein described preferred embodiment, that the instant system can measurably capture the opinions, including the evaluative approval opinions, of a population, or subpopulation, of users, by asking users to rate the degree of descriptive relevancy of natural-language terms or tags to the subject. In that manner, a user who is looking for a tasty (i.e., taste approved by the user), beautifully served (service and/or look of the plate approved by the user) dessert may use those potentially-descriptive natural-language terms (natural-language tags) in a search and find desserts that other users (hopefully like the searcher) have rated as desserts to which tasty and beautifully served were considered to be "approved" or "positive" or "pro" and highly relevant.

Further, in setting such relevancies, the user is given by the preferred embodiment of the instant system a discrete choice of, preferably, five levels of relevancy of a selected tag, to which can be applied numbers (like 1 through 5), and such ratings, used by a large population, can be "averaged" to obtain an overall rating for that tag to that subject. In determining such "overall rating", it is pointed out that the preferred embodiment of the instant system will preferably keep track of the number of times users prefer and/or rate the relevancy of any particular tag to any given subject, preferably as well as considering the numbers (e.g., 1 through 5) applied to the rating.

Further, in entering into the instant subject database the relevancy ratings of each of the subpopulation of rating users, distinctions are preferably (not necessarily) made as to the level of trust to be given to a particular user's rating; and the instant system uses, again, measurable factors for preferably assigning a "weight" to be given to that particular opinion when it is "averaged" and saved as an overall rating.

Further, when a user uses such natural-language terms or tags to search for subjects, the instant search engine finds those subjects having a high aggregate rating, considering all of the terms and/or other search options, e.g., an average of the overall ratings of the several, say, terms entered by the user in searching. Further, since, in normal word-of-mouth conversations among people, they often try to give and get approval-evaluation information by using such terms, the site operator will have a data "goldmine" about user's favorite such terms to use in favorably discussing the categories of subjects of such website; and such analyzed data will have a ready market at least in the advertising community.

It is also especially noted that, in order to help sell such systems to website operators, the developer should, in the software system design, preferably limit the operator's labor of management and other responsibilities and create automatic income—from which the developer may be paid well. The instant system, in the specific manners described herein, is a preferred embodiment of such a system, needing essentially no operator management—the software itself motivates and rewards the user community sufficiently to keep them doing the sorts of duties otherwise befalling an operator.

In this detailed description, presented first, along with some hardware information, will be on overall look at the systems of the preferred embodiment and the functional interaction among the parties and the system parts, in conjunction with diagrammatic charts. Then the detailed operation of the preferred embodiment will be presented in conjunction with screen diagrams. The various levels and kinds of descriptions herein are intended to be read in conjunction with each other in understanding the details of the described preferred embodiment of the invention.

Preferred System Details

Referring now to FIG. 1-A, an overview of a preferred embodiment of the present invention is shown. The present invention preferably comprises a computer system 1-8. The computer system 1-8 comprises input and output devices as is well known in the art. For example, the computer system 1-8 preferably comprises a display screen or monitor 1-4, a keyboard 1-16, a printer 1-14, a mouse 1-6, etc. The computer system 1-8 further preferably comprises a database 1-2 for storage of the data and software comprising preferred embodiments of the present invention. The computer system 1-8 is preferably connected to the Internet 1-12 that serves as the presently preferred communications medium. The Internet 1-12, as previously discussed, comprises a global network of networks and computers, public and private. The Internet 1-12 is the preferable connection method by the users 1-18, 1-20, 1-22 and 1-n in preferred embodiments of the present invention.

Referring now to FIG. 1-B, the computer system 1-8 is shown in more detail. The computer system 1-8 in a preferred embodiment comprises a database server 1-24 and a web server 1-26. The database server 1-24 preferably runs in a Windows NT environment and preferably utilizes Oracle 8.x as the database engine. The database server 1-24 preferably processes all Gepetto (batch) processes and email. Preferably all Gepetto processes are written in C++m and run as separate execution threads. The web server 1-26 also preferably runs in a Windows NT environment. The web server 1-26 operates as the web server and the servlet engine. Preferably the web server software is written in JAVA.

Referring to FIG. 1-C, a simplified functional diagram of a preferred embodiment of the present invention is shown. This figure shows the preferred relationships between a user 1-18 (exemplary of any number of users 1-18, 1-20, 1-22, 1-n), the internet 1-12, the web server 1-26 and the database server 1-24. As shown, a user 1-18 requests a page from the web site of the present invention. The user 1-18 is preferably connected via the internet 1-12, and the web page request initiates a call to a Java servlet. The servlet is run by the Jrun engine which makes a request to the database server 1-24, via the web server 1-26, and generates an HTML page for transmission to the user 1-18 following the database server's completion of the servlet's request and transmission of the requested data back to the web server 1-26. The web server 1-26 transmits the completed HTML page containing the data requested by the user 1-18 through the Internet 1-12 to the user 1-18.

It is noted that the following terms have about the following meanings when used in this description:

Contributor. An individual, who has been determined to be qualified and who has committed to a given level of effort to review and add subjects to the database for which he/she earns points in the contributor's pool of earned points. A contributor also is referred to as a correspondent.

Guest. An individual who registers, utilizes the database information and provides ratings, opinions, comments and feedback. A guest may earn points in the guest pool of earned points or additional access to database content for his/her contributions of ratings, comments, opinions, etc.

User. Term used to refer to either guests or contributors, or both, where no distinction of role is required.

Sponsor. A person, organization, or business that agrees to pay the company a monthly fee in return for the opportunity to add additional information about their subjects to the database or the opportunity to provide direct links to the sponsor's own web site.

Subject. Represents the information content that describes a specific product, service, topic, or a leisure or recreational activity contained in the database, preferably an exceptional experience. Each subject entry contains some "profile" information and the descriptive words or terms used to describe and rate the experience.

Experience. This term is used interchangeably with the term "subject" and is intended to have the same definition.

Figure 20:
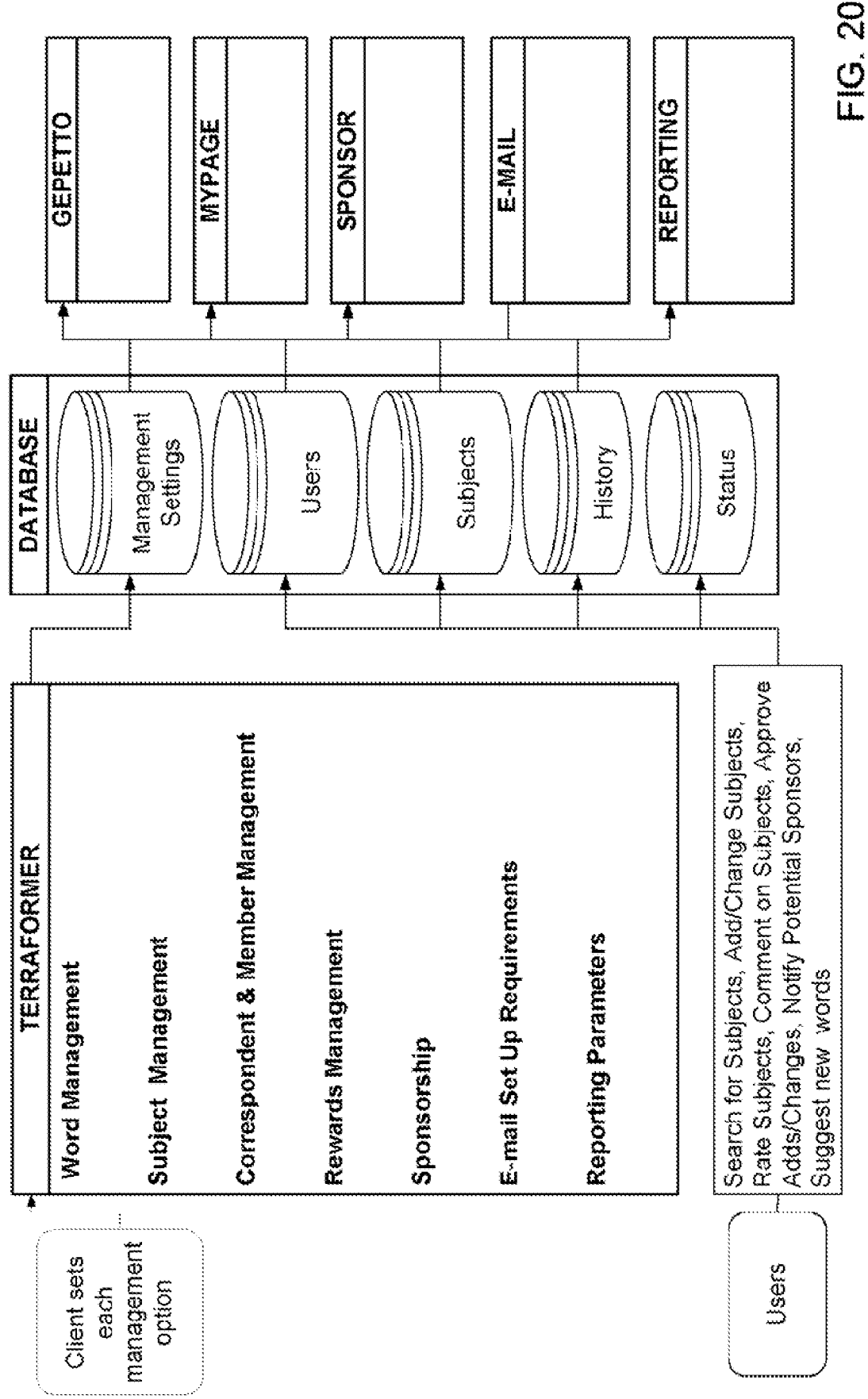
FIG. 20 is a diagrammatical view of the preferred instant software system.

Referring briefly to FIG. 20, a high level functional diagram of the process flows and functions in a preferred embodiment of the present invention is shown. Shown herein is that the client sets each management option for the Terraformer, used herein refer to the subsystem of the instant overall system used by customers (website owners) to configure the instant system as preferred by such customer. The Terraformer preferably comprises the following modules which will be explained in greater detail herein below: Word Management, Subject Management, Correspondent & Member Management, Rewards Management, Sponsorship, E-Mail Set Up Requirements, and Reporting Parameters. The Terraformer modules are coupled to the database tables. The database tables preferably comprise the following modules that will also be explained in greater detail herein below: Management Settings, Users, Subjects, History, and Status. Also shown is that the users may perform certain tasks or otherwise exercise functions, preferably comprising: Search for subjects, Add/Change Subjects, Rate Subjects, Comment on Subjects, Approve Adds/Changes, Notify Potential Sponsors, and Suggest new words. Further preferably linked to the Database are the main modules or functions: GEPETTO, MYPAGE, SPONSOR, E-MAIL, AND REPORTING.

Figure 2:
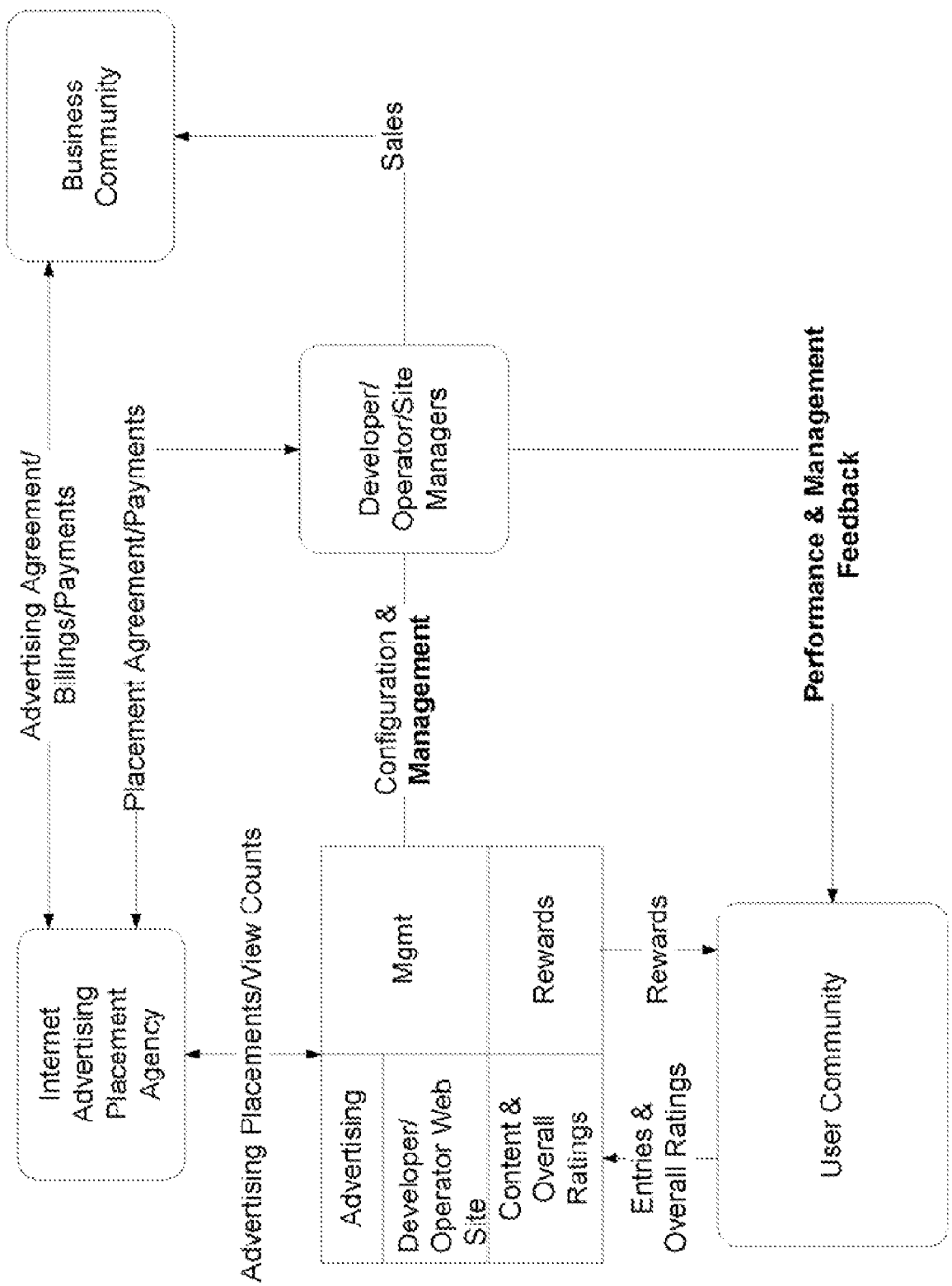
FIG. 2 is a diagrammatical view of a prior art system.

Referring now to FIG. 2, an overview of the prior art comprising an Internet Website serving a community of users to find subjects is shown. The prior art features a plurality of parties comprising an Internet Advertising Placement Agency, the Business Community, the User Community, and the Developer/Operator/Site Managers that interact or have the following relationships between them, with respect to each other and the centrally-located website software, as shown in FIG. 2 and summarized in Table 1 below.

TABLE 1

| Party | Function(s) - Relationships to Other Parties | Party |
|---|---|---|
| Internet Advertising Placement Agency | Advertising/Billings/Payments. Placement Agreement/Payments | Business Community |
| Business Community | Sales | Developer/Operator/Site Managers |
| | | Developer/Operator/Site Managers |
| Developer/Operator/Site Managers | Performance and Management Feedback | User Community |

Furthermore, in addition to the above, certain parties have direct responsibility for the Website control and content, and in fact must exercise those functions to maintain the operation of the Website and the interactions with the parties. The prior art Website example comprises components and associated programming of: Advertising, Content & Overall Ratings, Management, & Rewards under the control operation and management of the Developer/Operator. Each of these areas requires input or control from one of the parties. For example: the Internet Advertising Placement Agency is responsible for the Website Advertising Placements/View Counts affecting the Website content and programming; the user community is responsible for Entries & Overall Ratings into the Website, and receives Rewards distributed from the Website; and the Developer/Operator/Site Managers are directly responsible for the Configuration and Management of the Website. It should be noted that in general these functions are not automatic. The parties, in particular the Developer/Operator/Site Managers, must exercise essentially day-to-day control and management of the Website to assure that the users receive awards, the advertising content and placement is correct, the entries and overall ratings are valid, etc. Also, the Developer/Operator/Site Managers must interact directly with the user community to give Performance and Management Feedback.

Figure 3:
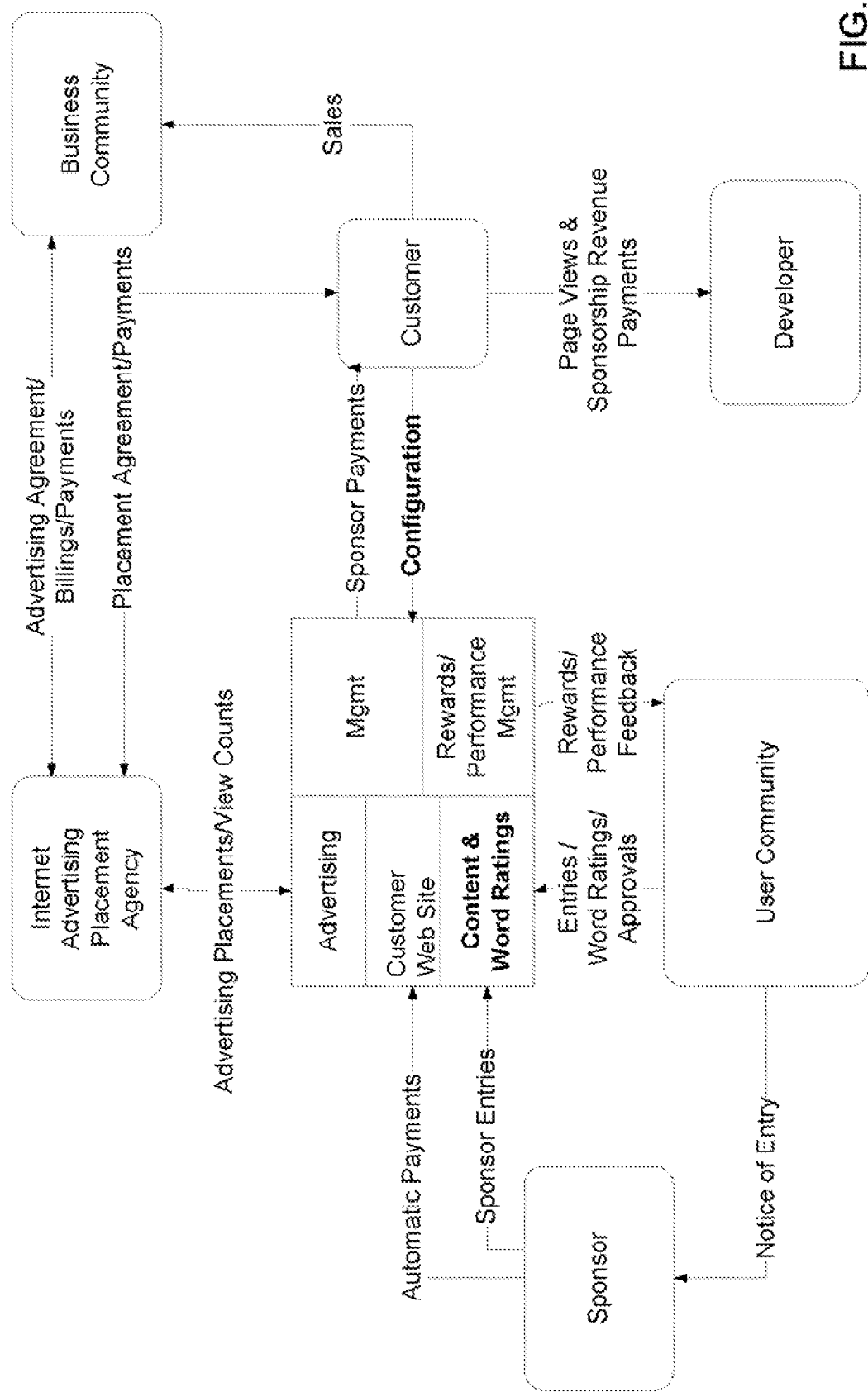
FIG. 3 is a diagrammatical view of a preferred embodiment of the instant system.

Referring now to FIG. 3, a preferred embodiment of the present invention, the instant system is shown (and will herein be sometimes referred to as the WOM™ system or a word-of-mouth system. Embodiments of the present invention contrast in very important ways from the prior art. Again, embodiments of the present invention feature a plurality of parties comprising an Internet Advertising Placement Agency, the Business Community, and the User Community. However, rather that a Developer/Operator/Site Manager, as in the prior art, who is tasked with direct management of the website, embodiments of the present invention comprise a Customer, a Developer and Sponsor(s). These parties interact or have the following relationships between them as shown in FIG. 3 and summarized in Table 2 below.

TABLE 2

| Party | Function(s) - Relationships to Other Parties | Party |
|---|---|---|
| Internet Advertising Placement Agency | Advertising/Billings/Payments. Placement Agreement/Payments | Business Community |
| Business Community | Sales | Customer |
| Customer | Page Views & Sponsorship Revenue Payments | Developer |
| User Community | Notice of Entry | Sponsor |

As shown, the prior art model in which the Operator/Site Managers had responsibility for Management of the Website and for Performance and Management Feedback to the User community has been eliminated. Embodiments of the present invention essentially do not have, nor require, an Operator/Site Manager party and their associated functions. Embodiments of the present invention comprise a Customer responsible only for the Website configuration as opposed to both configuration and management. Also, the customer now owns the Website instead of the Developer/Operator/Site Managers thus providing a lower cost solution to Website operation. The customer, in a preferred embodiment, forwards Page Views payments and Sponsorship payment sharing to a Developer who preferably need no longer have essential management functions.

As shown on FIG. 3, the Website preferably comprises components and associated programming of: Advertising, Content & Word Ratings (as opposed to Overall "star" Ratings), Management, & Rewards/Performance Management. As shown, many differences between the prior art and preferred embodiments of the present invention are present. The Website interaction between the User Community and the Website now comprises not only rewards but also performance feedback. Also, the User Community now provides to the Website not merely Entries and Overall Ratings, but instead Entries and Word (i.e., again, what is sometimes herein referred to as natural-language term, preferably evaluative, preferably approving) Ratings/Approvals. Furthermore, as will be explained in more detail, embodiments of the present invention preferably comprise another party—Sponsors. The Sponsors receive notice of entry from the User Community, and in turn provide automatically-set-up (by the website software) payments to the Website and Sponsor Entries into the Website. Additionally, Sponsor Payments are automatically sent to the Customer. Key features in preferred embodiments of the present invention are preferably that the Website essentially does not require Management by a Developer/Operator/Site Manager, and that the software of the Website performs management functions automatically. Also, the Website automatically interacts with the User Community to establish Content and natural-language term (herein sometimes called "Word") Ratings of relevance to a subject.

Figure 4:
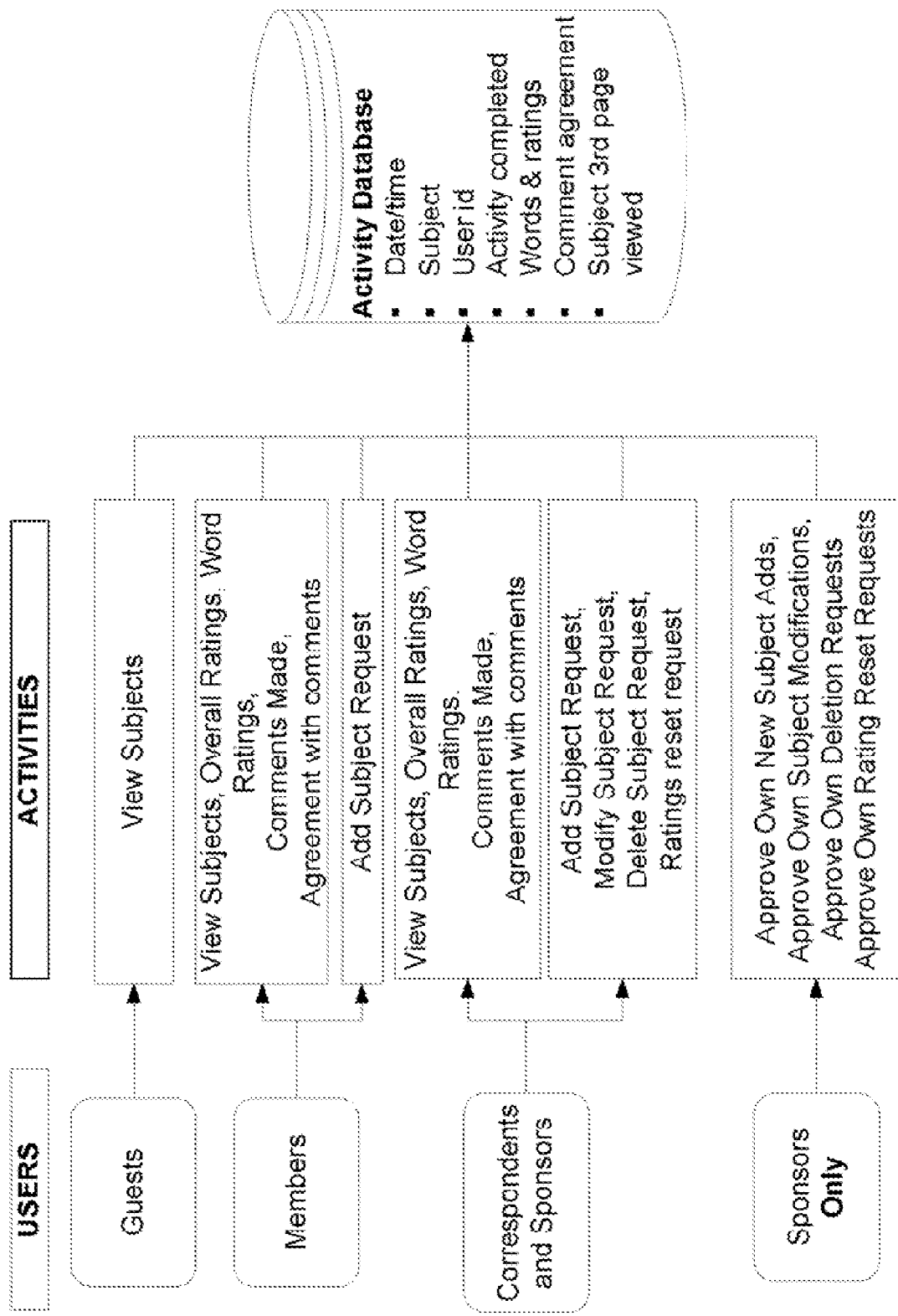
FIG. 4 is a diagrammatical view of the activity database.

Referring to FIG. 4, an overview functional diagram of the Activity Database of the main Database 1-2 (see FIGS. 1-A, 1-C, and 20) is shown. As shown, the Activity Database preferably comprises Activities performed by Users that cause data additions/changes to the Activity Database. The Users comprise: Guests, Members, Correspondents (also called Contributors herein) and Sponsors. The Users may take various actions or interact preferably as follows: Guests may View Subjects. In contrast, Members may View: Experiences, Overall Ratings, Word Ratings, Comments Made, and Agreement with comments. Additionally, Members may Add Subject Requests. Another class of Users, the Correspondents and Sponsors may also preferably View: Experiences, Overall Ratings, Word Ratings, Comments Made, and Agreement with comments. Furthermore, Correspondents and Sponsors may preferably Add Subject Requests, Modify Subject Requests, Delete Subject Requests, and submit Ratings Reset Requests. [It is noted that "Overall Ratings" has been used in these cases to refer to ratings of, e.g., 1 to 5 "stars" for the subject as a whole. When, in the instant preferred system, the natural-language term ratings of degree of relevance of each user are "averaged" (preferably "weighted" as herein after described) for a large number of users, this application refers to that "average" as an "overall" degree of relevance rating—i.e., not the same thing as the prior art Overall "star-type" rating; and the context hereof will make clear which use is intended.]

Additionally, Sponsors only preferably possess the additional privileges that allow them to: Approve their Own New Subject Adds, Approve their Own Subject Modifications, Approve their Own Subject Deletion Requests, and Approve their Own Rating Reset Requests. The activities by the Users may preferably be reflected in the Activity Database fields. The Activity Database fields preferably comprise: Date/time, Subject, User ID, Activity completed, Words & ratings, Comment agreement, and Subject 3rd page viewed fields.

Figure 5:
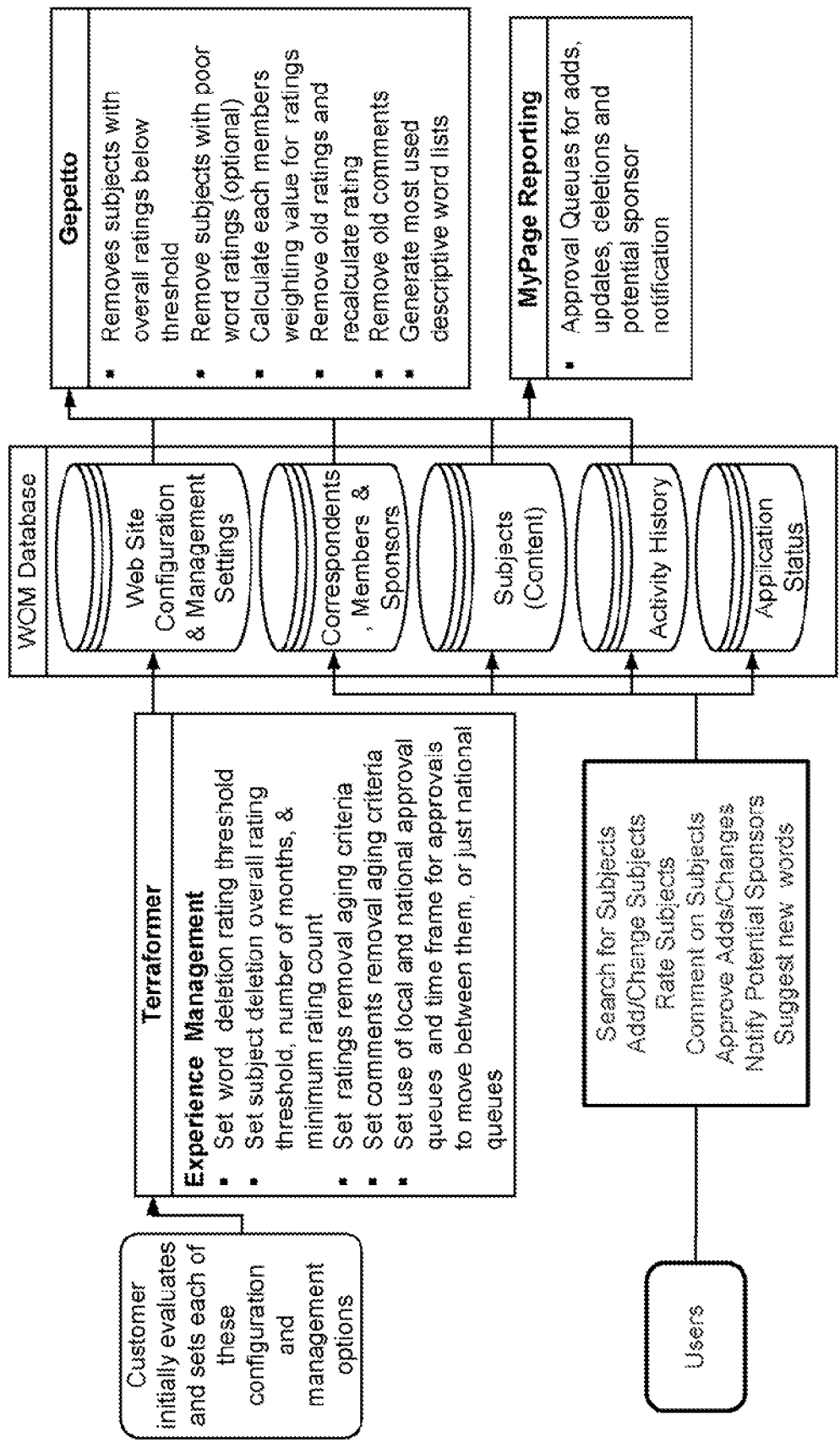
FIG. 5 is a diagrammatical view of the experience management automation.

Referring to FIG. 5, a high level functional diagram of the Experience Management Automation software is shown. The core of the Experience Management Automation software is preferably comprised within the Terraformer Module. The Terraformer Module performs Experience Management that preferably comprises the activities of allowing the Customer to: Set word deletion rating threshold; Set subject deletion overall rating threshold, number of months, & minimum rating count; Set ratings removal aging criteria; and Set use of local and national approval queues and time frame for approvals to move between them, or just national queues. For each of these activities, the customer preferably initially evaluates and sets each of these configuration and management options that are comprised within the Terraformer as desired. The Experience Management settings are preferably placed into the WOM Database where they affect and are stored in the Web Site Configuration & Management Settings table.

Users may interact with the Experience Management Automation software and perform activities that: Search for Subjects, Add/Change Subjects, Rate Subjects, Comment on Subjects, Approve Adds/Changes, Notify Potential New Sponsors, and Suggest New words. These activities affect the WOM Database tables: Correspondents, Members & Sponsors; Subjects (Content); Activity History; and Application Status.

The WOM database tables content and/or changes are preferably input to the Gepetto Module which will preferably: Remove subjects with overall ratings below threshold; Remove subjects with poor word ratings (optional); Calculate each members weighting value for ratings; Remove old ratings and recalculate ratings; Remove old comments, and Generate most used word descriptive word lists (at least herein embodying computing, for such involved subset of such population of users, in such database, an overall degree of relevance of each of such plurality of natural-language terms to such database subject). The WOM database tables content and/or changes are also preferably input to the MyPage Reporting Module which will assist implementation of the working of Approval Queues for adds, updates, deletions and potential sponsor notification.

Figure 6:
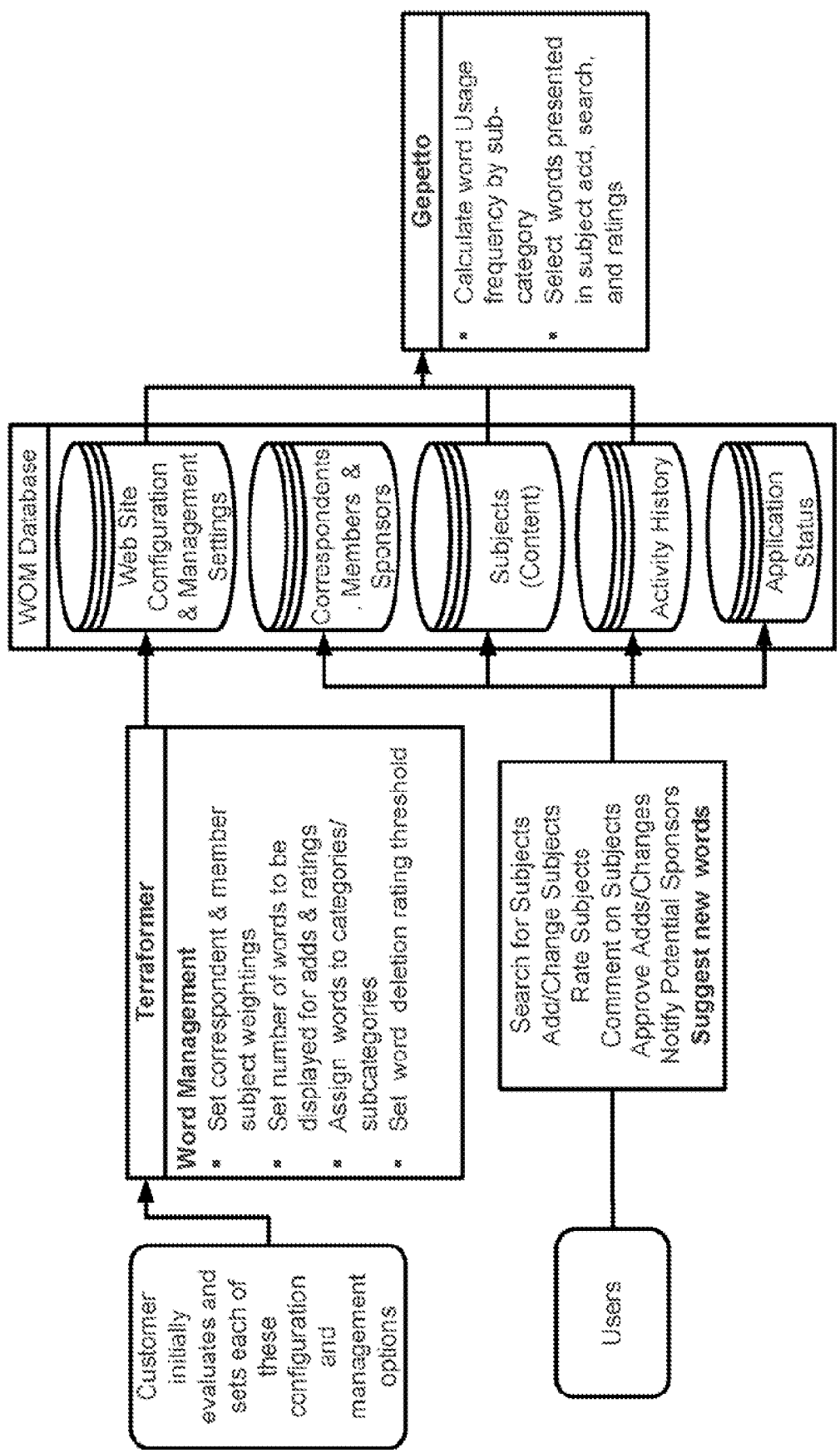
FIG. 6 is a diagrammatical view of the word management automation.

Referring to FIG. 6, a high level functional diagram of the Word Management Automation software is shown. The core of the Word Management Automation software is preferably comprised within the Terraformer Module. The Terraformer Module performs Word Management that preferably comprises the activities of allowing the Customer to: Set correspondent & member subject weightings; Set number of words to be displayed for adds & ratings; Assign words to categories/subcategories; and Set word deletion rating threshold. For each of these activities, the customer preferably initially evaluates and sets each of these configuration and management options that are comprised within the Terraformer as desired. The Word Management settings are preferably placed into the WOM Database where they affect and are stored in the Web Site Configuration & Management Settings table.

Users may interact with the Word Management Automation software and preferably perform activities that: Search for Subjects, Add/Change Subjects, Rate Subjects, Comment on Subjects, Approve Adds/Changes, Notify Potential New Sponsors, and Suggest New Words. These activities affect the WOM Database tables: Correspondents, Members & Sponsors; Subjects (Content); Activity History; and Application Status. The WOM database tables content and/or changes are preferably input to the Gepetto Module which will preferably: Calculate Word Usage frequency by sub-category; and Select Words presented in subject add, search, and ratings.

Figure 7:
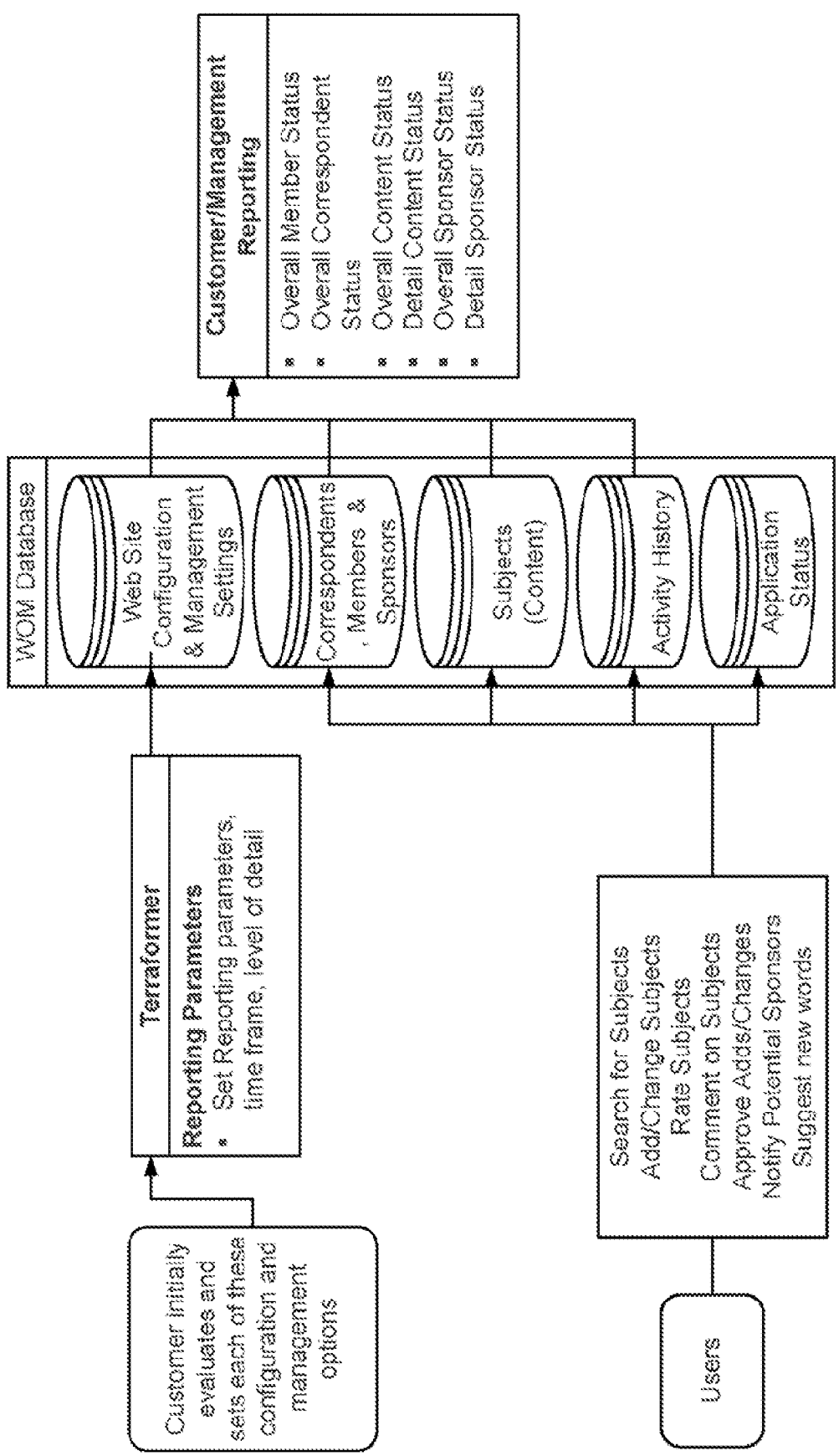
FIG. 7 is a diagrammatical view of reporting management automation.

Referring to FIG. 7, a high level functional diagram of the Reporting Management Automation software is shown. The core of the Reporting Management Automation software is preferably comprised within the Terraformer Module. The Terraformer Module comprises Reporting Parameters that preferably comprises the activity of allowing the Customer to Set Reporting parameters, time frame and level of detail. The customer preferably initially evaluates and sets the configuration and management options for the Reporting Parameters that are comprised within the Terraformer as desired. The Reporting Management settings are preferably placed into the WOM Database where they affect and are stored in the Web Site Configuration & Management Settings table.

Users may interact with the Reporting Management Automation software and preferably perform activities that: Search for Subjects, Add/Change Subjects, Rate Subjects, Comment on Subjects, Approve Adds/Changes, Notify Potential New Sponsors, and Suggest New words. These activities affect the WOM Database tables: Correspondents, Members & Sponsors; Subjects (Content); Activity History; and Application Status. The WOM database tables content and/or changes are preferably input to the Customer/Management Reporting module which will perform the functions of providing reporting for: Overall Member Status; Overall Correspondent Status; Overall Content Status; Detail Content Status; Overall Sponsor Status; and Detail Sponsor Status.

Figure 8:
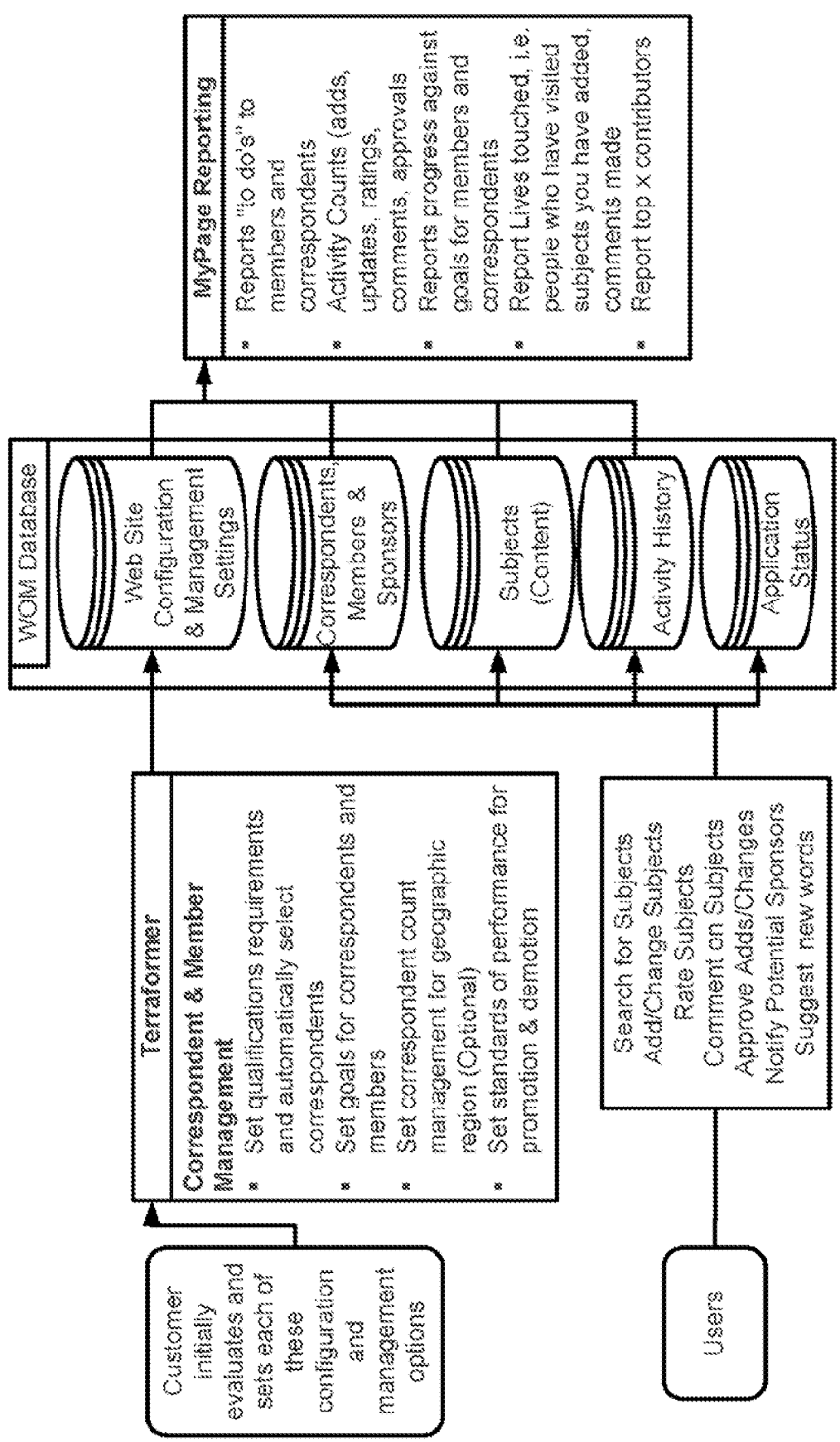
FIG. 8 is a diagrammatical view of the correspondent and member management automation.

Referring to FIG. 8, a high level functional diagram of the Correspondent & Member Management Automation software is shown. The core of the Correspondent & Member Management Automation software is preferably comprised within the Terraformer Module. The Terraformer Module comprises Correspondent & Member Management that comprises preferably activities to: Set qualifications requirements and automatically select correspondents; Set goals for correspondents and members; Set correspondent count management for geographic region (Optional); and Set standards of performance for promotion & demotion. The customer initially evaluates and sets the configuration and management options for the Correspondent & Member Management that are comprised within the Terraformer as desired. The Correspondent & Member Management settings are placed into the WOM Database where they preferably affect and are stored in the Web Site Configuration & Management Settings table.

Users may interact with the Correspondent & Member Management Automation software and perform activities that preferably: Search for Subjects, Add/Change Subjects, Rate Subjects, Comment on Subjects, Approve Adds/Changes, Notify Potential New Sponsors, and Suggest New words. These activities affect the WOM Database tables: Correspondents, Members & Sponsors; Subjects (Content); Activity History; and Application Status. The WOM database tables content and/or changes are preferably input to the MyPage Reporting module which provides information to the Correspondents and Members preferably comprising: Reports "to do's" to members and correspondents; Activity Counts (adds, updates, ratings, comments, approvals; Reports progress against goals for members and correspondents; Report Lives touched, i.e. people who have visited subjects you have added, and their comments made; and Report top "x" number of contributors.

Figure 9:
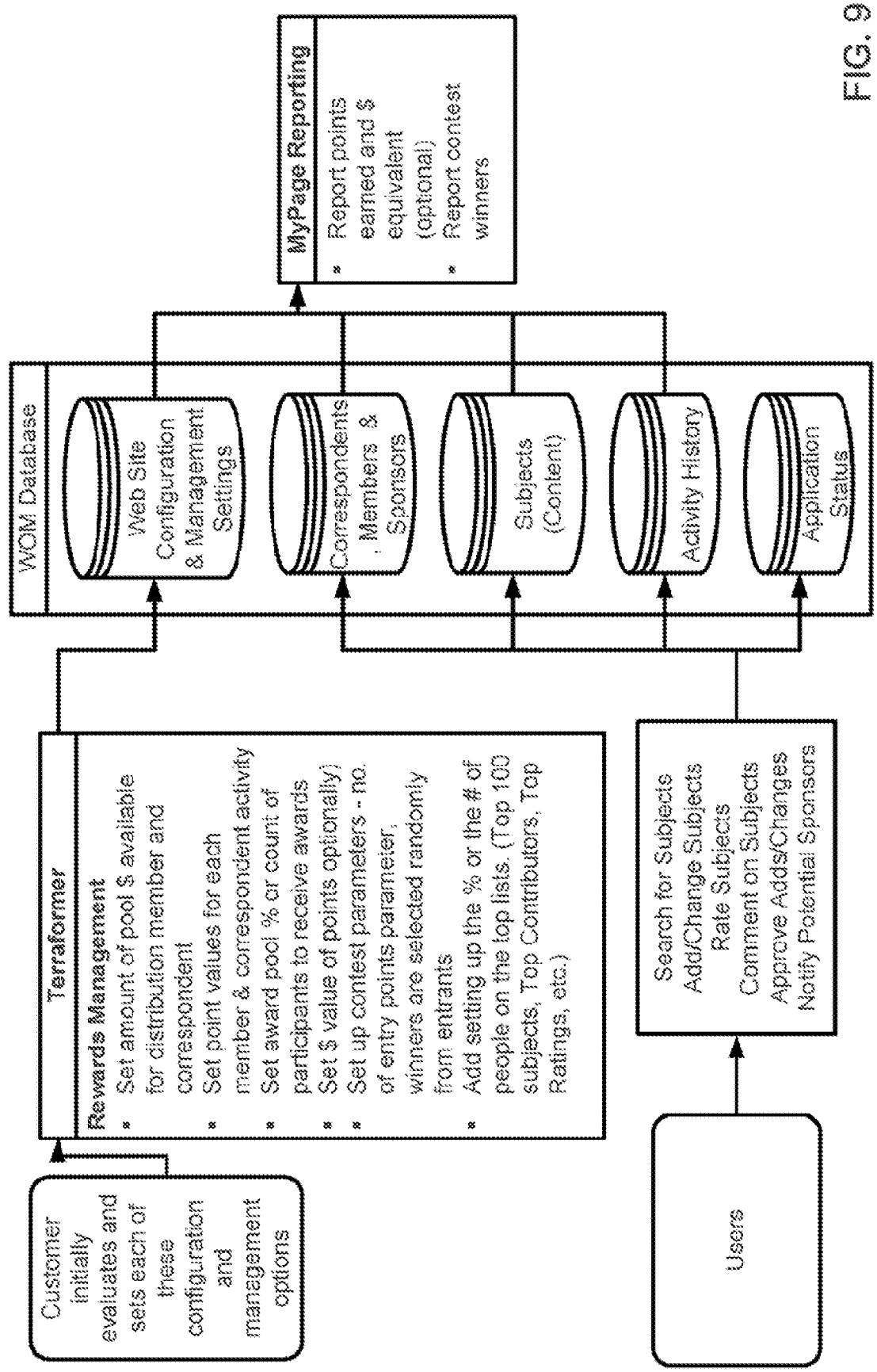
FIG. 9 is a diagrammatical view of the rewards management automation.

Referring to FIG. 9, a high level functional diagram of the Rewards Management Automation software is shown. The core of the Rewards Management Automation software is preferably comprised within the Terraformer Module. The Terraformer Module comprises the Rewards Management software that comprises, preferably, activities to: Set amount of the pool $ available for distribution to member and correspondent; Set point values for each member & correspondent activity; Set award pool percentage (%) or count of participants to receive awards; Set dollar ($) value of points (optionally); Set up contest parameters e.g.: Number of entry points parameter, winners are selected randomly from the entrants, etc.; and Add setting the % or the number (#) of people on the top lists (Top 100 subjects, top Contributors, Top Ratings, etc.). The customer initially evaluates and sets the configuration and management options for the Rewards Management that are comprised within the Terraformer as desired. The Rewards Management settings are placed into the WOM Database where they preferably affect and are stored in the Web Site Configuration & Management Settings table.

Users may interact with the Rewards Management Automation software and perform activities that preferably: Search for Subjects, Add/Change Subjects, Rate Subjects, Comment on Subjects, Approve Adds/Changes, and Notify Potential New Sponsors. These activities affect the WOM Database tables: Correspondents, Members & Sponsors; Subjects (Content); Activity History; and Application Status. The WOM database tables content and/or changes are preferably input to the MyPage Reporting module which provides information preferably comprising: Report points earned and $ equivalent (optional); and Report contest winners.

Figure 10:
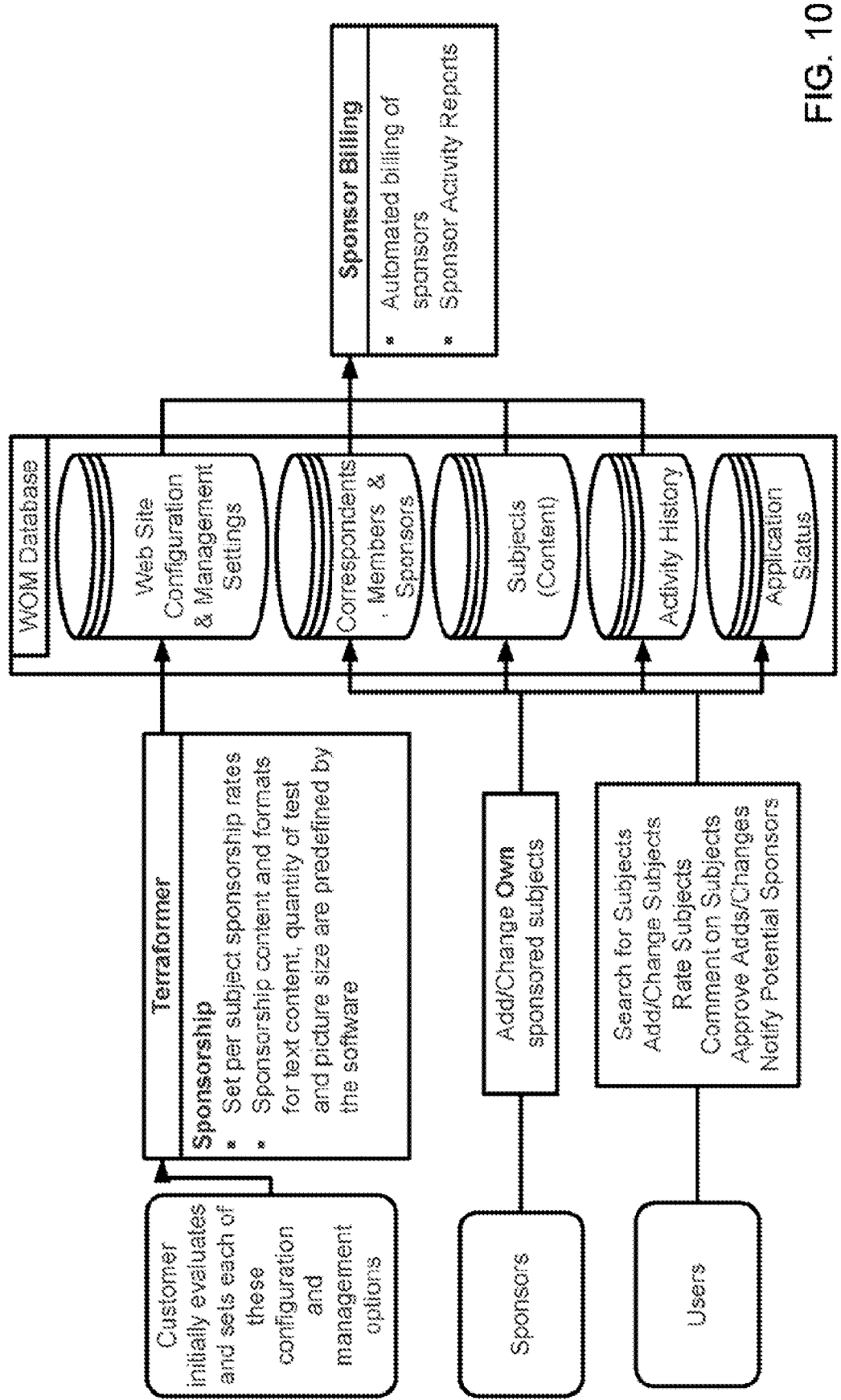
FIG. 10 is a diagrammatical view of the sponsorship management automation.

Referring to FIG. 10, a high level functional diagram of the Sponsorship Management Automation software is shown. The core of the Sponsorship Management Automation software is preferably comprised within the Terraformer Module. The Terraformer Module comprises the Sponsorship software that comprises, preferably, activities to Set per experience sponsorship rates. The Sponsorship content and formats for text content, quantity of test and picture size are preferably predefined by the software. The customer initially evaluates and sets the configuration and management options for the Sponsorship Management that is comprised within the Terraformer as desired. The Sponsorship Management settings are placed into the WOM Database where they preferably affect and are stored in the Web Site Configuration & Management Settings table.

Users may interact with the Sponsorship Management Automation software and perform activities that preferably: Search for Subjects, Add/Change Subjects, Rate Subjects, Comment on Subjects, Approve Adds/Changes, and Notify Potential New Sponsors. These activities affect the WOM Database tables: Correspondents, Members & Sponsors; Subjects (Content); Activity History; and Application Status. The WOM database tables content and/or changes are preferably input to the Sponsor Billing module which preferably provides functions comprising the Automated billing of Sponsors and Sponsor activity reports.

Figure 11:
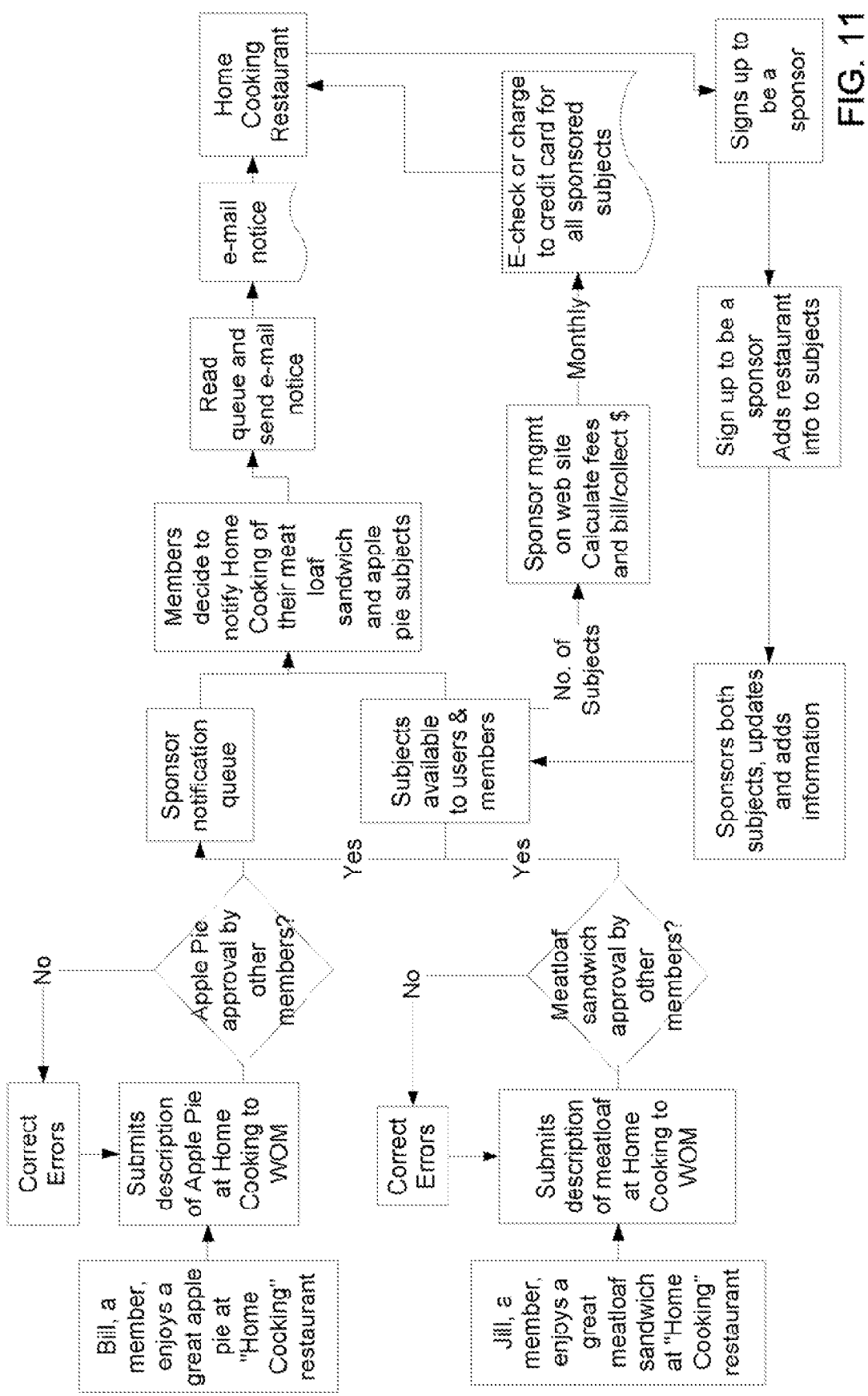
FIG. 11 is a diagrammatical view of the sponsorship process.

Referring to FIG. 11, a diagrammatical view of sponsorship depicting two example Sponsorship flows is shown. As shown, Bill, a member, enjoys a great apple pie at "Home Cooking" restaurant. Bill desires to share this wonderful experience. Therefore, Bill submits a description of the Apple Pie at Home Cooking to WOM. The description of the Apple Pie is available on WOM for Approval of the Apple Pie by other members. If the members do not approve the Apple Pie description submission, then the Apple Pie description is returned to Bill for correction of the errors. Following approval of the Apple Pie description by the members, the Apple Pie description is preferably submitted to the Sponsor notification queue, and preferably is also made available under the Subjects available to the users and members.

With reference to the Sponsor notification queue, the members may decide to Notify the Home Cooking restaurant of their apple pie subject, and any other pending subject for the Home Cooking Restaurant. The Sponsorship software will read the queue and preferably send an e-mail notice to the Home Cooking Restaurant. The Home Cooking Restaurant may now decide if they choose to Sign up to be a sponsor. If the Home Cooking Restaurant chooses to Sign up to be a Sponsor, they may now add restaurant information to the Subject data that initiated the Sponsor notification i.e. the "great apple pie".

The Sponsorship process may be repeated as often as desired. For example, Jill, a member, enjoys a great meatloaf sandwich at "Home Cooking" restaurant. Jill desires to share this wonderful experience. Therefore, Jill submits a description of the Meatloaf sandwich at Home Cooking to WOM. The description of the Meatloaf sandwich is available on WOM for Approval of the Meatloaf sandwich by other members. If the members do not approve the Meatloaf sandwich description submission, then the Meatloaf sandwich description is returned to Jill for correction of the errors. Following approval of the Meatloaf sandwich description by the members, the Meatloaf sandwich description is preferably submitted to the Sponsor notification queue (as was the great apple pie), and preferably is also made available under the Subjects available to the users and members.

Once in the Sponsor notification queue, the members may decide to Notify the Home Cooking restaurant again, this time concerning their Meatloaf sandwich subject, and any other pending subject for the Home Cooking Restaurant. The Sponsorship software will read the queue and preferably send an e-mail notice to the Home Cooking Restaurant. The Home Cooking Restaurant may now decide if they choose to Sign up to be a sponsor of the Meatloaf sandwich. If the Home Cooking Restaurant chooses to again Sign up to be a Sponsor, they may now add restaurant information to the Subject data that initiated the Sponsor notification i.e. the "great meatloaf sandwich". The Home Cooking restaurant may also update any other subjects they have such as the "great apple pie".

The Sponsored information on the great apple pie and meatloaf sandwich subjects, including any updates is preferably then made available to users and members. The total number of Subjects sponsored is input to the Sponsor Management software on the Website which generates the fees due from the Home Cooking restaurant and bills the Home Cooking restaurant, preferably on a monthly basis, in order to collect the money due. The Home Cooking restaurant, once billed, may pay for their sponsorship, preferably using an E-check or by charging a credit card for all sponsored subjects.

Figure 12:
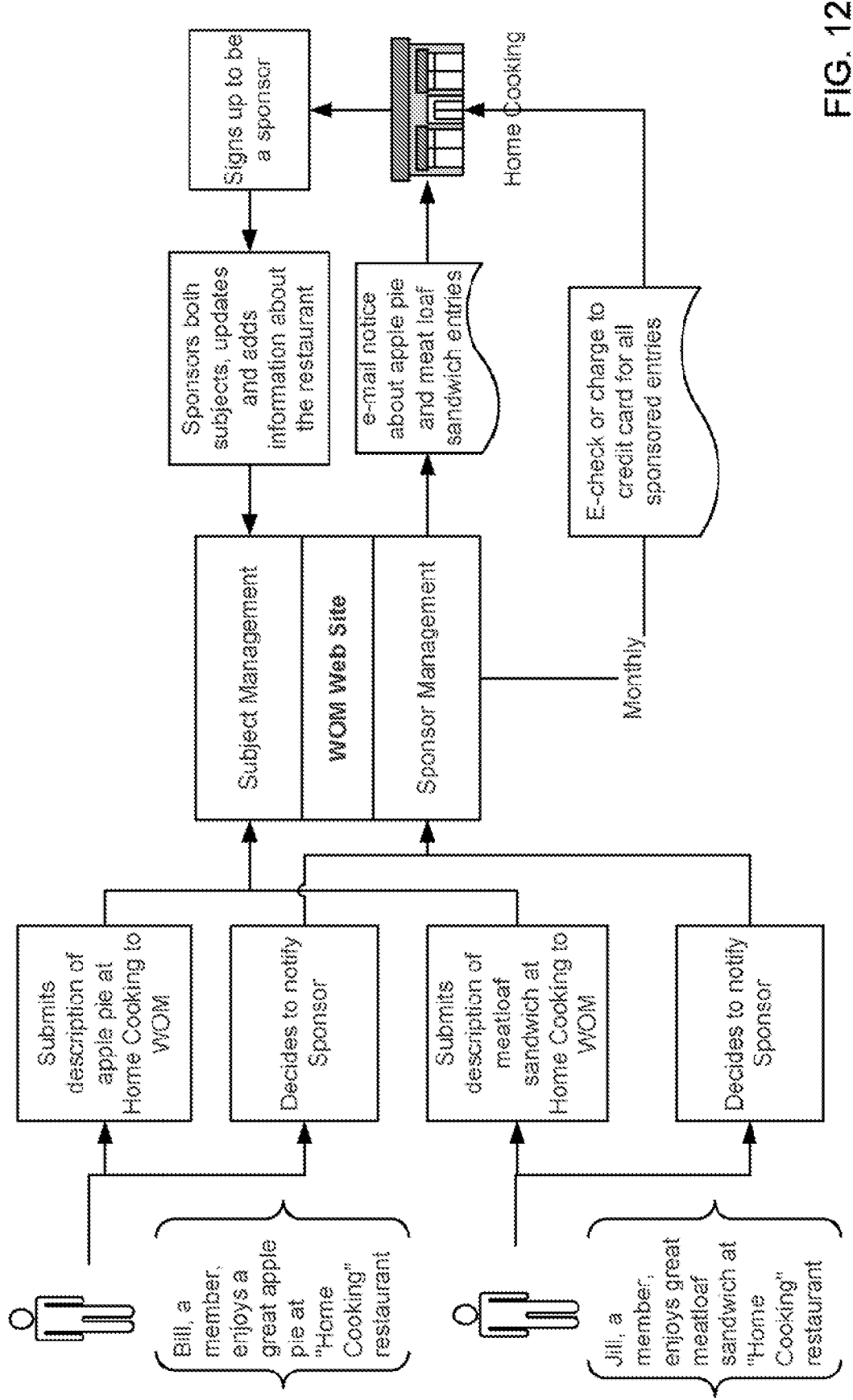
FIG. 12 is a further diagrammatical view illustrating the automated management of sponsorships.

Referring to FIG. 12, a further diagrammatical view of the sponsorship process of FIG. 11 is shown. The process described in reference to FIG. 11 embodies an important feature of the present invention. As shown, the Subject Management and Sponsor Management did not require the intervention of a Developer/Operator/Site Managers as shown in the prior art of FIG. 2. Rather, in this preferred embodiment of the present invention, the WOM Website software automatically processed the E-mail notice(s) regarding sponsorship of the apple pie and meatloaf sandwich entries. The WOM Website software further automatically processed the Subject updates, information additions, etc., and also automatically processed the billing and payment by E-check or credit card for the sponsored entries by the Home Cooking restaurant.

Figure 13:
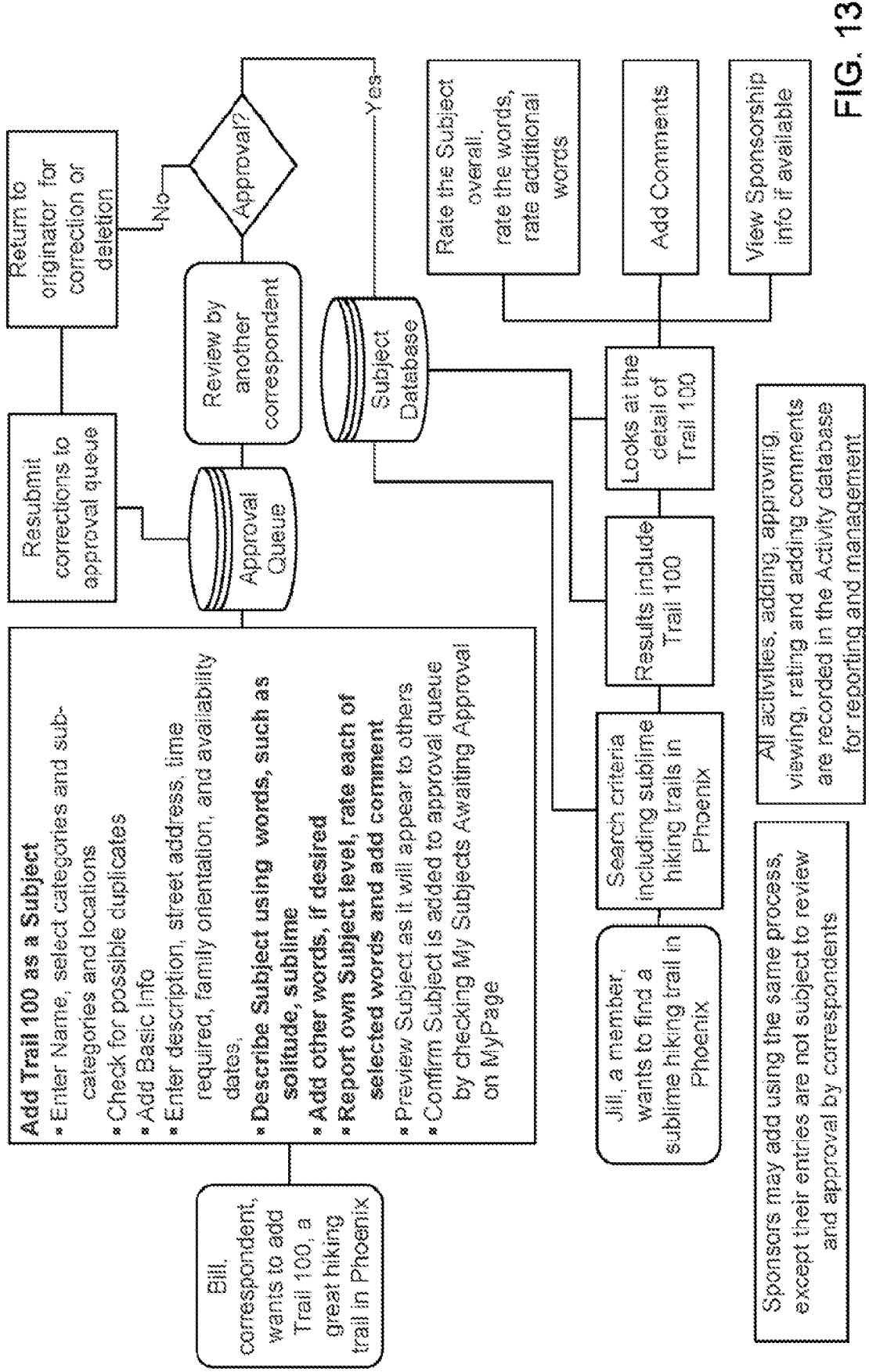
FIG. 13 is a diagrammatical view of adding and viewing subjects.

Referring to FIG. 13, a diagrammatical view of the process of adding and viewing subjects is shown. In this example Bill, a correspondent, wants to add Trail 100, a great hiking trail in Phoenix to the Subjects. After accessing the WOM Website, Bill Adds Trail 100 as a Subject. Bill will be presented with screens by the WOM software that will preferably allow Bill to:

Enter the subject Name, select categories and subcategories and location;

Check for possible duplicates;

Add Basic Information;

Enter a description, street address, time required, family orientation, and availability dates;

Describe the Subject using words or terms (tags), such as for example: solitude, sublime, etc (at least herein embodying describing a database subject using a plurality of natural-language terms, each of such plurality of natural-language terms having relevance to the subject according to an involved subset of such population of users);

Add other words as desired;

Report his own Subject level, rate each of the selected words and add comments as desired (at least herein embodying rating the degree of relevance of each of such plurality of natural-language terms to such database subject according to each of such involved subset of such population of users);

Preview the Subject as it will appear to others on the WOM Website;

Confirm the Subject is added to approval queue by checking the MySubjects Awaiting Approval on MyPage.

The Subject is then preferably placed into the Approval Queue for Review by another correspondent(s). If the reviewing correspondent(s) do not grant Approval of the Subject, the Subject submission is returned to the Originator, Bill, for correction or deletion. Following correction by the Originator, Bill, the Subject Submission is again preferably placed into the Approval Queue for review by another correspondent(s). Following a grant of Approval by the reviewing Correspondent(s), the submitted and approved Subject is placed into the Subject Database. It should be noted that, preferably, Sponsors may add Subjects using the same process, except that their entries are not subjected to review and approval by correspondents.

Now consider a member desiring to view a Subject. For example, Jill, a member, wants to find a hiking trail in Phoenix. Jill may access the WOM Website from a computer and submit search criteria including "sublime" hiking trails in Phoenix. The search is run in the Subject Database and the results returned to Jill at her computer for viewing. The results will include the Trail 100 as Bill had used the word "Sublime" when describing the Subject. Jill may now choose to look at the detail concerning Trail 100. Jill may further preferably choose to: Rate the Subject overall, rate the words, and/or rate additional words; Add comments; or View Sponsorship information is such is available.

The WOM Website software will also function such that All activities, adding, approving, viewing, rating and adding comments are recorded in the Activity database for reporting and management.

Figure 14:
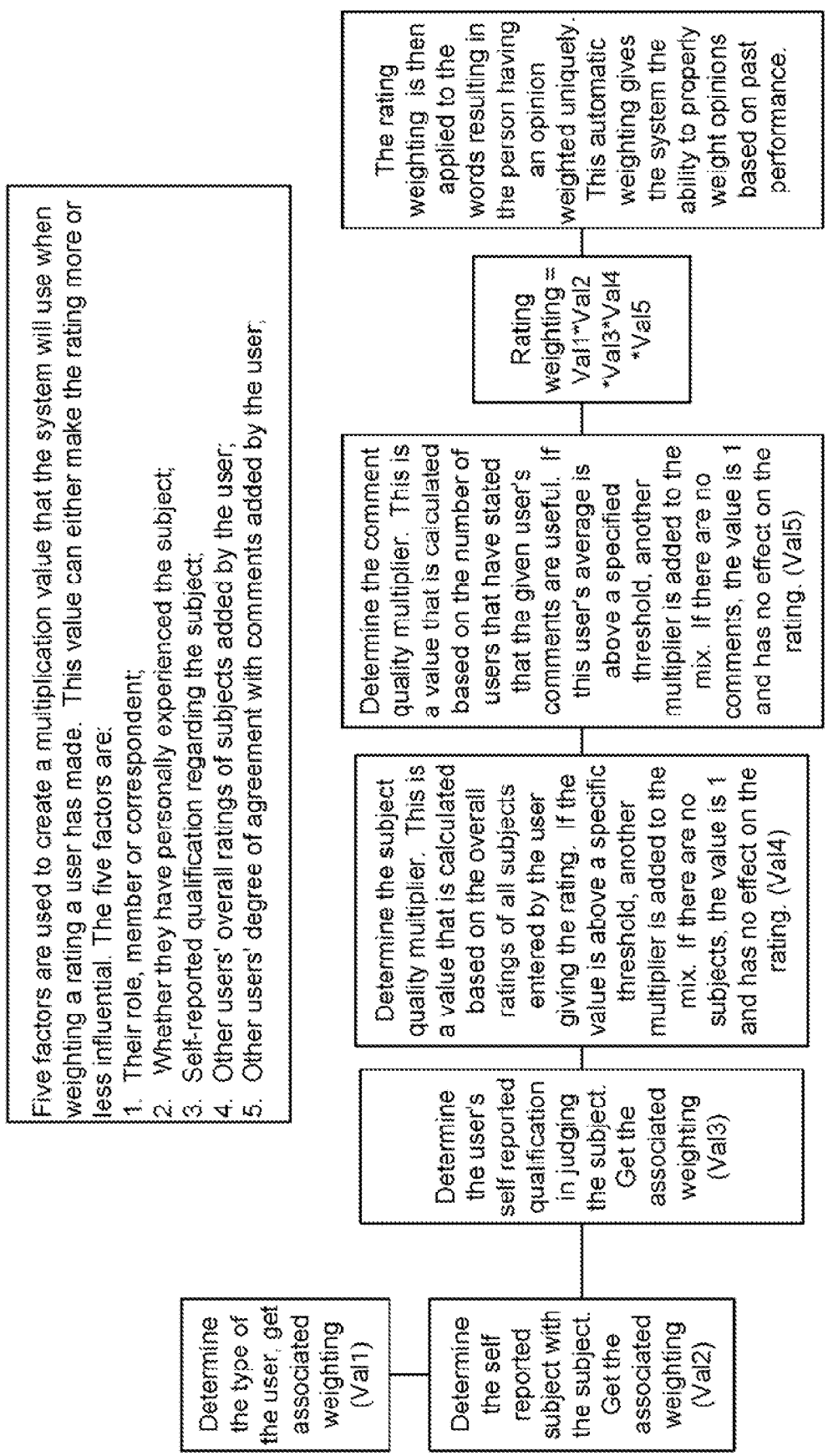
FIG. 14 is a diagrammatical view of the weighting of overall subject and descriptive word ratings.

Referring now to FIG. 14, a diagrammatical view of the weighting of overall subject and descriptive word ratings is shown. Five factors are used to create a multiplication value that the system will use when weighting a "degree of relevancy" rating which a user has made. This value can either make the rating more or less influential. The five factors are:

1. Their role, member or correspondent;
2. Whether they have personally experienced the subject;
3. Self-reported qualification regarding the subject;
4. Other users' overall ratings of subjects added by the user; and
5. Other users' degree of agreement with comments added by the user.

The process of the weighting of overall subject and descriptive words/terms ("tags", i.e., as noted, natural-language terms having descriptive and/or indicating and/or indexing potential when applied to a database of "subjects", often and preferably evaluative, often and preferably approving) degree-of-relevancy ratings preferably comprises the following steps:

1. Determine the type of the user, get the associated weighting value (Val1);
2. Determine the self reported experience with the subject. And, get the associated weighting value (Val2);
3. Determine the user's self reported qualification in judging the subject. And, get the associated weighting value (Val3);
4. Determine the subject quality multiplier value (Val4).
   This is a value that is calculated based on the overall ratings of all subjects entered by the user giving the rating. If the value is above a specific threshold, another multiplier is preferably added to the mix. If there are no subjects, preferably the value is 1 and has no effect on the rating.
5. Determine the comment quality multiplier value (val5).
   This is a value that is calculated based on the number (i.e., percentage) of users that have stated that the given user's comments are useful. If this user's such average (i.e., percentage) is above a specified threshold, preferably another multiplier is added to the mix. If there are no comments, preferably the value is 1 and has no effect on the rating.
6. The Rating weighting is calculated by multiplying the values
   i.e. Rating weighting=Val1*val2*val3*val4*val5
7. The rating weighting is then applied to the degree-of-relevancy opinions resulting in the user/person having an opinion weighted uniquely. This preferred automatic weighting gives the system the ability to properly weight opinions based on past performance.

Figure 15:
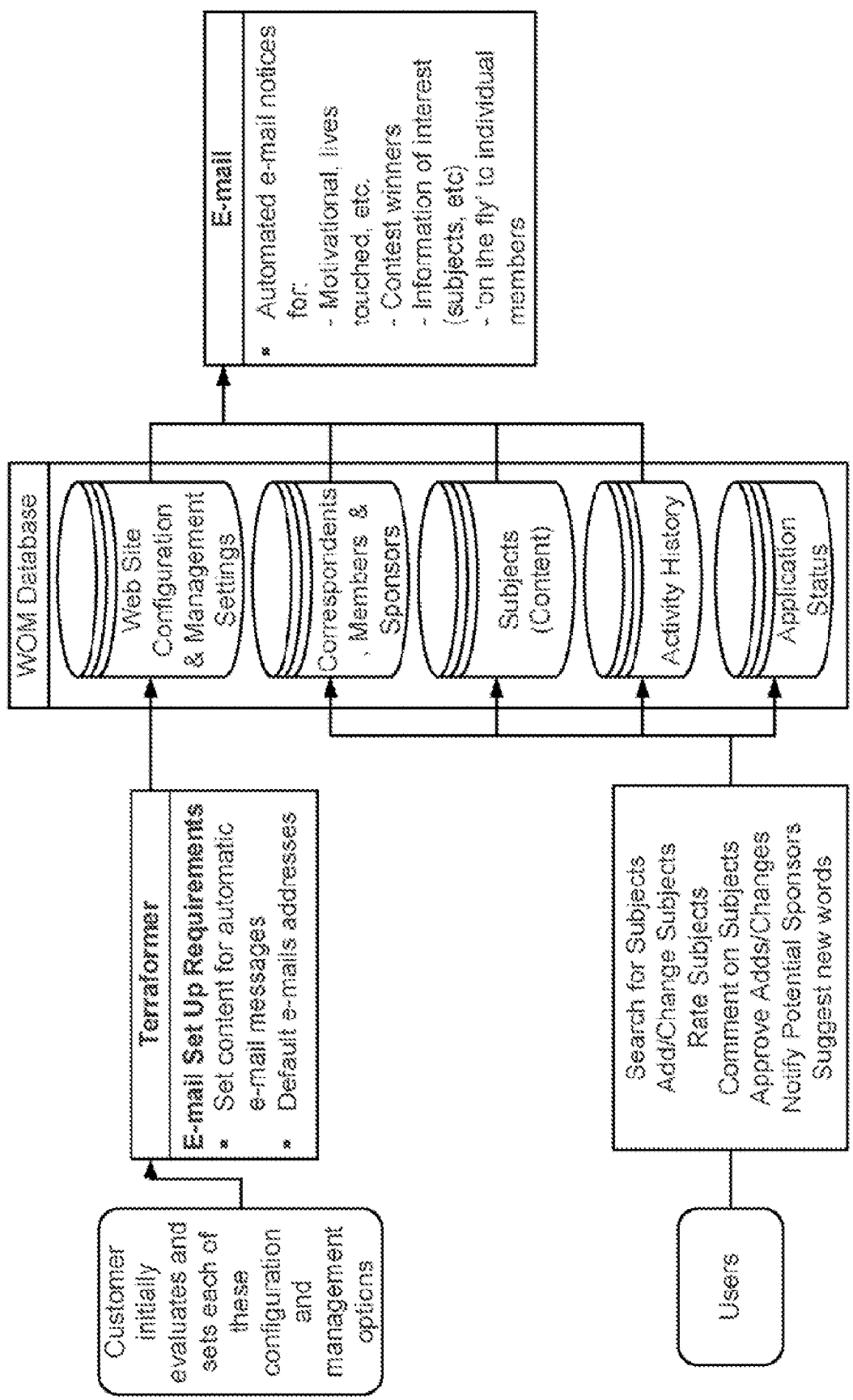
FIG. 15 is a diagrammatical view of the e-mail management automation.

Referring to FIG. 15, a high level functional diagram of the E-mail Management Automation software is shown. The core of the E-mail Management Automation software is preferably comprised within the Terraformer Module. The Terraformer Module performs E-mail Management that preferably comprises the E-mail Set Up Requirements activities of allowing the Customer to: Set content for automatic e-mail messages, and Set Default e-mails addresses. For each of these activities, the customer preferably initially evaluates and sets each of these configuration and management options that are comprised within the Terraformer as desired. The E-mail Management settings are preferably placed into the WOM Database where they affect and are stored in the Web Site Configuration & Management Settings table.

Users may interact with the E-mail Management Automation software and preferably perform activities that: Search for Subjects, Add/Change Subjects, Rate Subjects, Comment on Subjects, Approve Adds/Changes, Notify Potential New Sponsors, and Suggest New Words. These activities affect the WOM Database tables: Correspondents, Members & Sponsors; Subjects (Content); Activity History; and Application Status. The WOM database tables content and/or changes are preferably input to the E-mail Module which will preferably provide for Automated e-mail notices comprising: Motivational emails of lives touched, etc.; Contest Winners; Information of Interest (Subjects, etc.); and 'On the fly' emails to individual members.

Figure 16:
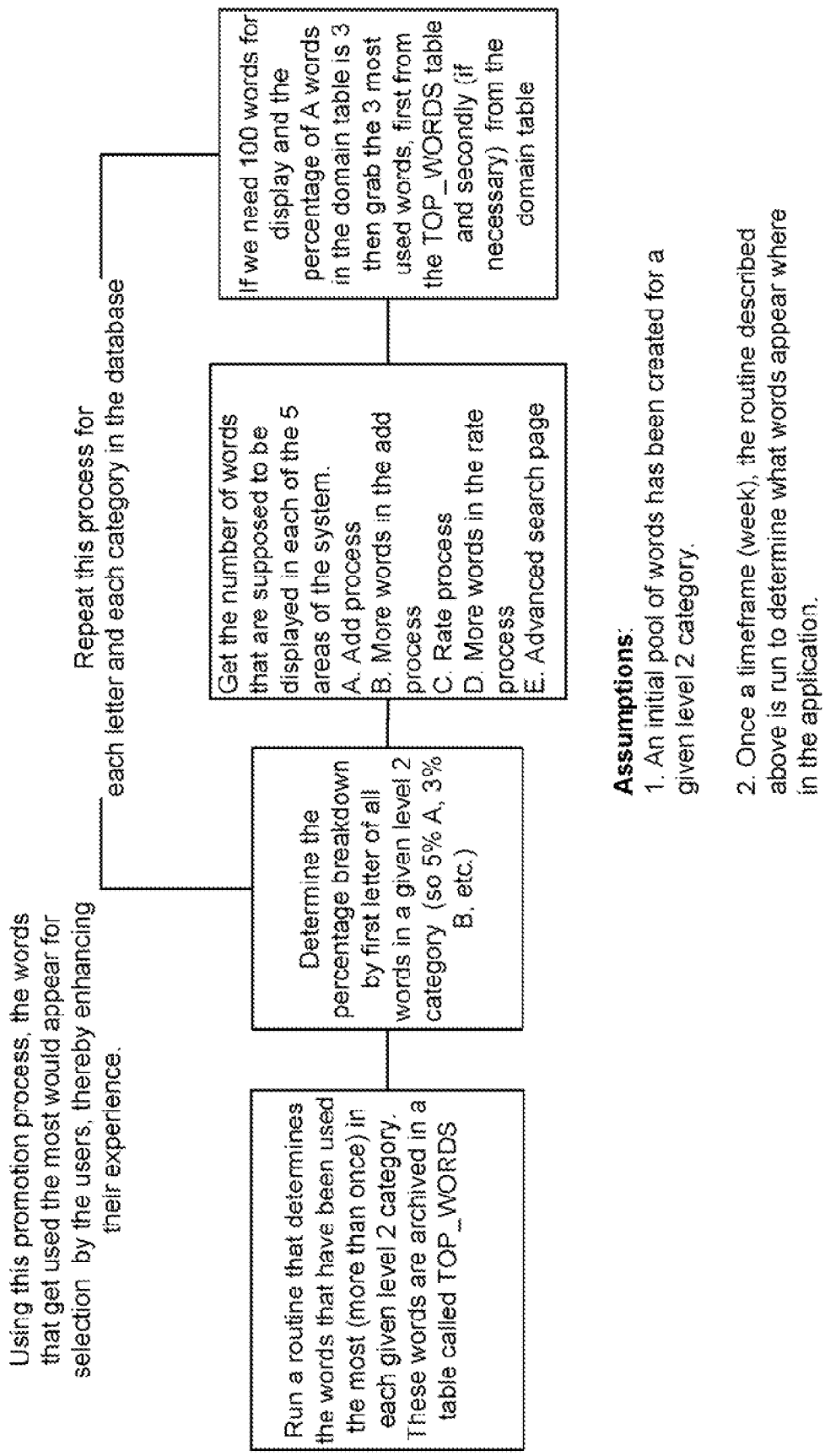
FIG. 16 is a diagrammatical view of the descriptive word promotion.

Referring to FIG. 16, a diagrammatical view of the descriptive word or term promotion functional flow is shown. By virtue of the WOM Website software having used this promotion process, the words that get used the most would appear for selection by the users, thereby enhancing their experience. The descriptive word or "tag" promotion software preferably comprises the following steps:

1. Run a routine that determines the words that have been used (selected by users) the most (more than once) in each given level 2 category. These words are archived in a table called TOP_WORDS;
2. Determine the percentage breakdown by first letter of all words in a given level 2 category (e.g. 5% A, 3% B, etc.)
3. Get the number of words that are supposed to be displayed in each of the five areas of the system where such lists are displayed.
   A. Add process
   B. More words (tags) in the add process
   C. Rate process
   D. More words (tags) in the rate process
   E. Advanced search page
   Note: If we need 100 words (tags) for display and the percentage of A words in the domain table is 3% then grab the 3 most used words (tags), first from the TOP_WORDS table and secondly (if necessary) from the domain table.

The descriptive word (tag) promotion software will preferably repeat this process for each letter and each category in the database. The descriptive word promotion software preferably has certain assumptions programmed into it, preferably comprising: 1. An initial pool of words has been created for a given level 2 category; and 2. Once each timeframe (preferably per week), the routine described above is run to determine what words appear where in the application.

Figure 17:
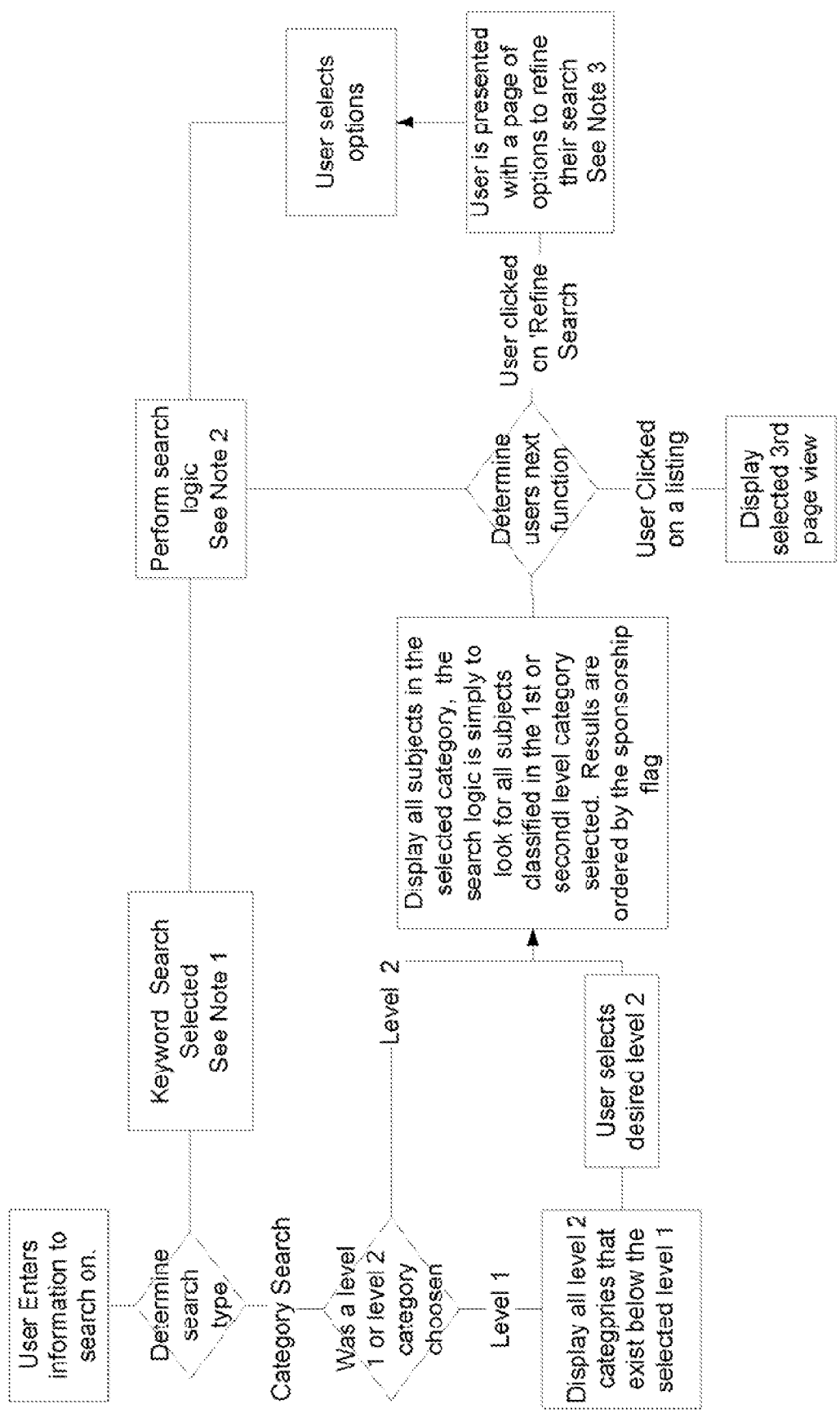
FIG. 17 is a diagrammatical view of the subject search process.

Referring now to FIG. 17, a flow chart of the preferred flow for a subject search is shown. Notes applicable to FIG. 17 are shown in FIG. 18. The subject search flow shown on FIG. 17 is as follows: A User Enters information to on which to search. The software will determine the search type. If the software determines that a Keyword search is selected, then the procedure of Note 1 is preferably performed.

The Note 1 procedure preferably comprises the steps of:
1. Locate any entries in the database that match the keywords specified. The keywords in the database are made up of the following:
   a. Organization Name
   b. Descriptive Words (natural-language terms or tags)
   c. Category Descriptors
   d. Subject Description
2. The keywords (natural-language terms or tags) located must be rated greater than a given value before a subject qualifies as a match.

Following the Keyword search selected procedure, the software next Performs the search logic procedure step as explained in Note 2. The Note 2 procedure preferably comprises the steps of:
1. The search logic is as follows: Search for a subject that meets the original criteria specified, plus the following:
2. If a location field was specified, finds all subjects that are in that location. If a city was specified, check the subjects' cities field.
3. If an appeal word was checked or entered in the free form entry box, check for subjects that have that descriptive word. If time or cost were specified, add these values to the selection criteria.

The software next determines the user's next selected function. If the user clicked on 'Refine Search', the User is presented with page of options to refine their search as explained in Note 3. The Note 3 procedure preferably comprises the steps of:
1. Any option selected by the user will be applied in conjunction with the original criteria to further qualify the results of the query. The options presented to the user include the following:
   a. Location: City, State, Zip.
   b. What appeals to you: A list of words (natural-language terms or tags) selected by the system that have been used most often to describe the subjects included in the given category.
   c. Free form word field: A location where the user can put a word or words that did not appear in 'What appeals to you'.
   d. Amount of money you would like to spend.
   e. Amount of time you would like to spend.

Following the option presentation of the option selections, and the User selection of any desired options and the software performs the search Logic Step as previously explained.

If the User clicked on a listing entry, then the software will Display the selected $3^{rd}$ page view to the user.

Returning now to the beginning, where the software will determine the search type, if a category search is selected, the software will ask was a level 1 or a level 2 category chosen? If a Level 1 was chosen then the software will Display all level 2 categories that exist below the selected level 1. The user will then select the desired level 2, after which the software will Display all subjects in the selected category. The search logic is simply to look for all subjects classified in the 1st or 2nd level category selected, and the results are ordered by the sponsorship flag. Following the Display of all subjects in the selected category, the software will next determine the user's next function as already explained. If, however, a level 2 was directly chosen following the selection of a Category search, then the software will go directly to the Display of all subjects in the selected category step, the determine users next function, etc. as previously explained.

Figure 19:
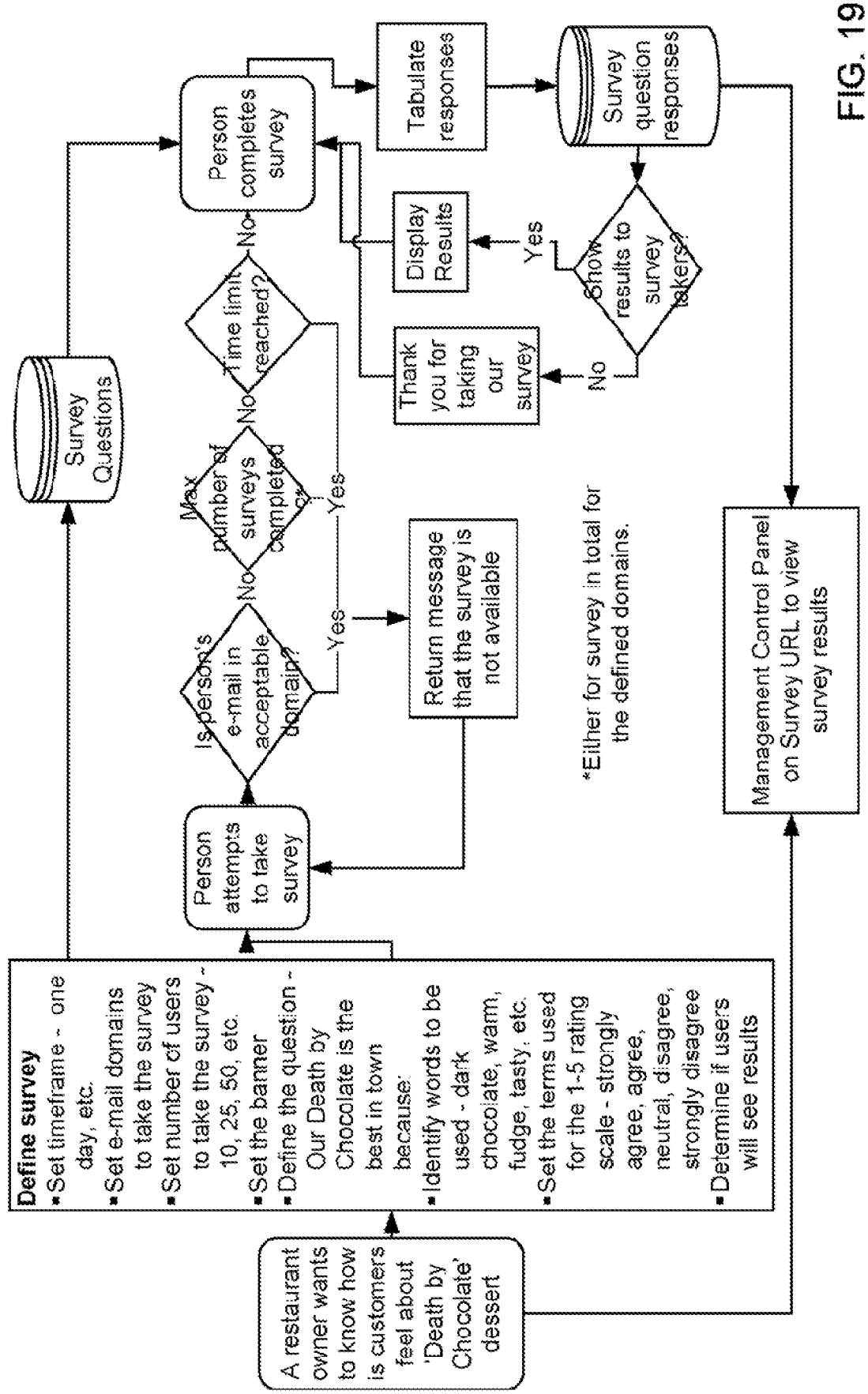
FIG. 19 is a diagrammatical view of the preferred survey procedure.

Referring now to FIG. 19, a flow chart of the preferred flow for a survey is shown. In an example survey, for example, a restaurant owner wants to know how customers feel about their 'Death by Chocolate' Dessert. The restaurant owner will first define a desired survey. For example, in this example, the restaurant owner will define a survey to comprise the following questions or parameters:
1. Set timeframe—one day, etc.;
2. Set e-mail domains to take the survey;
3. Set number of users to take the survey—10, 25, 50, etc.;
4. Set the banner;
5. Define the question—[e.g., Our Death by Chocolate is the best in town because: _____];

6. Identify words (natural-language terms or tags) to be used in response to the survey, e.g.—dark chocolate, warm, fudge, tasty, etc.;
7. Set the terms used for the 1-5 rating scale e.g.—strongly agree, agree, neutral, disagree, strongly disagree; and
8. Determine if users will see results.

The survey definition will then be placed into the Survey Questions database. A person will next attempt to take the survey. The software will ask is the person's e-mail in an acceptable domain? If the answer is no, the person attempting to take the survey will receive a return message that the survey is not available. The person may try again if they have another e-mail domain that might be acceptable. If the answer is yes, the software will next ask has the Maximum number of surveys been completed? (either for the survey in total or for that defined domain). If the answer is yes, the person attempting to take the survey will receive a return message that the survey is not available. If the answer is no, the software will next ask has the time limit on administering the survey been reached? If the answer is yes, the person attempting to take the survey will receive a return message that the survey is not available. If the answer is no, the person will complete the survey available in the Survey Questions database.

Following the survey, the software will tabulate the survey responses and place them in the Survey question response database. The survey results will be sent to the Management Control Panel on the Survey URL to enable the restaurant owner to view the survey results. The software will next determine if the restaurant owner desired to show the survey results to the person taking the survey. If this was not desired, the person taking the survey will be thanked for taking the survey, and the survey process will be complete. If it was desired, the software will display the survey results to the person taking the survey after which the survey process will be complete.

In the preferred embodiment, the database 1-2 includes the following tables:

Domain Tables: These tables contain the required reference information used to ensure accuracy and consistency of the subject content, guest and contributor information.

Application State Tables: These tables contain information necessary to manage user interactions such as the "state" or status of each active guest or contributor. Status information includes information such as user id, the last screen used, current screen in use, and start of the current session.

System Tables: These tables contain the parameters required to control the behavior of the system. Information in these tables gives the system to make decisions regarding certain actions. An example is the length of time a nominated subject will be exclusively available to contributors in a postal code.

User Tables: The user tables contain all data relevant to registered users of the system. Information includes demographic, system role points earned, points goals, personal preferences, book marked subjects of personal interest.

Subject Tables: The subject tables contain all information collected about a subject. For example, all data describing the subject, location of the subject, associated words (natural-language terms or tags), guest ratings, guest comments, etc. are included here (at least herein embodying associating, in such database, such respective natural-language terms and respective degrees of relevance with each such database subject).

FIG. 20 is a high level functional diagram of the process flows and functions in a preferred embodiment of the present invention, previously described, here for referral use in the below detailed review (after the below overview) of the system operation with reference to selected preferred screens of the system.

Preferred System Operational Overview

Preferred embodiments of the systems of this invention give everyone, without exception, the ability to publish opinions on the Web, and create an easy-to-access database of those opinions. The primary unit of measure in the instant systems is the Subject. A Subject is preferably an exceptional experience of any kind—a succulent steak, cozy campsite, neighborhood sports bar, inexpensive discount store, beautiful golf course, friendly hairstylist, inspiring karate instructor, etc. Web users add their favorite Subjects to a site and, in so doing, create a database of Subjects that all users can access.

When adding Subjects to a site, users first enter some basic information about it: location, cost, time needed to experience it, and a short description. Users then choose from a list of pre-selected Descriptive Words (often called herein natural-language terms or tags, preferably evaluative and preferably approving of the subject) that describes their Subject. Thousands of Descriptive Words are pre-loaded in the instant system. Some implicitly-evaluative examples are: "tasty, romantic, friendly service, great value, extravagant, beautiful views, challenging, crowded," etc. In addition to choosing from the pre-selected list, users may also add their own Descriptive Words to describe Subjects. After doing so, the newly added words become part of the master database that all future site visitors can use.

After selecting some Descriptive Words, users then rate the importance of each of those words. Example: (Extremely tasty, very challenging, somewhat good service, etc.). Those ratings are given a numerical value (5 for "extremely," 4 for "very," etc.), and those numerical values are displayed with the rest of the Subject information. The user then types a text comment (as short or long as desired) about the Subject, and the process is complete. With such Descriptive Word systems, users aren't required to spend time writing paragraph after paragraph to add their favorite experiences to the database. Instead, they can describe their Subject in seconds using Descriptive Words, rendering the process of giving opinions as easy as a few mouse clicks. And by immediately adding a user's own Descriptive Words to the master database, the instant system provides a way for users to build the content and raise the quality of the site every time they use it.

Furthermore, the search function provided by the instant system grafts a supremely easy-to-use interface onto a complex database-search process. When the average Web search engine does "full-text" searches—that is, looks through every piece of text for words that match the user's request—the result is often thousands of unrelated Web pages and meaningless phone-book listings. The instant searches are different: they're fast and accurate because the technology searches only specific, defined data fields, weeding out results the user doesn't want.

Once the database is populated with a critical mass of Subjects, then users will enjoy the unique benefits of a search according to the instant system. If you search for a "deli" using Word of Mouth technology, you'll find a deli—not a Web page about the "delicate ecosystem of the spotted owl" or a phone listing for "Delilah Jackson" in Toledo. And you'll find a deli in your neighborhood: just type in your ZIP code and the radius you'd like to search (e.g. two miles, five miles, etc.), and you'll find results near you. Importantly, you can type in keywords to locate a "romantic Italian restaurant with great seafood" (instead of all the Italian restaurants in a given city), and receive a list that includes only romantic Italian restaurants with great seafood (as rated by other users). You also get data that shows just how closely each option matches with each specific keyword (natural-language term or tag) you entered, making it easier to find the appropriate subject matter.

Another feature of the instant system that gives it such broad appeal is its adaptability. Most features—from the interface to the rewards system—are customizable by the client, making the system as useful to an international daily newspaper as it is to a monthly specialty magazine. Clients/customers may define their own content categories, contests, incentive programs, content-quality standards, sponsorship pricing models, site behavior and more. The set of variables enables the creation of a "word-of-mouth" resource that can lend itself to any geographic—or topic-focused Web site.

Further, using a system of completely automated, highly integrated content sponsorships, advertisers can buy sponsorships with the instant system using only their computer and a credit card—no sales force is necessary. And such sponsorships are the most attractive on the Web, preferably allowing advertisers to add contact information, links, 10 photographs and 10 paragraphs of extensive information about their businesses in just a few clicks. Because of this, advertisers not only create revenue for the site, but content as well.

When contributors to a large-scale Web community go unchecked, the site will eventually fall victim to online bullies and pranksters. To combat this, Word of Mouth software has a reliable content-review process based on membership status. There are three types of registered users: Members, Managing Members and Sponsors. Members have basic site-use privileges. Managing Members enjoy content-editing and approval powers in addition to contribution privileges. Sponsors pay a monthly premium (per Subject) to add customized information to certain Subjects, and have the same privileges as regular Members (but do not have the content-editing powers of Managing Members). All Subjects added—with the exception of sponsored Subjects, whose quality is naturally high because a sponsors pay for these Subject as marketing tools—are reviewed and approved by a Managing Member before publication. This review process ensures that there are no "nonsense" Subjects in the database—that is, Subjects composed of randomly typed characters or nonsense words. The review process does not discriminate against the tastes of Members, and Subjects are not to be rejected because their opinions differ from those of the Managing Member responsible for approving/rejecting them.

While they are lowest in the hierarchy, Members can still add Subjects, Comments and Ratings; however, every Subject added by a Member must be approved by a Managing Member before it becomes available for viewing by other site users. A Managing Member is a volunteer community leader who has applied and been accepted for this role by the client. Subjects entered by a Managing Member must be approved by another Managing Member before they may be viewed by other users. Subjects added by Sponsors are exempt from the content-review process. Their Subjects are immediately added to the database upon entry. This content-review process allows no one (except Sponsors) to make content available to the public without the approval of a site-sanctioned community leader (Managing Member).

The instant system uses an extensive and easily customizable rewards program to motivate users to make great contributions to their online community. Users are compensated with points for performing each of many actions that build a strong online community: adding content to the site, enriching existing content with comments and ratings, recruiting other members and helping to generate sponsorship revenue. The points a user earns for each action is determined by the client: therefore, a site can easily target and improve specific areas of their system site by offering premium point values for actions in those areas. A site can also use three separate point-earning structures for each member type (Member, Managing Member and Sponsor), enabling the implementation of different incentives for each user type. Points are redeemable for cash, prizes or contest entries (depending on a client's wishes). And a percentage of sponsorship revenue can be shared with top-performing Managing Members, giving these volunteer leaders incentive to build the community.

When it comes to credibility, all users are not created equal. That's why the instant system contains a system of assigning higher credibility to users who deserve it, rendering a more accurate and reliable dataset. Ratings multipliers can be assigned based upon:

User type (Member, Managing Member, Sponsor)

Opinion popularity (percentage of others who agree with user comments)

Subject popularity (percentage of Subjects rated highly by other users)

Qualification to rate a Subject (Self-selected: Very, Somewhat or Slightly)

Experience with a Subject (Have Experienced or Have Not Experienced)

These five ratings multipliers are combined into one final multiplier that determines the credibility of each registered user. Each of these multipliers is optional: clients may use all or none of them on their site.

Typically, the instant system requires only one part-time employee to keep a Web community running smoothly, thanks to the extensive system of automated processes that are constantly running "behind the scenes." Among these processes are:

Deleting outdated and poor-quality content

Sending invitations to prospective Managing Members

Calculating and aggregating a site's content and usage statistics

Distributing activity points, awards and bonuses

Awarding contest entries and determining winners

The instant system allows people to spread word-of-mouth over the Internet the same way they do in everyday life—only faster, easier, and without geographic boundaries. Harnessing the power of Descriptive Words (preferably natural-language terms or tags that are evaluative, preferably approval-type) that everyone uses, people can share and compare their exceptional experiences across all walks of life in a matter of minutes. How does it work? Web site users enter their favorite "Subjects" on the Web site. A Subject is any exceptional experience worth sharing with the online community: a great steak, a cozy campsite, a fun sports bar, an inexpensive discount store, a beautiful golf course, etc. During the process of adding a Subject to the site, users will be asked to enter specific information about it: the location, price, time needed, etc. They'll also be asked to use Descriptive Words to describe their Subject. Users may choose from hundreds of pre-selected Descriptive Words, or add their own. These words—the natural language terms that everyday people use to describe the things they like—will be stored in a database that all users can search. Some examples of Descriptive Words are: cozy, scenic, delicious, wonderful, inviting, intimate, romantic, etc. Explicitly-evaluative examples are: pro; con; approved; disapproved, etc.

Users will also be asked to Rate their Descriptive Words and leave Comments about their Subjects. Rating Descriptive Words requires the user to enter the degree to which he/she agrees with the descriptive word (also as sometimes hereinafter referred to as natural-language terms or tags especially when such words or phrases are used to evaluatively identify a Subject): e.g., extremely cozy, very cozy, slightly cozy, etc (at least herein embodying rating the degree of relevance of each of such plurality of natural-language terms to such database subject according to each of such involved subset of such population of users). A Comment is simply a short overall evaluation of the Subject. Once a Subject is approved for public viewing (by a Correspondent, one of your online community leaders) any user can add his/her ratings to it. Users can rate the Descriptive Words for each Subject, and add Descriptive Words of their own. They can also leave Comments on other Subjects, and rate the Comments of other users as useful or not useful. All Subjects on the site are collected in a database, and the users can search that database by keyword or Category of Subjects (all of which are initially created by the client) to find exceptional things they want to experience.

How may these systems be used to make money? Using a completely automated sponsorship system, advertisers can buy sponsorships of a site's Subjects using only their computer and a credit card. No sales force is necessary. And instant-system sponsorships are the most attractive on the Web, allowing advertisers to add photographs, links and extensive information about their business in just a few clicks. Because of this, advertisers not only create revenue, but content as well. Why will users participate? Because there's a rich reward system built into the software that enables system to reward them with points for each of more than a dozen community-building actions. Users can be rewarded with cash with no out-of-pocket costs by allocating a percentage of sponsorship revenue (20 percent is recommended) toward user rewards. Users may keep track of their points by using MyPage, the personalized page for each user that tracks favorite Subjects, rewards earned, newly added content and other items of interest for each user.

As noted, a most attractive feature of the instant system is its adaptability. Nearly every feature—from the interface to the rewards system—is customizable by the client, making the system as useful to an international daily newspaper as it is to a monthly specialty magazine. Clients create their own categories, subcategories, contests, incentive programs, news releases and pricing models. Clients may customize the site by configuring it using Terraformer, the system's Web-based administrative program that allows a client to easily customize dozens of elements on the site.

Screens and Operation Details

Following are discussions of the most important screens that users will see and explanations of the details of all actions a user will perform on the site with the instant system and the details of how to customize the technology for the site using a wide variety of configurable variables.

A typical-type navigation bar preferably appears at the top of every page on the site. The links, however, work as follows:

Add a Subject: Links to the Add a Subject page

MyPage: If a registered user is logged in, this link takes the user to his/her MyPage. If user is not registered—or if a registered user is not logged in—this link takes him/her to a logon page.

Tell A Friend: Links to the "Tell a Friend" page.

Feedback: Links to feedback form.

Help: Links to FAQs.

These links are preferably mirrored in the page footer, described as follows. Like the navigation bar, the footer is a standard element of all pages on the site. The links on the top row of the footer mirror the links in the navigation bar described above. The links on the bottom row of the footer work as follows:

About us: Links to the instant system "About Us" page.

Privacy Policy: Links to the instant system privacy policy.

Terms of Use: Links to the instant system terms of use page.

A Log In/Log Out graphic appears in the top right corner of every page on the site. If user is unregistered or simply not logged in, the graphic Log In will appear. If user is logged in, the graphic Log Out will appear. The Log In/Log Out graphic is a fixed element on all pages.

Figure 21:
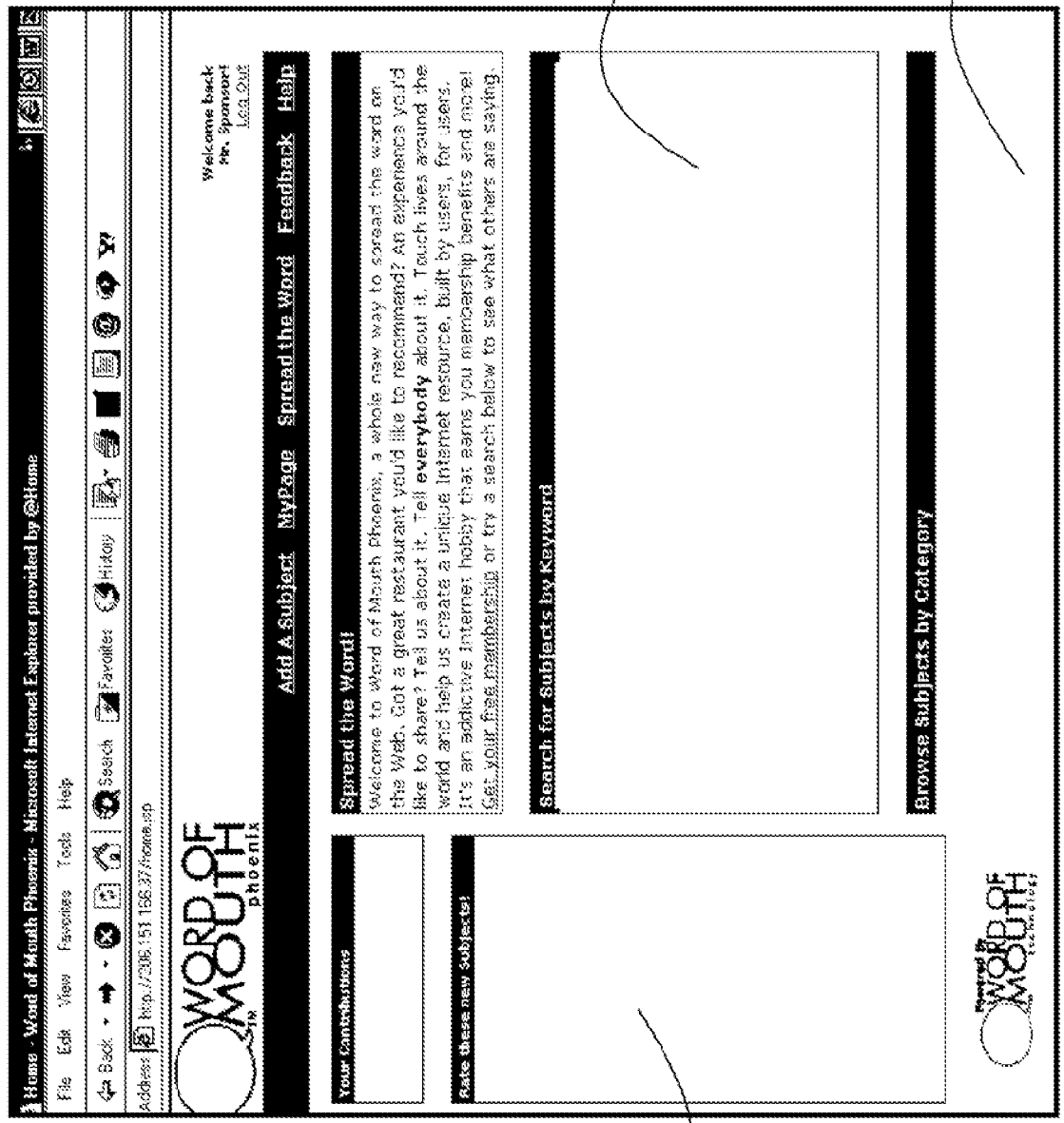
FIG. 21 is a diagrammatical view of the home page screen.

The home page will preferably look basically as shown by FIG. 21. The box 21-1 on the left side of the home page preferably lists the 10 Subjects that have been recently approved by Correspondents and has links to the 100 most recently approved Subjects. The number of new Subjects displayed is fixed at 10 to conserve space on the home page. The search box 21-2 is shown in FIG. 22 and its location is preferably fixed at the top right side of the home page. Each field in the search box is preferably fixed. The category box 21-3 is shown in FIG. 23. Listed in this box are each category (in bold) and two subcategories beneath it. The client may configure this by defining the categories and deciding which of those categories are displayed on the home page (they need not be all displayed if not wanted). Note: Two subcategories display under each category on the home page. This number is fixed.

Figure 24:
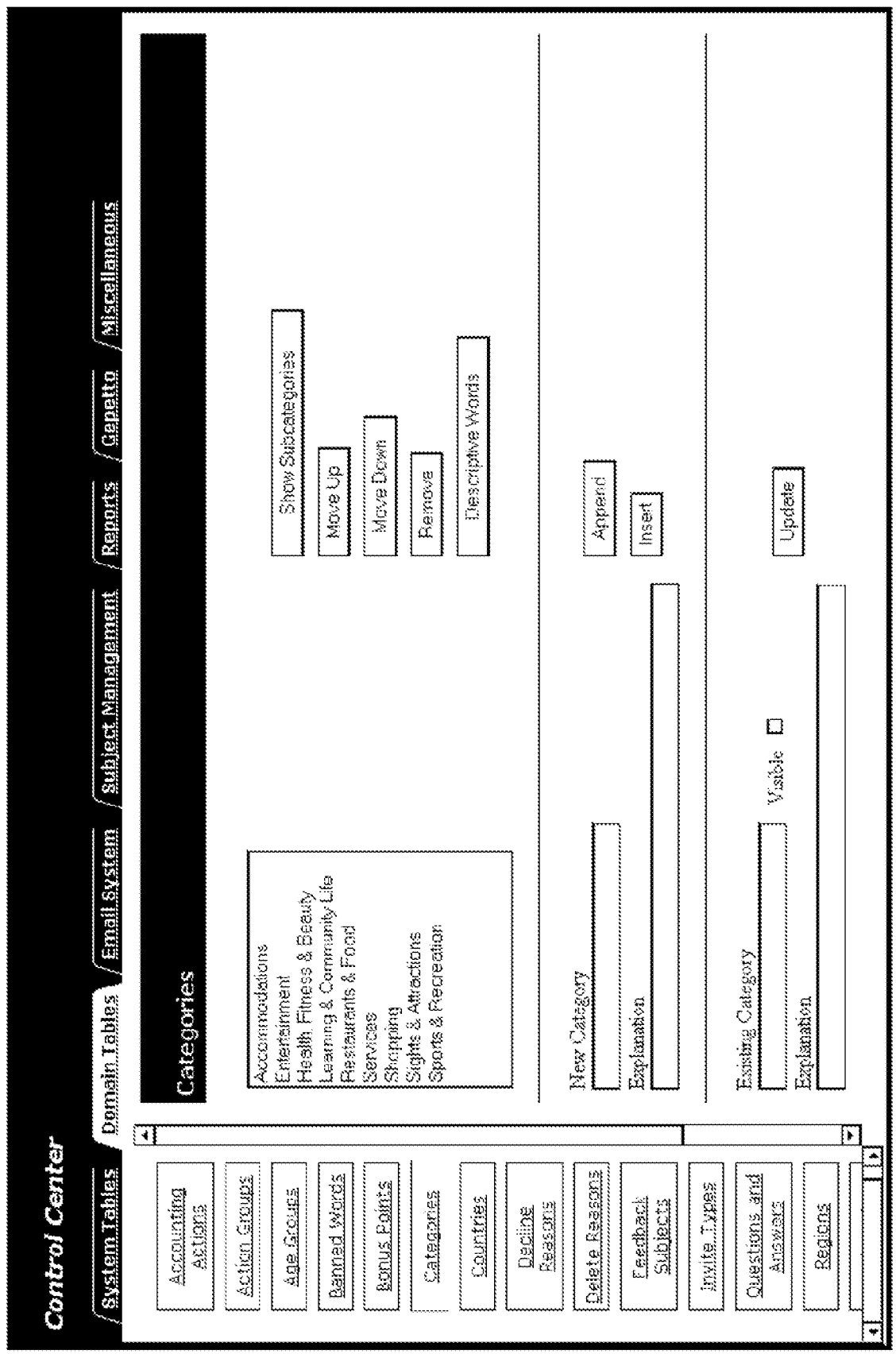
FIG. 24 is a diagrammatical view of the Terraformer screen.

With reference now to FIG. 24, the "Terraformer" screen permitting the client to configure the software, to configure the Category box in Terraformer, click "Domain Tables" on the top navigation bar and "Categories" on the left navigation bar (see following example). The following is a description of how categories, subcategories and words can be preconfigured to meet needs. FIG. 24 illustrates Terraformer's top and left navigation bars. The first tab that must be selected is in the top navigation bar. In this example, one would click "Domain Tables" in the top navigation bar. The proper categories will then appear in the left-hand navigation bar. When they appear, click "Categories," and the proper content will appear in the right-hand frame. The full screen of content for "Categories" is shown. Note: In Terraformer, you must always make your selection from the top navigation bar first. After making the proper selection from the top bar, the correct links will appear on the left. To add a new category, type its name in the "New Category" box. Type an explanation (for internal use) in the "Explanation" box. Then click "Append." After that, the new category will appear in the listing above.

To make a category visible or invisible on the home page, or to edit the title of an existing category, or to edit the explanation of an existing category, click on that category in the category listing box. Its title and description will then appear in the "Existing Category" section at the bottom of the page. Click the "Visible" box if the client wants the category to be visible; if not, uncheck the box. To make changes to the name or explanation of the category, edit the name and/or explanation for the category. When finished, click "Update" to execute the changes. To remove a category, click on the name of the category to be removed in the category listing box. Then click the "Remove" button at right. To shift the order in which categories appear, click on the name of a category to be shifted. Then click "Move up" or "Move down" in accordance with where one would like the category to appear. Repeat for each category until the desired order is achieved. The default order of appearance is alphabetical.

Figure 25:
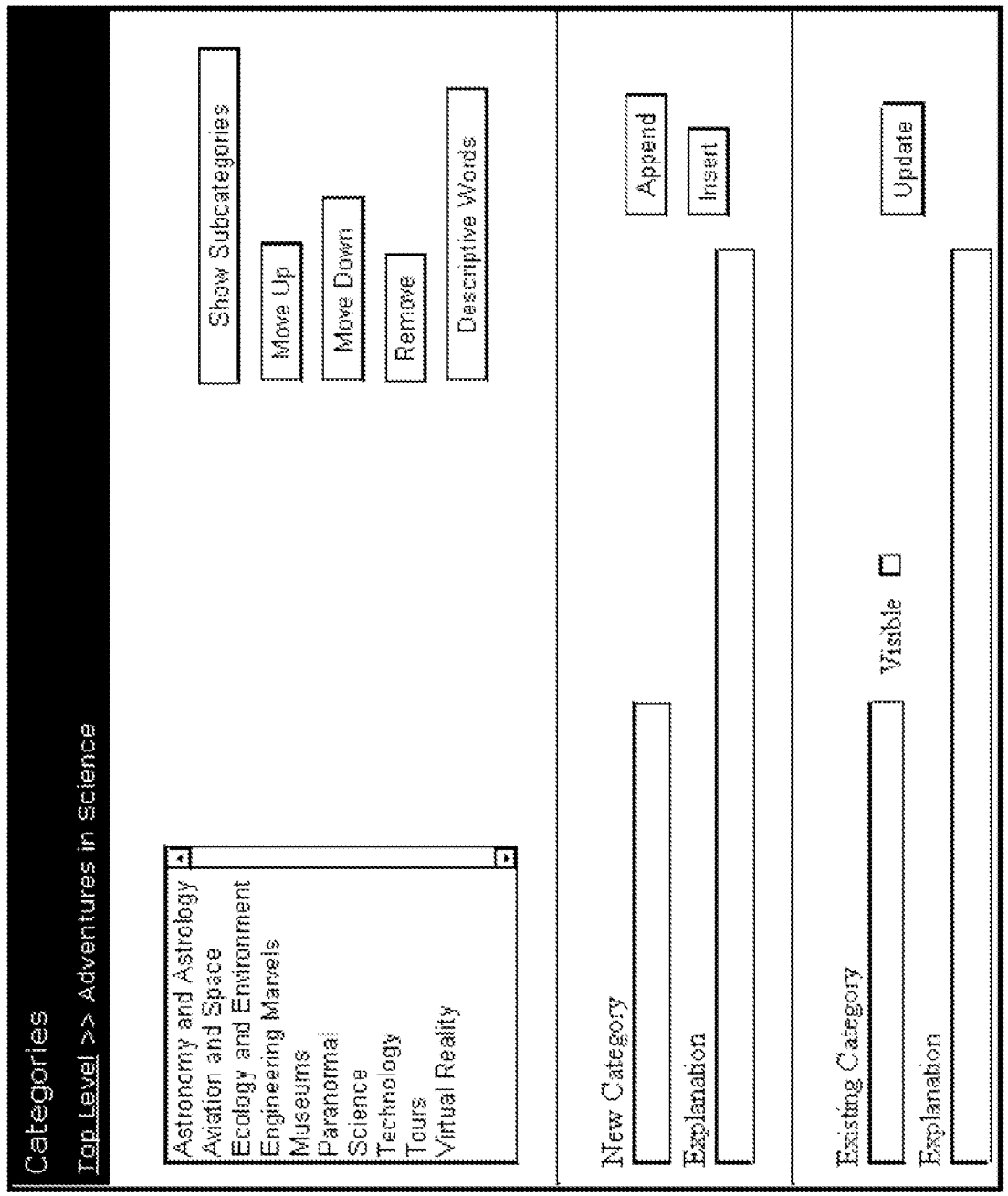
FIG. 25 is a diagrammatical view of the subcategories button screen.

To create and edit subcategories under a specific category, click on that category in the category display box. Then click the "Show Subcategories" button at right. A screen like the illustration of FIG. 25 will return. To add a new subcategory, type its name in the "New Category" box, and type an explanation of the subcategory (for internal use) in the "Explanation" box. Then click "Append." To edit a subcategory, click on it in the subcategory display box, and its title and description will appear in the "Existing Category" and "Explanation" boxes at the bottom of the page. Make the desired changes to its visibility status, category name and explanation, then click "Update".

The Log In/Registration procedures are typical of what is well-known in the art. If the user is already registered, he/she types the username and password into the proper fields and clicks the "Log in" button. If the user is unregistered, he/she clicks the "Join Now" or "Sign up now . . . " link, and gets a screen, for Member Registration, like the illustrations of FIGS. 26A-B. The user must fill out each field with an asterisk; all other information is optional. After entering personal information and a username and password, the user may fill out further information about his/her interests, in order to customize his/her personal page (MyPage) on the site. Optional information includes personal interests, locations and organization the user wishes to track. From this page, a user may also apply to be a Correspondent by clicking the link to the application on the left side of the page (highlighted above).

Clicking the link will return a screen, for Correspondent Registration, like the illustrations of FIGS. 27A-B. This screen provides details of the advantages and responsibilities of becoming a Correspondent. From here, the user clicks the "Apply Now" link at the bottom right corner of the screen and goes to the following page, illustrated in FIG. 28. The Correspondent application is essentially the same as the Member application, but it contains questions in the "My Account Information" section that the Member application does not include. These questions and their answers are scripted by the client. Each answer is assigned a point value (by the client). When the applicant answers all the questions, his/her numerical score is tabulated and must meet the minimum acceptable score (established by the client) to become a Correspondent.

A client may configure this area using Terraformer. To configure questions for the Correspondent, select "Domain Tables" on the top navigation bar and "Questions and Answers" from the left navigation bar. A screen like that illustrated in FIG. 29 will appear. In the first dropdown box, select the type of question for adding/editing/removing, e.g., a question on the Correspondent application. To add a new question, type the text into the "New Question" field, the click "Append." To remove an existing question, select it from the list on the left and click "Remove." To edit an existing question, select it from the list on the left. Its title will then appear in the "Existing Question" field. Edit it, then click "Update" (the "Add" button will change to say "Update" instead). To change the order of the questions, click on the name of a question you'd like to move. Then click "Move Up" or "Move Down" until it's in the desired position. Repeat this process with the other questions until the desired order is achieved.

To configure Answers, from the Questions screen, click on the question for which you would like to formulate answers. Then click the "Show Answers" button at right. A screen like that illustrated in FIG. 30 will appear. To add a new answer, type the text into the "New Answer" field and its point value into the "Point Value" field, the click "Append." To remove an existing answer, select it from the list on the bottom left and click "Remove." To edit an existing answer, select it from the list on the bottom left. Its title will then appear in the "Existing Answer" field. Edit its name and point value, then click "Update." To change the order of the answers in the box, click on an answer you'd like to move. Then click "Move Up" or "Move Down" until it's in the desired position. Repeat this process with the other answers until the desired order is achieved.

FIGS. 31, 32, and 33 illustrate the three pages used to Add a Subject. The first step in the user's process of adding a Subject is the page of FIG. 31, where he/she must enter some basic information, as shown. The user enters the name of the organization that provided the experience: e.g., Morton's Steak House, Samantha's Health Spa, etc. This is a required field and preferably not configurable by the client. Next, the user must select at least one category and subcategory. These categories are configurable, and the process for configuring them is later described. Once the category is selected (at left), the relevant subcategories appear on the right.

The three category and subcategory boxes themselves are not configurable; they are preferably fixed items on this page. The user must enter a city, state and ZIP code for each U.S. Subject (state or ZIP code is not required for non-U.S. Subjects). Region, country and surrounding cities are optional. It is recommended that users enter surrounding cities in order to make the Subject more widely available to other users. For example, if User Bob enters a Phoenix restaurant and enters Glendale, Scottsdale and Tempe as surrounding cities, then users who search for any of the four cities—Phoenix, Glendale, Scottsdale or Tempe—will see the restaurant Bob entered. The client can configure the Region and Country fields and may also choose the default countries and regions. In the Terraformer screen, click the "Domain Tables" tab on the top navigation bar. Then click "Regions" on the left navigation bar. A Regions screen will appear; and from the "Select Region Type," the client may select the area to break into regions: Country or State. If adding a new region, ignore the "Select Region" box. Type the name of the new region into the "Region" box and click "Add." If editing the name of an existing region, select it from the "Select Region Type" box. Its name will then appear next to the "Region" field, where you one can edit it. If removing an existing region, select it from the box. Its name will then appear next to the "Region" field. Then click "Remove."

To configure Countries in Terraformer, click "Domain Tables" on the top navigation bar and "Countries" on the left navigation bar to get a Countries screen. If you adding a new country, type its name in the "Country Name" field and click "Add." If editing the name of an existing country, the "Add" button will say "Edit" instead. Select the country name to be edited from the "Select Country Name" dropdown box, after which the text will appear in the "Country Name" field. Edit the text to specifications, then click "Edit."

With respect to FIG. 32, illustrating the second page of Add a Subject, the user must enter a short summary title for his/her Subject. This title will be the headline on the Subject page. It will also be the linked text that appears when the Subject is called up in search results. The user must also enter a one-sentence summary of the Subject. This description will appear underneath the linked text in search results. It will also be prominent on the Subject page. These two fields are preferably fixed. Address, phone number and email address are optional fields. Cost and time are also optional fields; however, these fields may be searched by other users in the Personalized Search area. The Comments box under each range allows the user to clarify his/her comments. For example, if the user enters $100-$150 as a price range for Caesar's Palace hotel in Las Vegas, he/she may specify in the Comment box that "This is for the cheapest rooms. The nicest rooms are in the $400-$500 range." This information will appear on the Subject page, above the Comments. Two more optional fields are "Family-oriented" and "Availability." Comment boxes are provided for further explanation. These fields are fixed.

FIG. 33 illustrates the preferred third page of the Add a Subject process. It is where the user will determine the Descriptive Words to associate with his/her Subject. The Descriptive Word system is the fastest and easiest way to rate Subjects with the instant system. Instead of making users start with a blank slate, the software automatically presents them with words (also as sometimes hereinafter referred to as natural-language terms or tags especially when such words or phrases are used to identify a Subject) other users have chosen to describe the same thing. In an example, User Andy has chosen to give his opinion about a restaurant called "Mr. Sushi." After learning that Andy's Subject is classified under "Restaurants," the software generates a list of Descriptive Words that is relevant to the "Restaurants" category. This list is a combination of words (natural-language terms or tags) that are preloaded in the software, and words that previous users have used to describe other restaurants. In this example, Andy can then check the words he thinks are appropriate for his review, and, in the spaces below, add his own. Andy has added "large portions" and "fast service" as his own Descriptive Words (at least herein embodying associating with each database subject of such plurality of database subjects at least one plurality of natural-language tags potentially descriptive of such each database subject according to an involved subset of such population of database users; at least herein embodying assessing at least one measure of descriptive relevance of each of such at least one plurality of natural-language tags to such each database subject according to each particular database user of such involved subset of such population of database users; and at least herein embodying at least one (associating) computer processor structured and arranged to associate with each database subject of such plurality of database subjects at least one plurality of natural-language tags potentially descriptive of such each database subject according to an involved subset of such population of database users). The next time a user reviews a restaurant, "large portions" and "fast service" will be part of that user's list of pre-selected Descriptive Words. By adding his review of Mr. Sushi, Andy has not only contributed content to the Web site, but also made the contribution process easier for future users by adding to the list of pre-selected Descriptive Words for the "Restaurants" category (at least herein embodying associatively indexing, in such at least one database, such respective particular database users, such respective natural-language tags, such respective measures of relevance, and such respective database subjects).

Upon reading the teachings of this specification, those with ordinary skill in the art will now understand that, under appropriate circumstances, considering such issues as desires of the community being served, the goals of the client using the instant system, user preferences, etc., Subject may refer to other items of interest such as products and services provided by any producer, provider or manufacturer, etc., may suffice.

The client can configure this; it can decide how many words are displayed at this point in the add process and also decide which words show up by designating certain words to appear for certain categories. In Terraformer, click the "System Tables" tab on the top navigation bar and "System Parameters" in the left navigation bar. FIG. 34 illustrates a preferred screen which is shown. One types in the minimum and maximum number of Descriptive Words one wants to display for the user during the process of adding a Subject. When finished, scroll to the bottom of the page and click "Update." To set which words display for this category, click (in Terraformer) the "Domain Tables" tab on the top navigation bar and the "Categories" tab on the left navigation bar. A screen like that illustrated in FIG. 35 will appear. Type in the descriptive word to be added for this category, then click "Add." To edit a descriptive word from a category, use this screen as well. Select a descriptive word from the dropdown box. When you do this, the "Add" button will change to an "Update" button. Select the word, make the proper changes and click "Update." To remove a descriptive word from a category, use this screen as well. Select a descriptive word from the dropdown box, then click "Remove."

FIG. 36 illustrates a preferred screen for Add a Subject, page 4. The required user steps and the configuration information for page 4 of the Add a Subject process is illustrated as follows. The user must answer whether they have experienced the Subject themselves, and how qualified they feel to rate it. These fields are required. The top two fields are a part of the credibility system that is built into the software. The client can assign credibility multipliers for both of these fields, based on how the user answers each question. To configure opinion multipliers, in Terraformer, click the "System Tables" tab on the top navigation bar, then click the "System Parameters" tab on the left navigation bar. A screen like that illustrated in FIG. 37 will return. The bottom two fields—"no experience" and "experienced"—refer to the user's answer to the first question of whether he/she has experienced the Subject. People who answer "no" receive the no experience multiplier; people who answer "yes" receive the "experienced" multiplier. Using example settings, the opinion of a person who answers "yes" might be counted five times as much as that of a person who answers "no." The top three fields—the opinion multipliers for "slightly qualified," "somewhat qualified" and "very qualified"—refer to the answer to the second question of how qualified the user feels to rate this Subject. The client may enter a chosen value for each multiplier, and then scroll to the bottom of the page and click "Update."

Returning to the Add a Subject process, reference is made to FIGS. 38A and 38B, showing words to be rated. Next, the user rates the Descriptive Words that appear on the page. The words that appear here are all of the words that the user checked and/or added on the previous screen. The user is required to rate these words (at least herein embodying at least one (assessing) computer processor structured and arranged to assess, from input from at least one particular database user, at least one measure of descriptive relevance of each of such at least one plurality of natural-language tags to such each database subject according to each particular database user of such involved subset of such population of database users). This screen is not configurable. The number of words that appear here depends on how many the user checked and added on the previous screen. If a user would like to choose more pre-selected words, he/she can click the "Look up more words" link, and get a screen showing more words to rate. He/she can rate as many of the words as is desired, and then click "Continue" at the bottom of the page. To add his/her own words, the user clicks the "add additional words" link (from the original keyword-rating page) and gets a box like that illustrated in FIG. 39. After adding words, the user clicks continue and is taken back to the ratings and comments page.

FIG. 40 illustrates that, finally, a user must leave comments. Adding age and gender is optional; and the Comments field is fixed. Once the user has filled out all the necessary information, he/she will click "submit" and get a preview of the Subject. The preview screen is shown by FIGS. 41A and 41B. Once the user has reviewed this preview screen for accuracy, he/she clicks "Approve" if all the information is correct. If changes need to be made, the user clicks "Edit" in the area which needs to be edited. After the incorrect information has been edited, the user is returned to the preview page, and must click "Approve." It is noted that once the Subject is approved by the user who enters it, it is not immediately viewable by the public. This means that it will not immediately show up in search results. All Subjects must be approved by a Correspondent before they are available to the public. The only exception to this rule is for Subjects entered by a Sponsor. These Subjects do not require a Correspondent's review and approval, and are immediately viewable by the public once they are entered.

The most common reason for a site visitor to use the instant system will be to find something exceptional. It could be an exceptional dessert, scenic drive, campsite, family fun park, martini, product or service or hundreds of other possibilities. There are two ways to find things using the instant system: searching by keyword and searching by category. The search box illustrated in FIG. 22 and previously discussed is the most prominent element on the home page of the instant system. If a user already has a good idea of what he/she is looking for, then searching by keyword is likely the quickest way to find the desired Subject(s). The user must type in at least one of the following to perform this type of search:

A keyword or phrase
A city name
A state abbreviation
A ZIP code and search radius (from the center of that ZIP code)

These fields are fixed. The more information the user enters, the more specific the results will be. When User Bob types in the required information and clicks "Search," the software looks for that information in the appropriate fields of the database (e.g., City, State, ZIP code, Subject Title, Descriptive Words, etc.), a results screen like that illustrated by FIG. 42 returns. The title of each result will be linked to its Subject page, and the summary and location will be listed under that link. The right and middle columns list the Subject's cost, the time required to experience it and the highest-rated keywords associated with it (at least herein embodying presenting, to at least one user of such population of users, such computed overall degree of relevance of at least one natural-language term of such plurality of natural-language terms to such database subject). The "Sponsored" icon in the far right column indicates that a particular Subject has been sponsored by an advertiser. These Subjects will likely contain more information than a typical Subject, because the advertiser has had the opportunity to add extra links, photos and text. They also receive priority listing in category searches (not in keyword searches). The "Best" icon in the far left column (next to "Great Jazz" in the illustration) indicates that a particular Subject has been rated high enough to receive the "Best of Best" distinction. Note: Only Correspondents, preferably, can see the "Best" icon on a search results page.

This page can be configured by the client, who may decide how many search results come up on each page and also decide how high a Subject must score to be given the "Best of Best" distinction. To configuring search results, click (in Terraformer) the "System Tables" tab on the top navigation bar and the "System Parameters" tab on the left navigation bar. Scroll to the bottom of the screen (previously described). In the top field, type in the maximum number of total search results that one wants users to be able to retrieve when users perform a search on the site. In the second field, specify the number of search results per page that the client would like the user to see. When finished, click "Update" at the bottom of the page. To configure Best of Best, in the "Best of Best cutoff" field, enter the number you would like to designate as the minimum average rating a Subject must receive in order to receive the distinction "Best of Best." The range for this number is between 0.01 (lowest) and 5.0 (highest, a perfect score). All Subjects with an average rating higher than the one you select will be considered Best of Best. When finished, click "update" at the bottom of the page.

When a user gets the search results as above described, after clicking on a Subject title, the user is taken to that review's Subject page, like the example illustrated in FIGS. 43A (top of the screen and 43B (bottom of the screen). The Subject page is the central building block of the online community. It contains a summary of all information about each Subject: Descriptive Word ratings, comments, price, availability and contact information. In parentheses next to each Descriptive Word is the number of times users have chosen that word to describe the Subject at hand. To the right of the number in parentheses is a horizontal bar and boldfaced number indicating the average rating given to each Descriptive Word on a 1-5 scale (1 is "not rated, 5 is "extremely"). In parentheses next to the "Member Ratings" text is the number of members who have given this Subject an overall star rating (displayed on the following line) (at least herein embodying at least one (indexing) computer processor structured and arranged to associatively index, in such at least one database, such respective particular database users, such respective natural-language tags, such respective measures of relevance, and such respective database subjects). The number of stars to the right of the "Overall Rating" text is the average overall star rating users have given to this Subject. In parentheses next to "Comments" is the number of comments that have been left by users about this Subject. In the top left corner of the page is the "Overall Rating" box, in which users can give a Subject an overall rating from 1-5. The home page left border also has, as noted, a Member and Correspondent recruitment box, with links to the registration area and a "Spread Word of Mouth" box that links to the "Tell A Friend" page, and also a link that allows users to notify an advertiser about other Subjects he/she might want to add. The Subject page is also the springboard by which many users will get involved in the community by adding their opinions about existing Subjects.

Instead of searching all of a Web site's Subjects by keyword, a user also has the option of first selecting a category to search. A client-specified number of categories appear on the home page: the default categories of the preferred instant system are Accommodations, Community Services, Entertainment, Fitness and Beauty, Learning Opportunities, Restaurants, Shopping, Sightseeing and Attractions, and Sports and Recreation. When a user chooses the desired category to search and clicks the link, a screen list of subcategories appears like that illustrated by FIG. 44. In parentheses next to each subcategory is the current number of reviews in that subcategory. To further customize the search, a user must either: a) click a subcategory (e.g., to search only American restaurants) or b) click "All" at the bottom of the page (e.g., to search all restaurants). After clicking on the chosen link, the user is taken to the screens illustrated by FIGS. 45A and 45B, where the user may further personalize the search. Here the user may further refine the search by specifying location. The user has two choices for searching by location. He/she must either: a) enter a city, state and country or b) enter a ZIP code and search radius from that ZIP code. Note: When a user requests a search based on ZIP code radius, that radius is calculated from the center of the ZIP code, not the user's home address. Choosing a larger radius, then, will likely bring back more useful results.

FIG. 46 illustrates the Descriptive Words and/or phrases (natural-language terms or tags) pre-selected (by the client) to appear with this category. The user may check the boxes that are appropriate to his/her search, or add new words in the box provided. The client may configure this and decide the words—and the number of words—that appear here for every subcategory by using the Terraformer screen (as discussed herein) and going to the categories screen and then the sub-categories screen. In the display box, click the name of the subcategory to which you'd like to add Descriptive Words. Then click the "Descriptive Words" button at right. A screen like that shown in FIG. 35 will appear. To add Descriptive Words to a subcategory: In the "Descriptive Word" field, type in the word you'd like to add, then click the "Add" button (Make sure the "Select Descriptive Word" dropdown box is blank). To edit or remove existing Descriptive Words in a subcategory: Select the chosen word from the "Select Descriptive Word" dropdown box. To remove it, click the "Remove" button. To edit it, edit the text that appears in the "Descriptive Word" box, then click "Update."

In the top two fields shown in FIG. 45B, the user enters the minimum and maximum amount of money he/she wants to spend on the Subject he/she is searching for. In the final field, the user selects the amount of time he/she has to spend experiencing a Subject. These fields are both optional; users need not fill them in if they choose not to. The more information a user enters, the more specific the results. When the user types in the required information and clicks "Search," the software looks for that information in the appropriate fields of the database, and a results screen as previously discussed, is presented (see FIG. 42 for a sample). The title of each result is linked to its Subject page, and the summary and location info will be listed under that link. The right and middle columns list cost, time required and the highest-rated keywords. After clicking on the Subject title that interests him/her, the user is taken to the Subject page (see FIGS. 43A-B for a sample).

FIG. 47 illustrates a box in the lower left hand corner of the Subject page, offering the opportunity to sponsor the Subject. A potential advertiser simply clicks "Sponsor now!" to begin the process. FIGS. 48A and 48B illustrate the screen returned to begin to get the desired information from a Sponsor. The sponsor enters the name, address and contact information for both the business itself and the person who will be the administrative contact for the account. These fields are fixed. FIGS. 49A-D show the next screens to receive information. At this stage, the Sponsor adds a business logo, email address, Web site URL and links to company Web site. By clicking the "Browse" button, a Sponsor can quickly upload each desired photo straight from their computer. If one needs help with any element of the page, one simply clicks the "Help" link next to that element. These fields are fixed. Here (see FIG. 49D) the Sponsor can add up to 10 paragraphs of information about the business, each with a customized heading and photograph. Customized headings can be selected from those provided in the drop-down boxes, or a Sponsor may enter its own. By clicking the "Browse" button, it can quickly upload each desired photo straight from its desktop. These are fixed fields, but the client can configure the pre-selected choices in the "Use Standard Title" dropdown box.

To configure sponsor section headers, in Terraformer, select "Domain Tables" on the top navigation bar and "Sponsor Section Headers" from the left navigation bar. A screen like the one illustrated by FIG. 50 will appear. If the client would like to enter a new header to be included in the sponsor's dropdown box, type its name under "New Header" and click "Append." If the client would like to modify the name of an existing header, click on its name in the box at left. Its name will then appear under "Existing Header." Edit the name as wished, then click "Update." After adding the sponsor headings, they'll appear in the box shown in FIG. 50. To change the order of their listing, click on the name of a heading you'd like to move. Then click "Move Up" or "Move Down" until it's in the desired position. Repeat this process with the other headings until the desired order is achieved.

After entering any custom text and uploading any photos, the Sponsor previews the newly sponsored page on the screen illustrated, from top to bottom in FIGS. 51A-C. If there are mistakes, click "Edit" in the area with the mistakes and fix them. If there are no mistakes, the Sponsor may click "Approve," and move on to adding credit card information—the final step in the sponsorship process. FIG. 52 illustrates the screen with payment information. After approving how the sponsored Subject will look, the Sponsor enters credit card information and clicks "Purchase Sponsorship." Once the credit card information is processed, the sponsorship is confirmed by the return of the screen illustrated in FIG. 53 and the process is complete. Tony can immediately view his newly sponsored Subject by clicking the link under "View Subject Just Sponsored." The sponsored Subject, which is immediately available to Web site users because it does not require Correspondent approval, looks like the screen shown in FIGS. 54A-B, the first illustration showing the top half of the page, and the second showing the bottom half. As shown, a sponsored Subject prominently features the Sponsor's customized information and photographs. In the heading are links to "View Special Offers" and "Contact Organization"—information that the advertiser entered on the first sponsorship screen. The top paragraph is the Sponsor's summary, with its chosen image. Below the ratings and comments are any other photos and customized paragraphs.

Users will find that some of their favorite Subjects have already been entered by other users. FIGS. 55A-B illustrate the screen where users may add their rating and reviewing opinions to existing Subjects. From any Subject page, a registered user can click the "Add Your Rating" or "Add Your Comments" links to reach the Rate and Review page (see FIGS. 55A-B). Note: This is the same page as page 4 of the Add a Subject process. The process of rating and reviewing an existing Subject follows exactly the same procedure as outlined in Step 4 of the Add a Subject process. After comments have been added and Descriptive Words (natural-language terms or tags) have been rated, a screen returns showing that the entry information has been added to MyPage and thanking the user for doing the rating, after which the user may return to the Subject he/she just rated, or use the top navigation bar to go elsewhere on the site.

A quick way for the user to earn points is to give an object an overall star rating. The overall rating box is located in the top left corner of a Subject page. The user simply selects the "star" rating he/she chooses to give, then clicks the "Submit" button. If the user finds inaccurate or outdated information, he/she can immediately suggest an improvement via the "Improve this Subject" box at the bottom left corner of each Subject page. Clicking on that link leads to the page illustrated by FIG. 56. The user first reviews the improvements suggested by other users. The user then chooses a priority for his/her change, a reason that the current information and how he/she knows the information needs to be changed ("Basis"). After typing in the specifics of the improvement that needs to be made, the user clicks the box if he/she wants to be notified of the outcome of the suggestion. If so, he/she enters an email address. When finished, the user clicks "Submit" to send the changes. The suggestion is then sent to a Correspondent who will review it and either make or reject the change.

With so many ways to earn points, how can users keep track of how many points they've earned, and what they've done to earn them? For exactly this reason, there's MyPage—the page where users can track not only the points they've earned, but all the contributions they've made to their community, and their favorite things they've found along the way. A variety of elements comprise each MyPage, the screen illustrated in FIGS. 57A-B. FIG. 58 shows the My Contributions box. As the heading states, "My Contributions" is a detailed view of a user's activity on the site. The user can click on "Subjects Added" to view a list of all the Subject he/she has added to the site. He/she can do the same for "Comments Added." Across from the "Subjects Added" and "Comments Added" links are figures indicating "Lives Touched." A user gets credit for a life touched every time another user views Subjects or Comments that he/she has entered. The example above indicates that this user's Subjects have been received 220 page views, and his/her comments have received 161 page views.

Clicking the link for "Subjects Added" will return a page like the one illustrated in FIG. 59. Each Subject this user has added is displayed here, along with the number of Lives Touched by each Subject and the number of Comments that other users have left for each Subject. Using the dropdown menus at the top of the page, the user can list these Subjects by location and category. Clicking the numbered link under the Lives Touched column yields a screen like the one illustrated in FIG. 60. The "Lives Touched" box lists how many times this Subject was viewed during the last 12 months. The "Request for Information" box lists how many times another user requested more information about this Subject viewing it. Clicking on the numbered link under the "Comments" column returns a screen like the one illustrated in FIG. 61. Each row contains the date each comment was added, the comment's name, the number of lives touched by the comment and the percent of other visitors who agreed with the comment.

From the "My Contributions" box on MyPage, clicking the link for "Comments Added" will return a page like the one illustrated in FIG. 62. Listed in the left column of this page are all the Comments this user has entered. In the center column is each Subject to which the Comment in the left column refers, and the third column lists the number of Lives Touched by each Comment (that is, how many page views each comment has received). The far right column lists the percentage of times that the Comment has been rated useful by other users. Example: The top comment on the screen above has been rated "Useful" by 100 percent of users who have chosen to rate the comment as "Useful" or "Not Useful." None of the other comments has been rated.

The next link in the "My Contributions" box is "Subjects Awaiting Approval." These are Subjects that the user has added, but have not been approved by a Correspondent and have therefore not been seen by any other users (hence, no number is listed in the "Lives Touched" column). FIG. 63 shows a sample page for "Subjects Awaiting Approval." In the left column are the Subjects the user has submitted, and the center column holds more information about each Subject. In the right column are the date each Subject was submitted, and a link that allows the Correspondent to edit or delete information in their review. The final link displays each of the user's Subjects which were submitted for review but rejected by a Correspondent. These links display on a page like that of FIG. 64. This user has no rejected subjects. If a user has rejected Subjects, the title and information of that Subject will appear on the left, the Correspondent's reason for rejection will appear in the center and the date the Subject was submitted will be on the right.

FIG. 65 illustrates the To Do List screen. Only Correspondents have a To Do list: it is the collection of administrative actions that a Correspondent can do to monitor the site's content and earn the points for doing so. The top link, "Notify Organizations about Subjects you added," allows the Correspondent to contact organizations about Subjects they've added that advertisers might want to sponsor. The bottom link, "Notify organizations for Subjects added," links to the same process, but for all recently added Subjects in his/her ZIP code—not just the Subjects added by the Correspondent him/herself. FIG. 66 is a sample screen for this process. Information about each Subject is displayed in the first, second and third columns. In the right column, the user clicks "Notify" to send email to a potential advertiser. That screen looks like the screen illustrated in FIG. 67. The user types in the required information—only a first name and an email address—for the recipient, and clicks "Submit." The email is then sent to the advertiser.

There are two links to the Review Subjects Added process under "My To Do List"—one for Subjects in the Correspondent's home ZIP code and one for Subjects outside of that ZIP code. The process used for those links is the same, and is outlined as follows. By clicking either "Review Subjects Added" link, a Correspondent gets a screen like that of FIG. 68. From the list of recently added Subjects, a Correspondent clicks "Review" in the right column to view and approve/reject each Subject. After clicking the appropriate choice, a page like that of FIG. 69 appears (also showing all the other details of the Subject. After carefully reviewing the information for appropriateness and accuracy, the Correspondent clicks either "Reject Subject" or "Approved Subject." The process is then finished, and the Correspondent is taken back to the list of Subjects that are still waiting for approval.

Correspondents not only approve and reject Subjects; they also review and make accuracy improvements to existing Subjects at the request of other users. By clicking the "Review Suggested Improvements" link (in or outside of home ZIP code), the Correspondent begins the process of reviewing improvements on the screen illustrated by FIG. 70. In the above example, only one suggestion for improvement is on the Correspondent's to-do list. The Subject needing improvement is in the left column. In the center column are the priority, reason and basis that the user chose for suggesting this improvement, and the right column lists the date the suggestion was entered. By clicking "Review" under that date, the Correspondent can review the suggestion on a screen like that of FIGS. 71A-B. The details of the user's suggestion will appear in the box at the top of the page. Below this box is all the information about the Subject in question. By clicking the appropriate box, the Correspondent may: a) approve the suggested improvement; b) reject the suggested improvement; or c) delete the Subject altogether. After clicking the appropriate button, the process is then finished, and the Correspondent is taken back to the list of suggested improvements that are still waiting for approval.

The process of deleting Subjects is much the same as the process of approving and rejecting them. Clicking the "Review Subjects Marked for Deletion" link brings back a list of such Subjects, like the one on the screen of FIG. 72. To review the Subject that's recommended for deletion, the Correspondent clicks "Review" and gets a screen like that of FIG. 73 (also containing all the details about the Subject). Upon reviewing the Subject, the Correspondent clicks "Delete Subject" or "Save Subject" based on his/her recommendation.

The "My Favorite Subjects" box (see FIG. 74, for example) is where users store the best things they've discovered on the site. As a default, each top-level category has a folder inside this box, until the user decides to customize it. In parentheses next to each folder name is a number that indicates how many Subjects are currently in that particular folder. To customize the folders on this page, the user clicks on "manage favorites" and gets a screen listing the name of each current folder is listed, and next to each folder name is a link to either rename or delete the folder (As a default, the initial folders will mirror the first-level categories). The user may rename or delete a folder or add a new folder.

The "My Interests" box, illustrated by FIG. 75, is created using the information in a user's profile. Each entry in the box links to Subjects that are likely to interest the user based on his/her stated interests and geographic location. These links will return Subjects of such special interests, e.g., Recently Added Subjects in (user-selected town): All Subjects in (user-selected town): Best of Best in (user-selected town).

The "My Organization" box, illustrated by FIG. 76, allows a user to track Subjects that refer to certain businesses and organizations. In the above example, the user has chosen to track Tomaso's restaurant; however, there are currently no Subjects on the site that refer to Tomaso's. If another user decides to rate, for example, the five-cheese lasagna at Tomaso's, that Subject will appear in the My Organization box.

The "My Rewards" box, illustrated by FIG. 77, is a user's link to all the points he/she has earned, and the money into which those points translate. By clicking the "Points Earned" link, the user sees a screen like that of FIG. 78. In the left column are listed all actions that a user can perform that will earn points. The second column is the point value per action for each of those actions. The third column is the number of points the user has received by performing that particular action. The fourth column, "Site Average," is the number of points that the average site user gains per month via the same action. Using this figure, he/she can compare their monthly activity and earnings with other site users. From the dropdown menu reading "from inception," the user can choose to view points earned: a) since the inception of his/her account; b) during the current month, or c) during the past month. The "Goal Achieved" row lists how many points a user is expected to earn during the selected time period, and the adjacent entry indicates whether he/she has attained that goal.

By clicking any of the links in the left column, the user can see a breakdown of how he/she earned points via each particular action. Example: If the user wants to see how many points he/she has earned by adding Subjects in his/her area, he/she clicks "Subjects Added in Area" and gets a screen like the one shown by FIG. 79. This screen lists the date, transaction number and points earned for every Subject this user has added in his/her area. To see how many points have been earned via other actions, a user can a) go back to the previous page and click the appropriate link, or b) on the current page, select a different action from the dropdown box across from the text reading "Filter by." In the example above, the user is viewing points since the user became a registered user. This is indicated by the top dropdown box that reads "Since Inception." To change the date from which to display points earned, a user must simply choose a different selection from that dropdown box: e.g., "This Month," "Last Month."

By clicking the "Account Balance" link, the user can view the monetary value of his/her accumulated points. The "Account Balance" screen appears as shown by FIG. 80. Listed on the Account Balance page are the date of each point-earning action, a description of that action, its transaction number and the dollars earned for it. Atop the page is the total Current Account Balance. Next to the balance will be a button that says "Cash Out." By clicking that button, the user is taken to a screen like that shown in FIG. 81. After filling in the appropriate information, the user clicks "Submit," and his/her cash-out is processed, and the credit card is credited. The client can configure this, and decide the amount of money a user must accumulate before being allowed to cash out, by, in Terraformer, clicking the "System Tables" tab on the top navigation bar, then clicking the "System Parameters" tab on the left navigation bar. Scroll until you reach the "Minimum cash out amount" field. In this field, enter the minimum dollar amount your users must attain before being allowed to cash out. When finished, click "Update" at the bottom of the screen.

FIG. 82 illustrates the screen for Tell a Friend, the quick way that users can spread word of this system to people they know. This page is always accessible by the green navigation bar at the top of every page. To notify a friend, a user must simply: Type a Subject, then Enter his/her email address and the email address of the recipient(s), then Type the message and click "Submit".

FIG. 83 illustrates the Rate other comments screen. Users can read all the comments left by other users about any Subject. These comments are accessible from any Subject page. If the user finds this comment useful, he/she clicks the "Useful" button; if not, he/she clicks the "Not Useful" button. A user may add a comment with a screen like that of FIG. 84.

These ratings are one piece of a system that determines the credibility of the user who entered the comment. Users who leave comments that are popular with others will be given a higher credibility rating; users whose comments are unpopular will be given lower credibility. Note: Users may not rate their own comments.

As to the Roles and Rewards processes of the instant system, there are four types of users accommodated by the instant system, and each has a unique set of privileges and rewards. The four user types are:

Guests (unregistered users)
    Privileges
    Guests can: Search the site, view Subjects, comments and ratings, use Tell-a-Friend
    Guests cannot: Earn points, start a MyPage
    Responsibilities
    Guests have no site responsibilities.

Members—Registration is required before a user can become a Member. Members have all the privileges of guests. In addition:
    Privileges
    Members can: Earn points for a limited number of actions, Add Subjects, ratings and comments, Suggest Improvements, Start a MyPage
    Members cannot: Approve Subjects for publication, See "Best of Best" icons on search results pages, Make accuracy improvements to existing Subjects Correspondents—Correspondents are the users with the highest status. With the increased status comes more earning opportunities—and more responsibilities. Correspondents have all the privileges of guests and Members. In addition:

Privileges

Correspondents can: Earn points for a wider variety of actions, Earn more points than Members (for the same actions), Approve Subjects for publication, See "Best of Best" icons on search results pages, Make accuracy improvements to existing Subjects, Delete unsponsored Subjects, Enter exclusive contests Correspondents cannot: Approve their own Subject for publication, Delete sponsored Subjects Responsibilities Correspondents are responsible for meeting their monthly point goal, and for many administrative actions relating to the upkeep of the site. Correspondents: Approve newly added Subjects, Make accuracy improvements to existing Subjects, Delete inappropriate Subjects, Notify businesses about un-sponsored Subjects. [In return for performing these responsibilities, they are compensated for a wider variety of actions than members. They also earn higher point values than Members for performing basic actions on the site.]

Sponsors—Sponsors are advertisers who have paid to sponsor a Subject(s). They enjoy all the privileges that Members enjoy. In addition:

Privileges

Sponsors can: Publish sponsored Subjects without a Correspondent's approval, Add extensive customized text, photos and links to their Subjects Sponsors cannot: Approve Subjects for publication, See "Best of Best" icons on search results pages, Make accuracy improvements to existing Subjects A client can assign point and values—customized by role—for each action, including:

Adding a Subject in home ZIP code

Adding a Subject outside home ZIP code

Suggesting Improvements and Deletions

Giving a Subject an overall rating

Adding Comments

Rating Descriptive Words

Telling a friend

Recruiting Correspondents

No Action Required (Points awarded when Member's Subject or Comments are read by another user)

(Points awarded when another user adds a Subject in Member's ZIP code)

Approving a Subject for publication (Correspondents only)

Maintaining a Subject (fixing outdated/wrong information) (Correspondents only)

Notifying a potential sponsor about an un-sponsored Subject (Correspondents only)

Monthly bonus programs

For the client to configure points per action, in Terraformer, click the "Domain Tables" tab on the top navigation bar and the "Accounting Actions" tab on the left navigation bar. In the right frame, a screen like that of FIG. 85 will appear. The top set of fields includes the "Select User Type" and "Select Action" fields. Because the points the client will award will vary based on a user's role, one must specify the action itself (in the Select Action dropdown box) and the user type for whom one is assigning the point value (in the Select User Type dropdown box). In the example shown, one is assigning the number of points a Correspondent will receive every time he/she adds a Subject in his/her ZIP code. After choosing from each field, proceed to the fields shown as follows: Point Value and Dollar Value. In the appropriate field, type in the point and dollar value the client wishes to assign to this action. When finished, click the "Update" button at the bottom of the page. The client may then choose another user type and/or action from the top menus and repeat the process until all actions have been assigned for each user type.

Assigning a dollar value to points is one way of rewarding users; another way is to award them one entry in special contests for every specified amount of points they earn. Example: For each 1,000 points a user earns in a month, he/she receives one entry in a contest to win $500. Consequently, if a user earns 7,000 points that month, he/she will be entered in the contest seven times. The client may configuring contests as follows. In Terraformer, click the "System Tables" tab on the top navigation bar and the "Contests" tab on the left navigation bar. Then the screen like that of FIG. 86 will appear. If the client is setting up a new contest: the existing contests will be listed in the top dropdown box, "Select Contest Description." If setting up a first contest, the client can ignore this dropdown box. The next field is "Contest Description." In this field, enter a name for the contest. In the "Contest Notes" field, enter any notes you'd like to associate with this contest (for internal use only). In the "Entries Awarded" field, specify how many will be awarded your users per number of points achieved (specify that number of points in the next field). Example: If the client would like to give one entry per 1,000 points, enter the number "1" in this field. In the "Points Awarded" field, enter how many points are required of users to accumulate before being awarded a contest entry. Example: If the client would like to award an entry per 1,000 points, enter the number "1000" in this field. Note: The above two fields are directly related to each other. When the user achieves the point total you specify in "Points Awarded," he/she will receive the number of entries you specify in "Entries Awarded." Example 2: If we'd like to award 3 entries per 2,000 points earned, enter "3" in the "Entries Awarded" field and "2000" in the "Points Awarded" field. Check the "Active" box to activate the contest; leave it unchecked if one does not want the contest to begin immediately. Check the "Clear Old Entries" box if one wants entries from the previous month to be discarded and start the contest anew every month; leave this box unchecked if one wants a contest's entries to accumulate for longer than a month. When each of these fields is filled in, the user clicks "Update" to create the contest. If modifying an existing contest, select the contest wanted to be modified from the "Select Contest Description" menu, make the changes in the appropriate fields that follow, and then click "Update".

It's easy for users to send feedback. By clicking the "Feedback" link in the navigation bar at the top of any page, a feedback screen is returned. To send their comments, users must simply select a topic, type their message in the "Your Comments" box and click "Submit".

When it comes to credibility, all users are not created equal. Some Correspondents will be conscientious above and beyond requirements; others may do sloppy, inaccurate work in a race to earn the most points. To neutralize this, the instant system contains a system of assigning higher credibility to those users who deserve it, rendering a more accurate and reliable dataset. 1) Ratings multipliers can be given to each user type, and the multipliers are selected by each client by using Terraformer. Example: A Correspondent's opinion may count twice as much as a Member's opinion. 2) The weight of a user's opinions increases with the popularity of his/her reviews. Example: If 65 percent of users agree with Correspondent Marcia's reviews, then the client assigns her a multiplier of two: Her opinions now count double the weight of average users' opinions. If 85 percent of users agree with her reviews, the client gives her a multiplier of three, tripling her influence. Conversely, if only 20 percent of users agree with Marcia, she can receive a multiplier of 0.5, making her opinions count half as much as average users. Multiplier values and percentages are selected by each client. 3) The weight of a user's opinion increases with his/her propensity to add high-quality Subject to the database. Example: If a user adds 10 Subjects to the database in April, and the average overall rating of those Subjects (combined) is above 4.0, the user receives a multiplier of two. 4) Finally, for each Subject he/she enters, a user is asked to select his/her level of expertise on the given Subject. Users are first asked if they have experienced the Subject before, then are asked whether they feel slightly, somewhat or very qualified to rate the Subject. Using these three criteria for credibility, sites can automatically reward those users that the community at large believes to be valuable and credible. In the same way, they can decrease the weighting for users with whom very few others agree.

Most ways in which the client can configure the instant system have been covered in the previous pages. Collected as follows, however, are all of the different variables that clients may configure, and reasons clients may choose to do so. Content may be controlled. The instant system works well across many different audiences because it allows detailed customization of each site. Whether one runs an international daily newspaper or a small, monthly trade publication, the software gives one the ability to create an exceptionally personal look and feel. One may create a list of categories, and define which will be shown on the home page. Why would use this feature? To give the site an appropriate feel, by location or subject matter, and give prime exposure to the most important categories. Example: Outdoor Life magazine might choose to have six categories displayed on its home page—Biking, Camping, Climbing, Hiking, Rafting and Skiing. Or, Outdoor Life may choose to have 18 categories—and only display these six major ones on the home page.

One may configure category display. Note that in Terraformer, one must always make one's selection from the top navigation bar first. After making the proper selection from the top bar, the correct links will appear on the left. FIG. 87 illustrates the screen to add a new category. To add a new category, type its name in the "New Category" box. Type an explanation (for internal use) in the "Explanation" box. Then click "Append." After that, the new category will appear in the listing. To make a category visible or invisible on the home page, or to edit the title of an existing category, or to edit the explanation of an existing category, click on that category in the category listing box. Its title and description will then appear in the "Existing Category" section at the bottom of the page. Click the "Visible" box if you want the category to be visible; if not, uncheck the box. To make changes to the name or explanation of the category, edit the name and/or explanation for the category. When finished, click "Update" to execute changes. To remove a category, click on the name of the category you want to remove in the category listing box. Then click the "Remove" button at right. To shift the order in which categories appear, click on the name of a category you want to shift. Then click "Move up" or "Move down" in accordance with where the category to should appear. Repeat for each category until the desired order is achieved. The default order of appearance is alphabetical.

One may create a list of subcategories for each category. Why use this feature? To further define specific sub-areas of each category. Example: Outdoor Life might have the following subcategories under the Category "Biking": Bikes, Bike Shops, Clothing and Gear, Cycling Events, Mountain Trails, Urban Trails. To configure subcategories, the client may, in Terraformer, click "Domain Tables" on the top navigation bar and "Categories" on the left navigation bar. To create and edit subcategories under a specific category, click on that category in the category display box. Then click the "Show Subcategories" button at right. To add a new subcategory, type its name in the "New Category" box, and type an explanation of the subcategory (for your internal use) in the "Explanation" box. Then click "Append." To edit a subcategory, click on it in the subcategory display box, and its title and description will appear in the "Existing Category" and "Explanation" boxes at the bottom of the page. Make the changes desired to its visibility status, category name and explanation, then click "Update."

The client may associate Descriptive Words with categories and subcategories. Why use this feature? To create a very fluid user experience for your visitors. Pre-defining words (natural-language terms or tags) that are pertinent to each category and subcategory provide a ready-made set of relevant criteria by which users can add and rate Subjects quickly and easily. Example: For Outdoor Life's "Mountain Trails" subcategory, some of the predefined Descriptive Words might be: rocky, trail condition, scenery, danger, congestion, difficulty, wildlife, etc. the client may also configure associations for categories, subcategories and words. In the display box for subcategories, click the name of the subcategory to which to add Descriptive Words. Then click the "Descriptive Words" button at right. To add Descriptive Words to a subcategory: In the "Descriptive Word" field, type in the word to add, then click the "Add" button (Make sure the "Select Descriptive Word" dropdown box is blank). To edit or remove existing Descriptive Words in a subcategory: Select the chosen word from the "Select Descriptive Word" dropdown box. To remove it, click the "Remove" button. To edit it, edit the text that appears in the "Descriptive Word" box, then click "Update."

The client may determine how many Descriptive Words a user must choose when adding a Subject. Why use this feature? To ensure that requirements match the audience. Example: If the audience is highly educated, one may feel safe in requiring them to enter more words. If the audience is less educated, has a shorter attention span or has very little time, requiring fewer words is a better option. One may also configure the number of Descriptive Words a user must choose in the appropriate Terraformer field. In this field, type the minimum number of words you want to require a user to enter when he/she is adding a Subject. When finished, click "Update" at the bottom of the page. One may also determine how many pre-selected words appear when a user adds/rates a Subject, to speed/simplify the process of adding/rating a Subject. Example: The more words that appear automatically, the more likely a user will select some of them (instead of taking time to generate his/her own Descriptive Words). And one may configure pre-selected words in Terraformer in the appropriate field. In this field, type the minimum number of pre-selected words you want to appear when a user is adding a Subject. When finished, click "Update" at the bottom of the page. In a similar way, for appropriate ends, one may determine minimum rating score required for keywords to appear, determine minimum ranking a Descriptive Word must have in order to be displayed with a Subject, configure minimum ranking for Descriptive Words, determine when to expire ratings in the database, configure ratings expirations, determine how long a user must wait before rating the same experience again, configure a user waiting period between rating same experience, determine how high a Subject must rank to be labeled "Best of the Best", configure "Best of Best" [Example: In the "Best of Best cutoff" field, enter the number you would like to designate as the minimum average rating a Subject must receive in order to receive the distinction "Best of Best." The range for this number is between 0.01 (lowest) and 5.0 (highest, a perfect score). All Subjects with an average rating higher than the one you select will be considered Best of Best. When finished, click "update" at the bottom of the page], determine weighting of opinions based on a user's credibility and contributions, determine maximum number of search results, and results per page, configure search results (i.e., type in the maximum number of total search results that one wants users to be able to retrieve when they perform a search on the site. And specify the number of search results per page that one would like the user to see. When finished, click "Update"), create a list of banned words to ensure that inappropriate language does not appear on the site, and define regions and countries to define/limit the countries from which users may add and search for Subjects. For example, North American Skiing magazine may want to limit all ski-slope reviews to the United States, Canada and Mexico only. To configure regions, click, in Terraformer, the "Domain Tables" tab on the top navigation bar. Then click "Regions" on the left navigation bar. A screen like that shown by FIG. 88 will appear. From the "Select Region Type," select the area to break into regions: Country or State. If adding a new region, ignore the "Select Region" box. Type the name of the new region into the "Region" box and click "Add." If editing the name of an existing region, select it from the "Select Region Type" box. Its name will then appear next to the "Region" field, where one can edit it. If removing an existing region, select it from this box. Its name will then appear next to the "Region" field. Then click "Remove." FIG. 89 illustrates a similar screen from Terraformer. If adding a new country, type its name in the "Country Name" field and click "Add." If editing the name of an existing country, the "Add" button will say "Edit" instead. Select the country name one wants to edit from the "Select Country Name" dropdown box, after which the text will appear in the "Country Name" field. Edit the text to specifications, then click "Edit."

The client will normally wish to recruit, reward and recognize users. The instant system provides a complete system to recruit, reward and recognize outstanding members of a vibrant online community. The configurable variables that follow put the power of customization in the client's hands. One may recruit by defining age groups to track and subdivide this demographic in a way that best meets needs. One may define/limit contributions for each gender (per ZIP code) to define the "exclusivity" of being a correspondent in a way that best meets needs. One may limit the number of men and women per ZIP code as strictly as one likes, or not at all. To configure age groups in Terraformer on an appropriate screen, like that shown in FIG. 90, to add an age group, type a title for the age group into the "Age Group" field. For this new age group, enter the low age (e.g., 18) and high age (e.g., 35) for it. In the following three fields, you have two choices: a) Enter the maximum number of males and females in this age group that one would like to allow in one's Correspondent pool per ZIP code, or b) Enter the number of people (not gender-specific) from each ZIP code that one would like to include in one's Correspondent pool. To finish creating this age group, click "Add." To remove an existing age group, select it from the "Select Age Group" dropdown box at the top and click "Remove." To edit an existing age group, select it from the "Select Age Group" dropdown box at the top. Its age and gender-count information will then appear in the fields below it. Edit these fields as necessary and click "Update" (the "Add" button will change to "Update").

To configure rewards, the client will use the Terraformer screen of Accounting Actions to assign point and dollar values per action (customized by membership type (Member, Correspondent, Sponsor), including: Adding a Subject in home ZIP code, Adding a Subject outside home ZIP code, Adding a Comment, Suggesting Improvements and Deletions, Rating others'Comments, Giving a Subject an overall rating (1 to 5 stars), Rating Descriptive Words, Telling a friend, Recruiting Correspondents, including in areas where no user action is required: Points awarded when Member's Subject or Comments are read by another user, Points awarded when another user adds a Subject in Member's ZIP code, Approving a Subject for publication (Correspondents only), Maintaining a Subject (fixing outdated/wrong information) (Correspondents only), Notifying a potential sponsor about an un-sponsored Subject (Correspondents only), Monthly bonus programs.

If one is in the early stages of building a critical mass of Subjects, one may want to assign high point values for adding Subjects, adding comments and adding words. If one has reached a critical mass of content and now wants to focus on growing audience, one may want to assign high point values to actions such as referring other members and notifying sponsors. To configure points per action, one goes to the appropriate screen in Terraformer to the fields of "Select User Type" and "Select Action". Because the points one awards will vary based on a user's role, one must specify the action itself (in the Select Action dropdown box) and the user type for whom one is assigning the point value (in the Select User Type dropdown box).

The client may determine how many points a correspondent must score during a specified time period to remain in good standing to make sure that the people rewarded for building and maintaining the online community are holding up their end of the bargain. If a correspondent isn't meeting the minimum activity standards set, it's likely that another correspondent-in-waiting will do so. The client may determine minimum dollar amount users must accumulate before being allowed to cash out to cut down on the resources required to accommodate payouts. The higher the dollar amount a user must attain before being paid, the fewer requests for payment. To configure minimum cash-out amount, in Terraformer, in the appropriate field, enter the minimum dollar amount users must attain before being allowed to cash out. When finished, click "Update" at the bottom of the screen.

The client may add "bonus points" to certain categories to further target areas of the site that require further development. Example: If Learning Experiences has more than enough entries but Restaurants has very few, it may make sense to give users bonus points for every restaurant they enter over a given period of time. To configure bonus points, in Terraformer, select "Domain Tables" on the top navigation bar and "Bonus Points" from the left navigation bar. A screen like that shown by FIG. 91 will appear. To add a bonus, type a title for the bonus into the "Bonus Description" field. From the "Primary Category" dropdown box, select the category that is most appropriate for this bonus. Insert the point and dollar values to award for this action, and then click "Add." To remove an existing bonus, select it from the "Select Bonus Description" dropdown box at the top and click "Remove." To edit an existing bonus, select it from the "Select Bonus Description" dropdown box at the top. Its title will then appear in the "Bonus Description" field, and the category, points and dollars associated with it will also appear in their respective fields. Edit as necessary and click "Update" (the "Add" button will change to "Update").

The client may create point goals and opinion multipliers for each user type to give proper incentive to each member type. Example: Correspondents will enjoy more rewards and privileges than members; because of that, one will likely require more community-building activity from them. To configure point goals and opinion multipliers, in Terraformer, select "Domain Tables" on the top navigation bar and "User Types" from the left navigation bar. A screen like that of FIG. 92 will appear. From the "Select User Type Description" dropdown box at the top of the page, select the user type for whom one would like to determine a monthly point goal and opinion multiplier. In the "Opinion Multiplier" field, enter the appropriate weighting for the selected user type. Example: A multiplier of 3 for a Correspondent would make a Correspondent's opinions worth three times that of a Member. When finished, click "Update". In the "Point Goal" field, enter the monthly point total that you expect each user type to accumulate. When finished, click "Update".

The client may create rewards for each user type to allow each member type a chance to earn rewards. Example: If you choose to reward your top 10 contributors, those 10 will probably all be correspondents (correspondents are the most active contributors and will naturally aggregate more points than other users). This feature allows you to designate a reward for each user type: e.g., Top 10 Correspondents, Top 10 Members, etc. And the client may allocate a percentage of sponsorship revenue to user rewards; this is an easy way to automatically allocate a pool of money for user rewards. This is an alternative to setting aside a specific dollar amount for the same purpose. And the client may decide the number or percentage of users that may share in special rewards to configure the distribution of rewards. Example: A smaller site with fewer users may choose to reward its most active 50 users with a special reward. A high-volume site may choose to reward by percentage (e.g., the most active 5 percent of users). This works because every month, the instant system's software runs an automated process that identifies the top contributors—by percentage or real number—and generates a list of them. The client may configure this in Terraformer in the appropriate screen in the "Top N Count Value" field, by entering the number (N) of top contributors that will share in special rewards for the site: e.g., 100 for Top 100, 50 for Top 50, etc., or in the "Top N Percent Value" field, enter the percentage of top contributors that will share in special rewards: e.g., 10 for top 10 percent; 50 for top 50 percent, etc.

The clients, as has been discussed, may set up and configure contests. An automated process sifts through the entries (on demand) and determines a winner(s). The client may select as many winners as is desired.

The client may configure audience communication. Creating predefined questions and topics for users enables them to more easily communicate with the site about what they like and dislike about the site. The instant system allows the client to define pre-selected feedback Subjects to help speed and simplify the user's process for communicating. To configure feedback Subjects, in Terraformer, select "Domain Tables" on the top navigation bar and "Feedback Subjects" from the left navigation bar. A screen like that shown in FIG. 93 will appear. To add a new feedback subject, type the text into the "Feedback Subject" field, then click "Add." To remove an existing feedback subject, select it from the "Select Feedback Subject" dropdown box at the top and click "Remove." To edit an existing feedback subject, select it from the "Select Feedback Subject" dropdown box at the top. Its title will then appear in the "Feedback Subject" field. Edit as necessary and click "Update" (the "Add" button will change to "Update").

As shown earlier, the client may define questions to ask prospective correspondents. Different sites will want different qualities from their correspondents. The client defines what questions correspondents must answer and the possible responses, and then decide how they must score in order to meet client standards. These are, as discussed, configured in Terraformer. Similarly, the client may configure Correspondent Answers and create decline reasons—predefined reasons for a user to decline the client's offer to become a correspondent or a member. Why this feature? To aggregate the most common showstopper issues for potential correspondents and members, and to use that aggregated data to reshape the client approach to recruiting them.

The instant system helps generate revenue by offering advertisers a completely automated way to appear on the site. The instant technology enables advertisers to create and enhance a fully detailed page for their business, and here's how the client can help: by creating predefined section headers for sponsor pages to make it faster and easier for sponsors to create their own customized pages, and thereby make it easier to sell sponsorships. Examples of section headers could include: Our Menu, Our Facilities, Our Customers, Our Hours, Our Specialties, Our Products, Our Employees, Our Coupons, Our Weekly Specials, etc. Section may be configured in Terraformer in the appropriate screen.

The client may configure/display address and phone of un-sponsored Subjects to give businesses incentive to sponsor Subjects. And the client may determine setup and sponsorship fees. Reasonable fees for sponsorship depend on a number of factors: market size, competition, saturation, etc. Each site can tailor these rates to their own business situation. To configure sponsorship fees, in Terraformer, click the "System Tables" tab on the top navigation bar and the "Sponsorship Parameters" tab on the left navigation bar. A screen like that of FIG. 94 appears. These three fields determine sponsorship pricing. The top field is the initial sponsorship fee. The second field is the fee for the first month of sponsorship, and the third field is the fee for each subsequent month. Enter the amount in each of the fields that one wants to charge for sponsorships, then click "Update."

In addition to having the ability to see a site's total number of users, Subjects, ratings and comments at any time, the following management reports are also available to clients: Member Counts, Member Demographics, Member Rewards Pool Status, Contributions by Members, Correspondents Counts, Regions, Demographics, Performances, Content Reports, Sponsor Reports, Feedback Reports, etc.

Underlying the instant system is an intricate system of automated processes that documents the Web site's activity and keeps it updated and running smoothly. What follows is a list of the processes that run at scheduled intervals for each site. It does Correspondent invitation. Using the correspondent-recruitment application and email created by the client, this process sifts through all registered users in the database and sends an invitation to potential correspondents based on their application score and available openings. Example: Member Bob lives in the 90210 ZIP code. There is an opening for a correspondent in the 90210 ZIP code, so this process sends Member Bob an e-mail inviting him to become a correspondent. It does a Waiting List. If there are no openings in a potential Correspondent's ZIP code, he/she immediately becomes a Member, and his/her name is added to a Correspondent waiting list. When a Correspondent position opens up, the process sends the Member an email inviting him/her to become a Correspondent. It does Invitation cleanup. The process looks at all the correspondent invitations that have not been answered by a certain (client-specified) period of time, and deletes them. It does User purge. This process looks at the usage patterns of all registered users and deletes the ones who have not returned to your site in the client-specified amount of time. It does Correspondent missed goals. Using the client-configured goals for each member type, this process evaluates each registered user's goals, awards points and sends an email reminder to those users who did not reach their goals. It does Demotion. This process finds users who have not met their performance goals for consecutive months, and demotes them. Note: A client may choose to de-activate this option and elect not to demote users.

It also does Old Subject Purge. Using the "dates available" field, this process finds events that have expired and deletes them from the site. Example: Two weeks after a Bette Midler concert—after giving users an ample (client-selected) amount of time to comment on the show—the process would delete the concert from the site. It does Poor Subject purge. This process works in the same way as the "Old experience purge," but it deletes a Subject based on its average rating instead of its date. It does Ratings purge. This process removes ratings entered before a client-specified date. It does Sponsor payment notification. This process generates a report on the revenue from all sponsored Subjects. It does Top words update. This process examines all Descriptive Words used to describe the Subjects in your database and generates a list of the top 100 words used in each Category. These words may be used as the pre-selected Descriptive Words during the add process as well as in the rating process.

The automatic process also does Average accounting points. This process reviews all user activity from the past month and generates an average number of points per action per user type. Example: In September, the average Member earned 1200 points by adding Subjects, 400 points by rating comments, and 300 points by rating Descriptive Words. The average Correspondent earned 1500 points by adding Subjects, 600 points by rating comments and 500 points by rating Descriptive Words. It does Bookmark summary. This process tracks the number of times that each Subject was bookmarked by a user. It does Top 100 Subjects. Every month, this process generates a list of the 100 highest-rated Subjects for each category. The top 10 are added to the home page, with a link to the list of 100. It does Monthly awards. Per the client's criteria, this process identifies the top performers that will share in special awards for the given month. It does Correspondent, Member and Sponsor reports. This process generates regular emails (at client-selected intervals) to each member type in order to recruit, manage and motivate. Emails will contain a link back to the Web site or MyPage. It does Correspondent recruitment bonuses. This process finds all the new registered users who were recommended by another user, and accepted as a correspondent. Reward bonus points are given to the referrers upon acceptance. It does National pool flags. This process ensures that Subjects added by members are approved by correspondents in a timely fashion. After a Subject has been waiting for approval by a correspondent in a specific ZIP code for a certain (client-specified) amount of time, the Subject then becomes available for review by all other correspondents. Example: Member George has reviewed a restaurant in Correspondent Gracie's ZIP code. For the next three days, Correspondent Gracie has sole authority to approve Member George's new Subject. After three days, if Correspondent Gracie has not approved or rejected George's restaurant review, then the review becomes available for approval to any Correspondent.

It also does Purge Old Comments. This process removes comments that are beyond a certain age (e.g., 30 days, 6 months, etc.). It does Real-time Subject-page views. The process adds up all Subject-page views over a given time period. It does Real-time information requests. This process counts the number of times that user have clicked "get more information" about a Subject. Why use this feature? To sway potential advertisers toward a sponsorship. A potential advertiser may be more likely to sponsor a Subjects if she knows that dozens of your Web site users were looking for information about her business. It does Batch reporting. This process reports a summary of the processes that ran on the previous day.

The instant system includes a Survey tool that allows a user to create a survey for any audience in just three easy steps. It also allows many customized options. Using a survey tool, the user can determine:

Who may respond to the survey
How many times each participant may respond
Who may see the results, and when they may see them
Which questions participants must answer
Whether a user may leave comments after taking the survey
A specific start and end date for the survey
A maximum number of total responses to the survey The following is a description of how to create and manage surveys with the Survey tool. FIGS. 95A-B show an example survey of the type generated by the Survey tool. Note that it features word/term/item ratings similarly to the instant above-described system. To create a survey, from the Surveys home page, click a "Learn more" link in the center at such home page to get to a page with a short introduction that describes the process of creating a survey. When the user is finished, he/she clicks the "Create a Survey" button at the bottom of the page and gets a page returned like that shown in FIG. 96A-B. The user fills out the four pictured fields: Survey Title, Offered by (the survey's author), Survey Topic and Survey Elements. In the Survey Topic field, the author types the question or statement to which the participants will respond. In the Survey Elements fields, the author types the items that the participants will rate. Each of the elements has a "required" checkbox next to it. If the author would like to require each user to rate a particular element, the "required" box should be checked. If the author will allow participants not to rate certain elements, the "required" box should remain unchecked for those elements.

Ten fields for Survey elements are provided. If more are needed, the author clicks the "get more elements" link above the "Next" and "Cancel" buttons to get more fields. When all elements are complete, the author clicks the "Next" button and gets a screen like that of FIG. 97. In Step 2, the survey author will make the following determinations:

User Comments: Here, the author decides whether to allow the participant to leave a written comment after taking the survey. If so, the author checks the "Collect Comments" box. If not, the box is left blank. If the author chooses to collect comments, those comments will only be viewable by the author him/herself (not survey participants).

Date Options: In these fields, the author determines the start and end date of the survey. Participants will be permitted to take the survey between those dates only.

Maximum Responses: The author has the option of putting a limit on the number of responses to the survey. If he/she wants to limit the responses, the author types the maximum number in the field; if no limit is desired, he/she enters "0" in the field.

FIGS. 98A-B illustrate the bottom half of the Step 2 page:

Response Validations: The author may choose "Anonymous" or "Require Email address." If the author doesn't care who responds to the survey and how many times a person responds, he/she clicks "Anonymous." If the author would like to control who and how many times a user responds, "Require Email Address" must be selected.

Response Limitations: This is only available if "Require Email Address" is selected in the "Response Validations" field. In the "Maximum responses per e-mail address" field, the author types in the number of times a participant is allowed to respond to the survey. If the author would also like to restrict participation in this survey to people from a certain organization, he/she may do so by checking the box that reads "Limit responses to these organizations" and listing the domain names of those organizations (e.g., ibm.com, generalmills.com, etc.) in the box below it. If the author does not wish to restrict who may respond to the survey, the checkbox should be left unchecked, and the large text box should be ignored.

Results options: The survey author has five choices about who and when people may see the results:

Results are available to anyone at any time

Results are available to anyone after the survey ends

Results are always available to anyone who has participated in the survey
 (Only available for surveys that require an email address for participation)

Results are available to anyone who has participated in survey after survey ends
 (Only available for surveys that require an email address for participation)

Results are never available

Once the author has selected all the variables on this page, he/she clicks "Next" for the final page of the survey creation process (illustrated by FIG. 99). On the final page of the survey creation process, the author adds customized text in these fields:

Survey Introduction: This short message welcomes your respondents and tells them how to proceed. Example: "Welcome! Tell us where you'd like to have the holiday party!"

Collect Email Address: This text instructs participants to instruct to enter their email address and (perhaps) explains why it is being collected. Example: "Enter your email address below (for tracking purposes only)."

Final Results: This text appears above the final results of the survey. Example: "Thanks for participating! This is how the results turned out."

Current Results: This text appears above the current results that participants see before the survey has ended. Example: "Your vote has been counted. Here's how results are shaping up so far."

Rating Scale: This is the text that will appear above the rating legend. It will explain to survey participants what the rating scale means, and how to choose accordingly. Example: "The rating scale varies from a 5 for "Very Important" to a 1 for "Not Important at all.""

Some remaining Custom Text fields are shown in the following illustration:

Comment Heading: This is the title that will display above the Comments box. Example: "Leave Your Comments"

Comment Text: This is the introductory text that accompanies the Comments box. Example: "Something to say? Leave your comments in the box below."

Note: When a survey is created that does not allow participants to see results until after the end date of the survey has passed, two more custom text fields appear as illustrated by FIG. 100:

"Completion Thank You": In a survey where results may not be viewed until after the survey end date has passed, text entered in the Completion Thank You field will appear in place of the current results.

"Results Not Available.": Text in the Results Not Available field appears when a participant clicks the Unique Results URL. It can also appear—if the author has specified that only participants may see the results—when someone who has not taken the survey tries to view the results.

When the variables have all been selected, the survey can be created. If the author is a registered user and logged in, he/she will be taken right to the "Congratulations" page as illustrated by FIG. 101. If the author is creating his/her first survey and is not yet a registered user—or if the author is a repeat user and simply has not logged in—he/she will receive a prompt to register/log in. Authors who already registered users can type in their username and password in the appropriate fields, then click "Login." Those who are not yet registered must click the "Sign up" button after which they will go to a sign-up screen. After filling out the fields, the new author clicks "Submit" and is taken to the "Congratulations" page (FIG. 101). On this screen are the two important URLs that the program generates. The first URL is "Your Unique Survey URL." This is the URL that the author sends to participants so they can take the survey, and uses to link the survey from any Web page. The second URL is the "Your Unique Results URL." This is the URL that holds the current results to the survey. If the survey is no longer open (if the end date has passed), the final results can be found at this URL. If the survey hasn't yet begun, a screen saying the results are unavailable will return. In the sentence below the unique results URL is a link to the Survey Management Center—the area where the author can review and manage this survey. Here may be found a summary of the Survey: its title, author, topic, elements, Survey URL and Results URL. To make changes to any of the text, the author clicks the "Edit" link to the right of the survey title and gets a page where the author can change the Survey title, author name, topic and elements. Elements can also be deleted from this screen, and the "required" status for each element can be changed. When all of the appropriate changes are made, the author scrolls to the bottom of the page and clicks the "Next" button and returns to the Survey Management Center page, which contains all the current settings for a survey, and links to areas where those settings may be viewed and changed. Under an "Actions" heading, the author can click the View Comments link to see a list of all the comments participants have left. Preferably, three other links under "Actions"—"Refresh Count," "Close Survey" and "Delete Survey"—are ways that the author can update the Survey. "Refresh Count" collects the most recent results of the Survey. "Close Survey" closes it, and "Delete Survey" deletes the survey. After performing each of these actions, the author may preferably use additional provided screens to do custom editing, etc.

Finally, an author may, at some point, wish to make changes to his/her account and billing information and view the history of the account. He/she may do so using the User Profile Manager. Clicking the "User Profile" link in the green navigation bar at the top of any page, the user is taken to a page showing the author's current account information: username, account number, email address, physical address, phone number and credit card information. To change anything under the Account Information heading, the author simply clicks "edit" modes at appropriate headings text at the right of that heading.

The main Survey Management Center page preferably has a "User Account History" link that takes the author to a page with detailed information about all surveys the author has performed, in addition to the billing information associated with them. An example of the User Account History page is shown by FIG. 102. The Account History page shows each Survey created by the author, the charges for each and a description of those charges. It also shows the date and time each survey was created, the credit card each to which each survey was charged, and the reference and authorization numbers for each.

Although applicant has described applicant's preferred embodiments of this invention, it will be understood that the broadest scope of this invention includes such modifications as diverse computer hardware implementations and materials. Such scope is limited only by the below claims as read in connection with the above specification. Further, many other advantages of applicant's invention will be apparent to those skilled in the art from the above descriptions and the below claims.

What is claimed is:

1. A method, relating to creating and maintaining information in a database of subjects, on a database server computer, available to a population of users, comprising the steps of:
   a) describing a database subject using a plurality of natural-language terms, each of such plurality of natural-language terms having relevance to the subject according to an involved subset of such population of users;
   b) rating the degree of relevance of each of such plurality of natural-language terms to such database subject according to each of such involved subset of such population of users;
   c) associating, in such database, such respective natural-language terms and respective degrees of relevance with each such database subject;
   d) computing, for such involved subset of such population of users, in such database, an overall degree of relevance of each of such plurality of natural-language terms to such database subject; and
   e) presenting, to at least one user of such population of users, such computed overall degree of relevance of at least one natural-language term of such plurality of natural-language terms to such database subject.

2. A method, relating to creating and maintaining, in at least one database on a database server computer, available to a population of users, information about a plurality of database of subjects, comprising the steps of:
   a) associating with each database subject of such plurality of database subjects at least one plurality of natural-language tags potentially descriptive of such each database subject according to an involved subset of such population of database users;
   b) computing, over all such involved subset of such population of users, in such at least one database, overall respective measures of such relevance of each respective one of such plurality of natural-language tags to each such respective database subject;
   c) assessing at least one measure of descriptive relevance of each of such at least one plurality of natural-language tags to such each database subject according to each particular database user of such involved subset of such population of database users; and
   d) associatively indexing, in such at least one database, such respective particular database users, such respective natural-language tags, such respective measures of relevance, and such respective database subjects;
   e) presenting to a selected particular user information about a particular such database subject and such associated respective relevant natural-language tags with such respective overall measures of relevance;
   f) collecting, from such selected particular user, such selected particular user's opinions about respective measures of relevance to such particular database subject of such respective presented natural-language tags;
   g) adding such selected particular user to such involved subset of such population of users and adding such selected particular user's opinions to such database; and
   h) updating, in association with such particular database subject, in such database, such overall measures of relevance of each of such plurality of natural-language tags associated with such particular database subject.

3. A method, relating to creating and maintaining, in at least one database on a database server computer, available to a population of users, information about a plurality of database of subjects, comprising the steps of:
   a) associating with each database subject of such plurality of database subjects at least one plurality of natural-language tags potentially descriptive of such each database subject according to an involved subset of such population of database users;
   b) computing, over all such involved subset of such population of users, in such at least one database, overall respective measures of such relevance of each respective one of such plurality of natural-language tags to each such respective database subject;
   c) assessing at least one measure of descriptive relevance of each of such at least one plurality of natural-language tags to such each database subject according to each particular database user of such involved subset of such population of database users; and
   d) associatively indexing, in such at least one database, such respective particular database users, such respective natural-language tags, such respective measures of relevance, and such respective database subjects;
   e) associating with a particular user a set of particular-user-preferred such natural-language tags from such plurality of natural-language tags;
   f) using such particular user's preferred such set of particular-user-preferred such natural-language tags, searching such database for database subjects associated with such set of particular-user-preferred such natural-language tags;
   g) determining a set of potentially-preferred such database subjects as are correlated with a high aggregate degree of relevance among such respective overall degrees of relevance of such set of respective particular-user-preferred such natural-language tags; and
   h) presenting to such particular user information about such potentially-preferred database subjects.

4. A computer system, relating to creating and maintaining, in at least one database available to a population of users, information about a plurality of database of subjects, comprising:
   a) at least one (associating) computer processor structured and arranged to associate with each database subject of such plurality of database subjects at least one plurality of natural-language tags potentially descriptive of such each database subject according to an involved subset of such population of database users;

b) at least one (overall) computer processor structured and arranged to compute, over all such involved subset of such population of users in such at least one database, overall respective measures of such relevance of each respective one of such plurality of natural-language tags to each such respective database subject;

c) at least one (assessing) computer processor structured and arranged to assess, from input from at least one particular database user, at least one measure of descriptive relevance of each of such at least one plurality of natural-language tags to such each database subject according to each particular database user of such involved subset of such population of database users; and d) at least one (indexing) computer processor structured and arranged to associatively index, in such at least one database, such respective particular database users, such respective natural-language tags, such respective measures of relevance, and such respective database subjects;

e) at least one (presenting) computer processor structured and arranged to present to a selected particular user information about a particular such database subject and such associated respective relevant natural-language tags with such respective overall measures of relevance;

f) at least one (collecting) computer processor structured and arranged to collect, from such selected particular user, such selected particular user's opinions about respective measures of relevance to such particular database subject of such respective presented natural-language tags;

g) at least one (adding) computer processor structured and arranged to add such selected particular user to such involved subset of such population of users and to add such selected particular user's opinions to such database; and h) at least one (updating) computer processor structured and arranged to update, in association with such particular database subject, in such database, such overall measures of relevance of each of such plurality of natural-language tags associated with such particular database subject.

5. A computer system, relating to creating and maintaining, in at least one database available to a population of users, information about a plurality of database of subjects, comprising:

a) at least one (associating) computer processor structured and arranged to associate with each database subject of such plurality of database subjects at least one plurality of natural-language tags potentially descriptive of such each database subject according to an involved subset of such population of database users;

b) at least one (overall) computer processor structured and arranged to compute, over all such involved subset of such population of users, in such at least one database, overall respective measures of such relevance of each respective one of such plurality of natural-language tags to each such respective database subject;

c) at least one (assessing) computer processor structured and arranged to assess, from input from at least one particular database user, at least one measure of descriptive relevance of each of such at least one plurality of natural-language tags to such each database subject according to each particular database user of such involved subset of such population of database users; and d) at least one (indexing) computer processor structured and arranged to associatively index, in such at least one database, such respective particular database users, such respective natural-language tags, such respective measures of relevance, and such respective database subjects;

e) at least one (preferred-tag) computer processor structured and arranged to associate with a particular user a set of particular-user-preferred such natural-language tags from such plurality of natural-language tags;

f) at least one (searching) computer processor structured and arranged to, using such particular user's preferred such set of particular-user-preferred such natural-language tags, search such database for database subjects associated with such set of particular-user-preferred such natural-language tags;

g) at least one (aggregate-relevance) computer processor structured and arranged to determine a set of potentially-preferred such database subjects as are correlated with a high aggregate degree of relevance among such respective overall degrees of relevance of such set of respective particular-user-preferred such natural-language tags; and h) at least one (subject-presenting) computer processor structured and arranged to present to such particular user information about such potentially-preferred database subjects.

6. An Internet website client-server computer system, relating to use to determine a level of subject interest for each one of a population of users by capturing other users' (of such population of users) opinions about the degree of relevance of each of a respective set of natural language descriptive terms to each of a respective set of subjects, comprising:

a) a server database system of subjects, each associated with a set of relevant natural-language terms for describing each such subject;

i) wherein each of a respective subset of such terms has been assigned, by each of a subpopulation of such population of users, a degree of relevance with respect to a respective such subject;

b) a client interface system arranged so that such one user may select a set of preferred such natural-language terms which, to such one user, best describe preferred "subjects of interest" to such one user;

c) a server computer processor system connected with said server database system and said client interface system; and d) a server computer software system, operational with said server computer processor system, arranged to provide search processing using such server database system to:

i) determine an overall, according to such population of users, degree of relevance of each such preferred natural-language term to each such associated subject of such server database system, and ii) determine a set of search-return "subjects of interest" each having at least a specified aggregate degree of relevance considering each such overall degree of relevance of each such preferred natural-language descriptive term to each associated such subject; and iii) return such set of search-return "subjects of interest" to such client interface system of such one user.

7. The computer system according to claim 6 wherein such set of search-return "subjects of interest" is ordered according to relative such aggregate degree of relevance.

* * * * *